(12) United States Patent
Ohishi et al.

(10) Patent No.: US 8,744,608 B2
(45) Date of Patent: Jun. 3, 2014

(54) WORK MANAGEMENT APPARATUS, PICKING CARRIAGE, WORK PERFORMANCE COLLECTION SYSTEM, REWORK MEASUREMENT SYSTEM, WORKABILITY MANAGEMENT SYSTEM, REWORK MEASUREMENT MEASURING METHOD, WORK PERFORMANCE COLLECTION METHOD, WORKABILITY MANAGEMENT METHOD AND WORKABILITY MANAGEMENT PROGRAM

(75) Inventors: Satoshi Ohishi, Hitachi (JP); Yonemitsu Niimura, Hitachiota (JP); Hiroyuki Seya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 13/365,330

(22) Filed: Feb. 3, 2012

(65) Prior Publication Data
US 2012/0136692 A1 May 31, 2012

Related U.S. Application Data

(63) Continuation of application No. 11/757,489, filed on Jun. 4, 2007, now Pat. No. 8,190,282.

(30) Foreign Application Priority Data

| Jun. 9, 2006 | (JP) | 2006-160584 |
| Jun. 9, 2006 | (JP) | 2006-160585 |
| Jun. 9, 2006 | (JP) | 2006-160733 |
| Jun. 23, 2006 | (JP) | 2006-174466 |
| Jun. 26, 2006 | (JP) | 2006-174811 |
| Aug. 3, 2006 | (JP) | 2006-211782 |

(51) Int. Cl.
*G06F 19/00* (2011.01)

(52) U.S. Cl.
USPC ............ 700/108; 700/95; 700/116; 235/381; 235/385; 705/28

(58) Field of Classification Search
USPC ............ 700/95, 99, 108, 113–116; 235/381, 235/385
See application file for complete search history.

(56) References Cited

U.S. PATENT DOCUMENTS

| 5,907,829 A * | 5/1999 | Kida | 705/7.16 |
| 6,892,943 B2 * | 5/2005 | Nakamura | 235/385 |
| 7,016,753 B2 * | 3/2006 | Yamazaki | 700/121 |
| 7,054,699 B2 * | 5/2006 | Nakamura | 700/95 |

(Continued)

FOREIGN PATENT DOCUMENTS

| JP | 04-250959 | 9/1992 |
| JP | 07-149268 | 6/1995 |

(Continued)

*Primary Examiner* — Sean Shechtman
*Assistant Examiner* — Douglas Lee
(74) *Attorney, Agent, or Firm* — Antonelli, Terry, Stout & Kraus, LLP

(57) ABSTRACT

Workability management system including operations of: storing resource identification information for identifying said resource and said work history information in association with each other in a storage medium; extracting said work history information corresponding to said resource identification information from said storage medium when a change occurs in said work history information, updating a change content and storing it into said storage medium; extracting said work history information corresponding to said resource identification information of said resource for judging workability of said resource from said storage medium, taking out total use information of said resource from said work history information, and creating a change with time of said total use information as said casual sequence information; and judging workability of said resource by said casual sequence information.

9 Claims, 61 Drawing Sheets

(56) References Cited

U.S. PATENT DOCUMENTS

| | | |
|---|---|---|
| 7,140,542 B2 * | 11/2006 | Andreasson et al. ......... 235/385 |
| 7,155,400 B1 * | 12/2006 | Jilk et al. ..................... 705/7.14 |
| 2003/0099462 A1 * | 5/2003 | Matsugami ..................... 386/83 |
| 2005/0158151 A1 | 7/2005 | Kawasaki et al. |
| 2010/0023429 A1 * | 1/2010 | Bolander et al. ................. 705/28 |

FOREIGN PATENT DOCUMENTS

| | | |
|---|---|---|
| JP | 11-272972 | 10/1999 |
| JP | 2003162310 | 6/2003 |
| JP | 2004-213511 | 7/2004 |
| JP | 2004-295289 | 10/2004 |
| JP | 2005035327 | 2/2005 |
| JP | 2005-100298 | 4/2005 |
| JP | 2005-115722 | 4/2005 |
| JP | 2005182656 | 7/2005 |
| JP | 2005-206279 | 8/2005 |
| JP | 2005-258546 | 9/2005 |
| JP | 2006-039903 | 2/2006 |
| JP | 2006-127263 | 5/2006 |

* cited by examiner

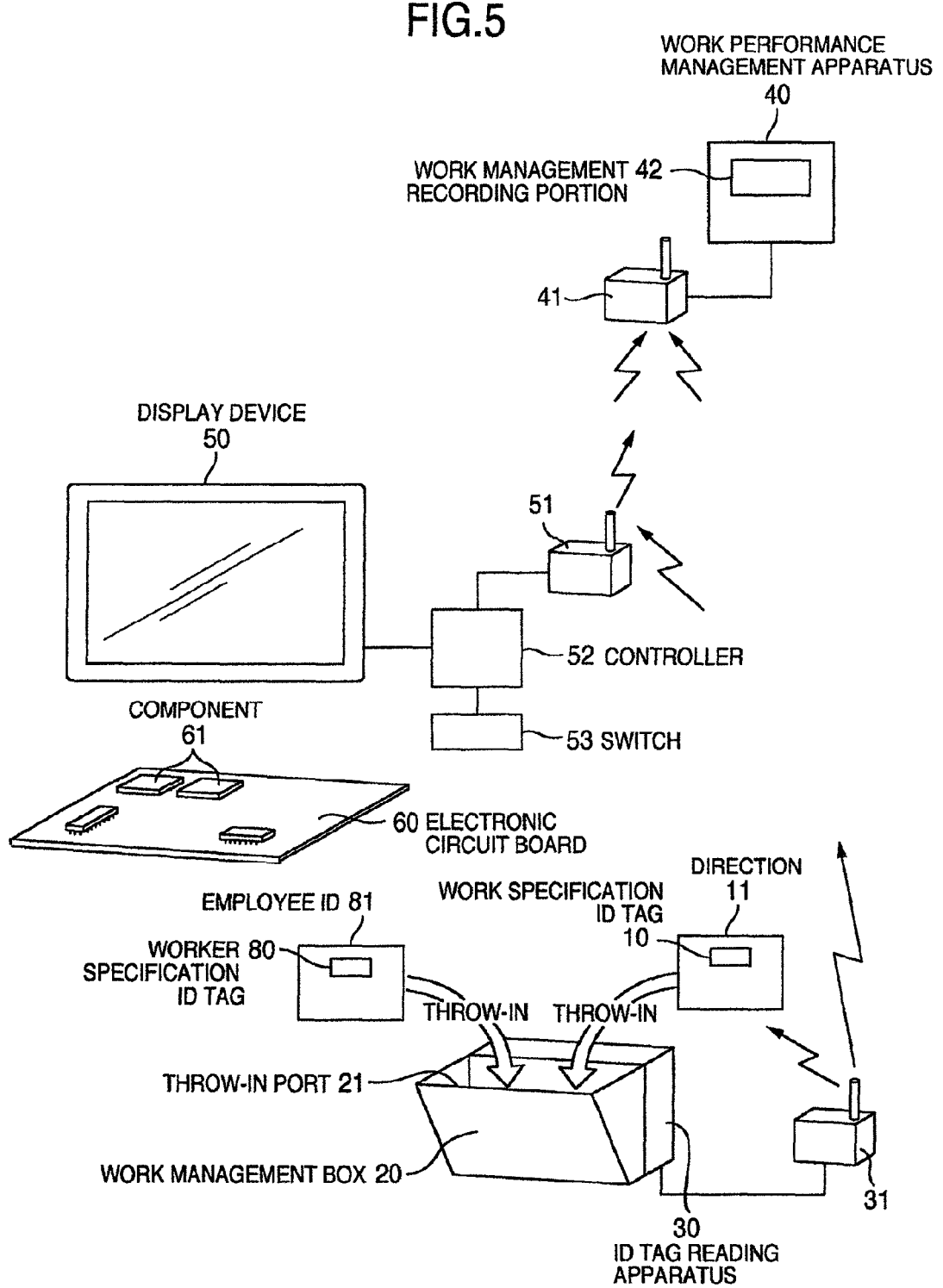

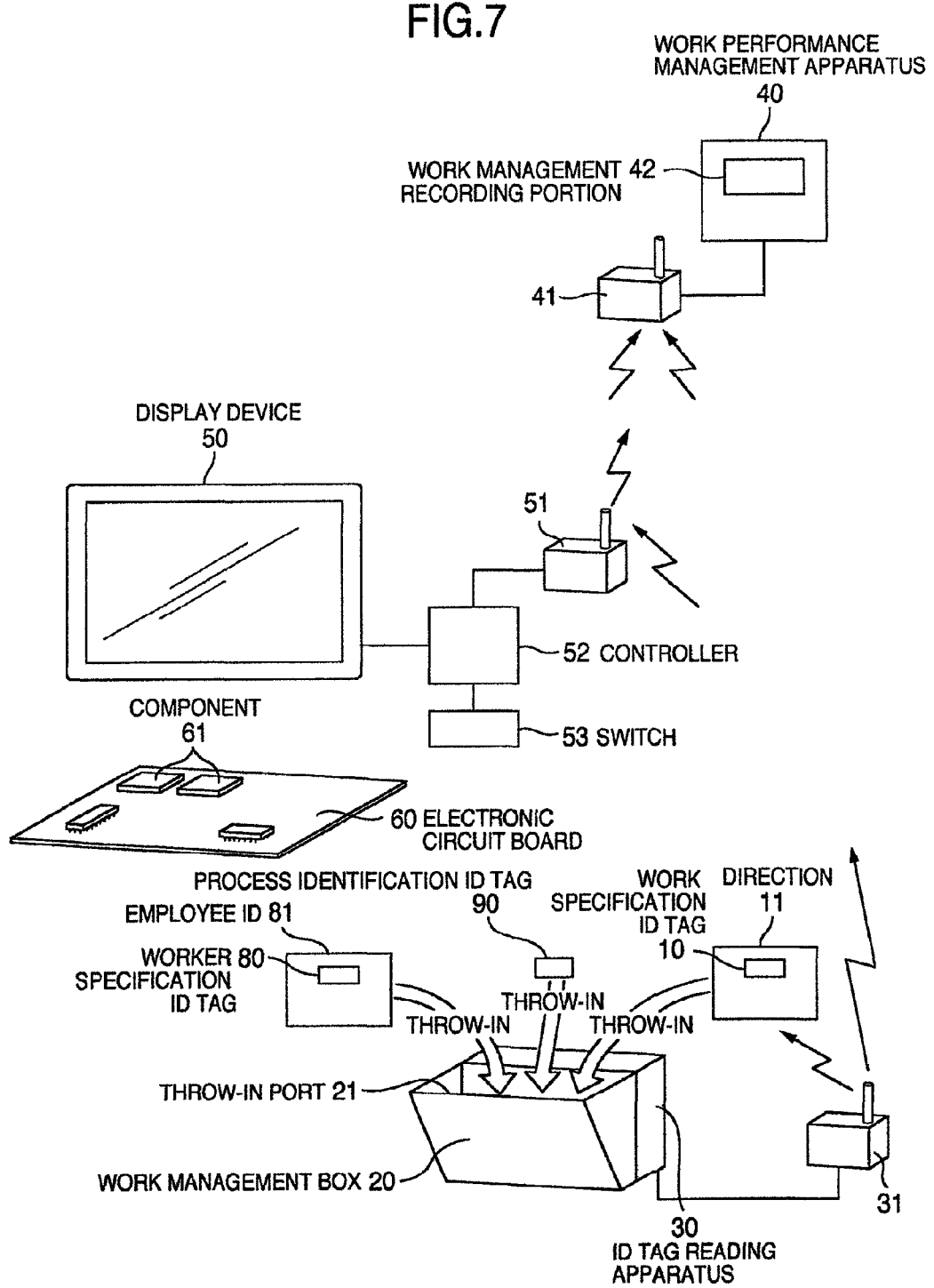

FIG.8A
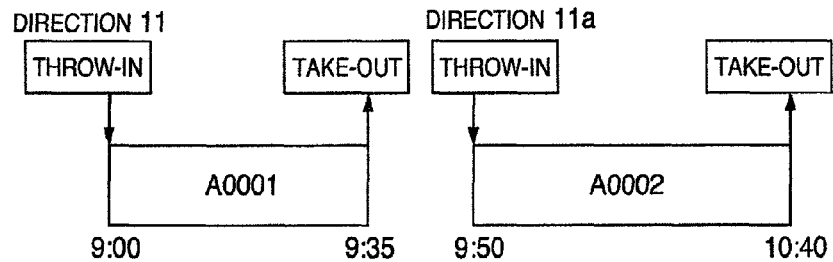
FIG.8B
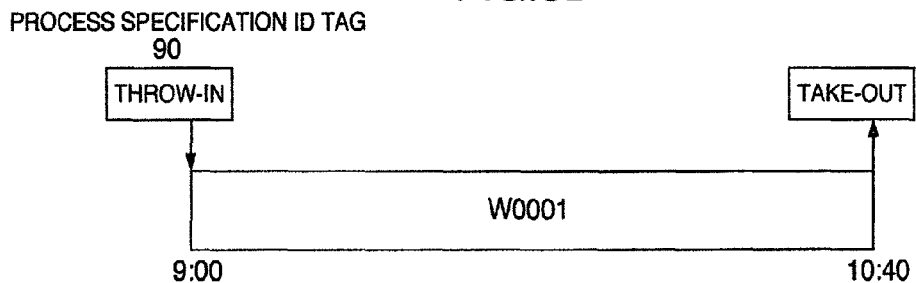
FIG.8C
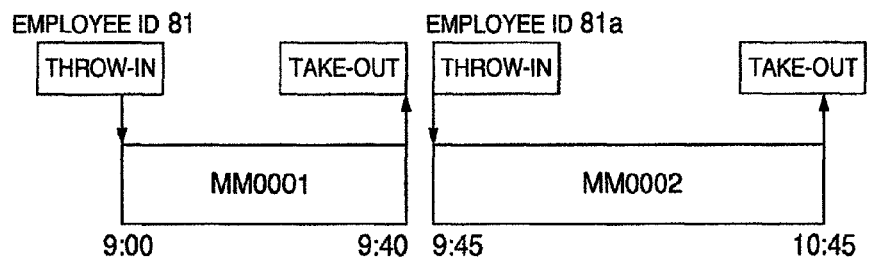
FIG.9
| DIRECTION No | WORK START | WORK END | WORK PROCESS | WORKER |
|---|---|---|---|---|
| A0001 | 2006/5/10 9:00 | 2006/5/10 9:05 | W0001 | MM001 |
| A0002 | 2006/5/10 9:50 | 2006/5/10 10:40 | W0001 | MM002 |
| ⋮ | ⋮ | ⋮ | ⋮ | ⋮ |

FIG.10

| 54 — DIRECTION NO. | A0001 | PROCESS ID | W0001 | — 55 |

54a — DIRECTION CONTENT

| | MODEL NUMBER | X001-100 | WORK START DATE | 2006/05/10 9:00 | |
|---|---|---|---|---|---|
| | PRODUCT NAME | ELECTRONIC CIRCUIT BOARD A | WORK END DATE | | — 58 |
| | NUMBER | 1 | WORKER ID | MM0001 | — 56 |
| | FINISHED-PRODUCTS NUMBER | 0 — 57 | | | |

54b — ASSEMBLY INDICATION INFORMATION

| PROCEDURE | WORK CONTENT | DETAILED WORK TIME — 59 |
|---|---|---|
| B001 | PARTS001 MOUNTING | 2006/05/10 9:05 |
| B002 | PARTS002 MOUNTING | 2006/05/10 9:12 |
| B003 | PARTS003 MOUNTING | 2006/05/10 9:15 |
| B004 | SOLDERING | 2006/05/10 9:22 |
| B005 | CONFIRMATION | 2006/05/10 9:32 |
| | | |

FIG.16

REWORK DIRECTION INPUT WINDOW

DIRECTION NUMBER: 060421-1  — 2081

DIRECTION CONTENT

MODEL NUMBER: A2132 — 2082
MODEL NAME: DECIMAL COUNTER — 2083
NUMBER: 2 — 2084
FACTOR: 55:IC PIN BREAKAGE ▶ — 2085

MODEL — 2086
LOT NUMBER — 2087
SERIAL NUMBER — 2088

REMARKS — 2089

REGISTRATION — 2090
CANCEL — 2091
TEMPORARY SAVE — 2092
DIRECTION ISSUANCE — 2093
IC TAG ISSUANCE — 2094

FIG.17A

REWORK DIRECTION LIST

| No | REWORK DIRECTION NO. | MODEL NUMBER | REWORK NUMBER | REWORK FACTOR | SHOP NUMBER | REWORK START TIME | REWORK END TIME | WORKER |
|----|----------------------|--------------|---------------|---------------|-------------|-------------------|-----------------|--------|
| 1  | 060421-1             | A2132        | 2             | 55            |             |                   |                 |        |
| 2  | 060421-2             | B2343        | 4             | 56            |             |                   |                 |        |
| 3  | 060421-3             | S2321        | 1             | 55            |             |                   |                 |        |
| 4  | 060421-4             | A2132        | 5             | 51            |             |                   |                 |        |
| 5  | 060421-5             | A3142        | 3             | 50            |             |                   |                 |        |

FIG.17B

REWORK DIRECTION WORK PERFORMANCE LIST

| No | REWORK DIRECTION NO. | MODEL NUMBER | REWORK NUMBER | REWORK FACTOR | SHOP NUMBER | REWORK START TIME | REWORK END TIME | WORKER |
|----|----------------------|--------------|---------------|---------------|-------------|-------------------|-----------------|--------|
| 1  | 060421-1             | A2132        | 2             | 55            | 1           | 0604211011        | 0604211412      | 0233   |
| 2  | 060421-1             | B2343        | 4             | 56            | 2           | 0604211300        | 0604211405      | 0156   |
| 3  | 060421-1             | S2321        | 1             | 55            | 2           | 0604211415        | 0604211548      | 0321   |
| 4  | 060421-1             | A2132        | 5             | 51            | 1           | 0604211523        | 0604211728      | 0233   |
| 5  | 060421-1             | A3142        | 3             | 50            |             | 0604220830        | 0604220958      | 0233   |

(EXAMPLE) ■ 50 IC MOUNTING SOLDER DEFECT
■ 51 IC MOUNTING TYPE ERROR
⋮
■ 55 IC PIN BREAKAGE
■ 56 CONNECTOR PIN BREAKAGE

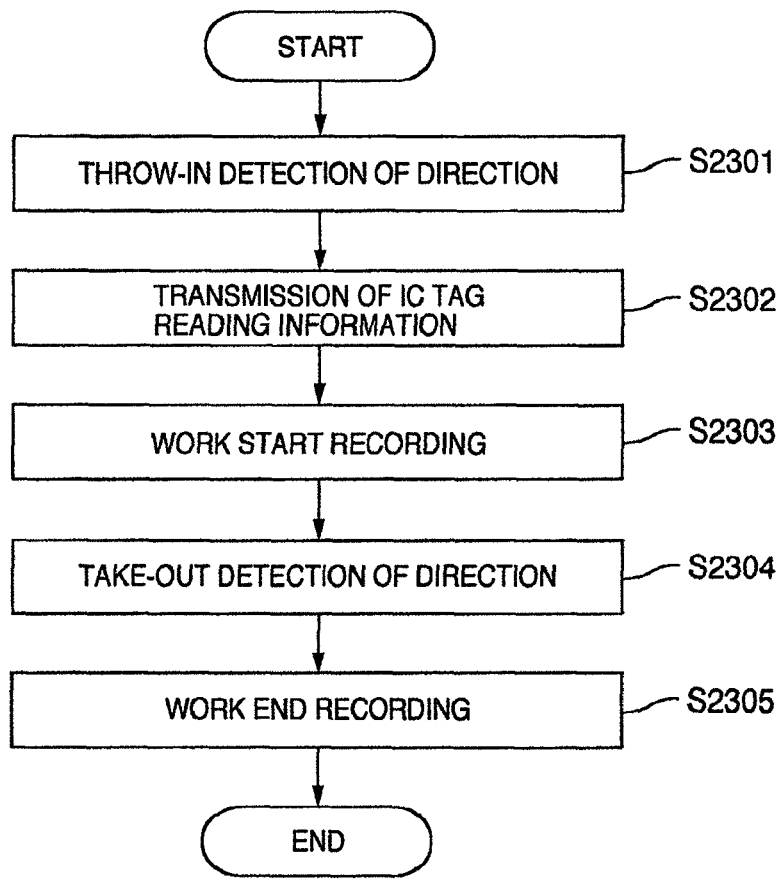

FIG.19

REWORK DIRECTION WORK LOSS COST LIST

| No | REWORK DIRECTION NO. | MODEL NUMBER | REWORK NUMBER | REWORK FACTOR | SHOP NUMBER | REWORK START TIME | REWORK END TIME | WORKER | WORK TIME | WORK UNIT PRICE | LOSS COST |
|---|---|---|---|---|---|---|---|---|---|---|---|
| 1 | 060421-1 | A2132 | 2 | 55 | 1 | 0604211011 | 0604211412 | 0233 | 0401 | 83.3 | 20,075 |
| 2 | 060421-2 | B2343 | 4 | 56 | 2 | 0604211300 | 0604211405 | 0156 | 0105 | 83.3 | 5,415 |
| 3 | 060421-3 | S2321 | 1 | 55 | 2 | 0604211415 | 0604211548 | 0321 | 0133 | 83.3 | 7,747 |
| 4 | 060421-4 | A2132 | 5 | 51 | 1 | 0604211523 | 0604211728 | 0233 | 0205 | 83.3 | 10,413 |
| 5 | 060421-5 | A3142 | 3 | 50 | 1 | 0604220830 | 0604220958 | 0233 | 0128 | 83.3 | 7,334 |

FIG.22

DIRECTION INPUT WINDOW — 3080

- 3081 — DIRECTION NO.: A0001    PROCESS ID: W0001 — 3083
- 3082 — DIRECTION CONTENT
  - MODEL NUMBER: X001-100
  - PRODUCT NAME: ELECTRONIC CIRCUIT BOARD A
  - NUMBER: 8
- 3084 — ASSEMBLY INDICATION INFORMATION

| PROCEDURE | WORK CONTENT |
|---|---|
| B001 | PARTS001 MOUNTING |
| B002 | PARTS002 MOUNTING |
| B003 | PARTS003 MOUNTING |
| B004 | SOLDERING |
| B005 | CONFIRMATION |
|  |  |

- 3085 — REMARKS

| 3090 | 3091 | 3092 | 3093 | 3094 |
|---|---|---|---|---|
| REGISTRATION | CANCEL | TEMPORARY SAVE | DIRECTION ISSUANCE | IC TAG ISSUANCE |

FIG.25

| DIRECTION No. | THROW-IN TIME | TAKE-OUT TIME | WORK PROCESS | WORKER |
|---|---|---|---|---|
| A0001 | 2006/5/10 9:00 | 2006/5/10 9:35 | W0001 | M0001 |
| A0001 | 2006/5/10 9:50 | 2006/5/10 10:40 | W0001 | M0001 |
| A0002 | 2006/5/10 10:50 | 2006/5/10 11:50 | W0001 | M0002 |
| ⋮ | ⋮ | ⋮ | ⋮ | ⋮ |

FIG.26

| DIRECTION NO. | WORK START | WORK END | WORK PROCESS | WORK TIME | INTERRUPTION TIME | NUMBER OF TIMES OF INTERRUPTION | WORKER |
|---|---|---|---|---|---|---|---|
| A0001 | 2006/5/10 9:00 | 2006/5/10 10:40 | W0001 | 1:40 | 0:15 | 1 | M0001 |
| A0002 | 2006/5/10 10:50 | 2006/5/10 11:50 | W0001 | 1:00 | 0:00 | 0 | M0002 |
| .... | .... | .... | .... | .... | .... | .... | .... |

FIG.33

MOLD DETAILED INFORMATION

| MOLD ID | MOLD NAME | MAINTENANCE 1 | MAINTENANCE 2 | MAINTENANCE 3 | USE INHIBITION FLAG | MOLD SPECIFICATION INFORMATION |
|---------|-----------|---------------|---------------|---------------|---------------------|-------------------------------|
| ID001 | TYPE A | 050910 PERFORMANCE | 060130 PERFORMANCE | 060530 SCHEDULE | — | |
| ID002 | TYPE B | 041201 PERFORMANCE | 050312 PERFORMANCE | 050712 SCHEDULE | × | |
| | | | | | | |

FIG.34

MOLD WAREHOUSING INFORMATION

| MOLD ID | MOLD NAME | ENTRY DATE | TIME | RACK POSITION | OUTGOING DATE | TIME |
|---------|-----------|------------|-------|---------------|---------------|-------|
| ID001 | TYPE A | DEC. 26 | 15:18 | C1 | JAN. 5 | 16:02 |
| ID002 | TYPE B | DEC. 25 | 17:05 | B2 | | |
| ID003 | TYPE A | DEC. 20 | 13:23 | A1 | JAN. 5 | 7:49 |
| ID004 | TYPE C | DEC. 5 | 17:40 | A3 | | |

FIG.35

MATERIAL INFORMATION (BOM)

| PRODUCT NAME | MATERIAL | MOLD (UPPER MOLD) | MOLD (LOWER MOLD) |
|--------------|----------|-------------------|-------------------|
| X-1 | Z-1 | X2 | X1 |

FIG.36

DIRECTION (PRODUCTION INDICATION INFORMATION)

| PRODUCTION INDICATION NUMBER (DIRECTION ID) | PRODUCT ID | PRODUCT NAME | PRODUCTION INDICATION NUMBER | PRODUCTION PERFORMANCE NUMBER | COMPLETION DATE |
|---|---|---|---|---|---|
| 10066 | 899-345-00 | X-1 | 100 | 100 | 050823 |
| | | | | | |

FIG.37

MOLDING MACHINE SETTING INFORMATION

| MOLDING MACHINE ID | XXXXX | YYYYY | ZZZZZ |
|---|---|---|---|
| A01 | 123.4 | 99 | 456 |

FIG.38

MOLD MOVEMENT INFORMATION

| MOLD ID | DIRECTION ID | MOLDING MACHINE | OPERATION DATE | START | END | OPERATION TIME |
|---|---|---|---|---|---|---|
| ID001 | 10066 | A01 | JAN. 5 | 8:33 | 11:20 | 2:47 |
| ID002 | 10087 | B01 | JAN. 5 | 12:40 | 15:38 | 2:58 |
| ID003 | 10102 | A01 | JAN. 5 | 16:45 | 18:51 | 2:06 |
| ID004 | 20019 | C02 | JAN. 5 | 8:25 | 11:35 | 3:10 |

FIG.39

MOLD HISTORY MANAGEMENT INFORMATION

| ID001 | STATUS | START | END | DAILY TOTAL | TOTAL |
|---|---|---|---|---|---|
| CARRY-OVER | | | | | 980:00 |
| JAN. 5 | OPERATION | 8:25 | 11:35 | 3:10 | 983:10 |
| FEB. 3 | OPERATION | 12:40 | 15:38 | 2:58 | 986:08 |
| MAR. 4 | OPERATION | 8:33 | 11:20 | 2:47 | 988:55 |
| APR. 6 | OPERATION | 16:45 | 18:51 | 2:06 | 990:01 |
| APR. 25 | INSPECTION | | | | |

FIG.40

MOLD TRACEABILITY INFORMATION

| DIRECTION ID | MOLDING MACHINE ID | NAME OF MOLD USED | MOLD ID | Start | End |
|---|---|---|---|---|---|
| 10066 | A01 | TYPE A | ID001 | 0604120930 | 0604121320 |
| | | | | | |

FIG.41

PRODUCT DEFECT INFORMATION

| PRODUCT FORM | DEFECT CODE | DIRECTION ID |
|---|---|---|
| 899 - 345 - 00 | ACCURACY DEFECT | 10066 |

FIG.42

LEVELING RULE INFORMATION

| MOLD ID | MOLD ID | MOLD ID | LEVELING RULE INFORMATION (PRIORITY REFERENCE INFORMATION) |
|---|---|---|---|
| ID001 | ID010 | ID012 | MOLD HAVING SMALLER TOTAL USE TIME IS PREFERENTIALLY USED |
| ID002 | ID011 | ID013 | MOLD HAVING SMALLER NUMBER OF TIMES OF USE IS PREFERENTIALLY USED |
| | | | MOLD SUBJECTED TO MAINTENANCE AT THE LATEST IS PREFERENTIALLY USED |

MOLD MOUNTING/DEMOUNTING PERFORMANCE AND TIME STAMP (TOTAL TIME MANAGEMENT SYSTEM)

FLOWCHART SHOWING PROCESSING OF DELIVERY AND ENTRY OF MOLD

FLOWCHART SHOWING PROCESSING AT THE TIME OF OUTGOING OF MOLD

FLOWCHART SHOWING PROCESSING DURING OPERATION OF MOLD

SHOWING WORKABILITY ANALYSIS PROCESSING OF MOLD

FIG.52A

```
PRODUCT DEFECT INFORMATION

PRODUCT : FORM 01-11
DEFECT CODE : ACCURACY DEFECT
DIRECTION NO.0412-11
```

FIG.52B

```
TRACEABILITY INFORMATION

DIRECTION NO.0412-11
MOLDING MACHINE : 1
USED MODEL : TYPE 1
MOLD ID : ID001
TIME STAMP USED : START 0604120930
                  END   0604121320
```

FIG.52C

```
MOLD DETAILED INFORMATION

MAINTENANCE1 050910 PERFORMANCE
MAINTENANCE2 060130 PERFORMANCE
MAINTENANCE3 060530 SCHEDULE
MOLD SPECIFICATION INFORMATION
     XXXXXX      XXXXXXX
     XXXXXX      XXXXXXX
```

FIG.52D

```
MOLDING MACHINE SETTING INFORMATION

XXXXX    123.4
    YYYYY    99
    ZZZZZ    456
```

FIG.56A

WORK PERFORMANCE OF PROCESS W01

| DIRECTION NO | B11 THROW-IN TIME | B11 TAKE-OUT TIME | B12 THROW-IN TIME | B12 TAKE-OUT TIME | B21 THROW-IN TIME | PROCESS | WORKER |
|---|---|---|---|---|---|---|---|
| A01 | 200X/5/10 8:40 | 200X/5/10 9:00 | 200X/5/10 9:00 | 200X/5/10 9:35 | 200X/5/10 9:40 | W01 | MM01 |
| A02 | 200X/5/10 8:41 | 200X/5/10 9:50 | 200X/5/10 9:50 | 200X/5/10 10:40 | 200X/5/10 10:55 | W01 | MM02 |
| ... | ... | ... | ... | ... | ... | ... | ... |

FIG.56B

WORK PERFORMANCE OF PROCESS W02

| DIRECTION NO | B21 THROW-IN TIME | B21 TAKE-OUT TIME | B22 THROW-IN TIME | B22 TAKE-OUT TIME | B31 THROW-IN TIME | PROCESS | WORKER |
|---|---|---|---|---|---|---|---|
| A01 | 200X/5/10 9:40 | 200X/5/10 10:00 | 200X/5/10 10:00 | 200X/5/10 10:22 | 200X/5/10 13:03 | W02 | MM30 |
| A02 | 200X/5/10 10:55 | 200X/5/10 11:25 | 200X/5/10 11:25 | 200X/5/10 11:40 | 200X/5/10 13:04 | W02 | MM30 |
| ... | ... | ... | ... | ... | ... | ... | ... |

FIG.59A

TIME DISTRIBUTION FOR DIRECTION A01

| DIRECTION NO. | PROCESS | RETENTION TIME (MIN) | PROCESSING TIME (MIN) | MOVEMENT TIME (MIN) | L/T (MIN) | SUBSTANTIAL L/T (MIN) | SUBSTANTIAL L/T RATIO (%) |
|---|---|---|---|---|---|---|---|
| A01 | W01 | 20 | 35 | 5 | 60 | 35 | 58 |
| A02 | W02 | 69 | 50 | 15 | 134 | 50 | 37 |
| | TOTAL | 89 | 85 | 20 | 194 | 85 | 44 |

FIG.59B

TIME DISTRIBUTION FOR DIRECTION A02

| DIRECTION NO. | PROCESS | RETENTION TIME (MIN) | PROCESSING TIME (MIN) | MOVEMENT TIME (MIN) | L/T (MIN) | SUBSTANTIAL L/T (MIN) | SUBSTANTIAL L/T RATIO (%) |
|---|---|---|---|---|---|---|---|
| A01 | W01 | 20 | 22 | 161 | 203 | 22 | 11 |
| A02 | W02 | 30 | 15 | 84 | 129 | 15 | 12 |
| | TOTAL | 50 | 37 | 245 | 332 | 37 | 11 |

| DIRECTION NO. | WORK START | WORK END | WORK PROCESS | WORKER |
|---|---|---|---|---|
| A0001 | 2006/5/10 9:00 | 2006/5/10 9:35 | W0001 | M0001 |
| A0002 | 2006/5/10 9:50 | 2006/5/10 10:40 | W0001 | M0002 |
| ⋮ | ⋮ | ⋮ | ⋮ | ⋮ |

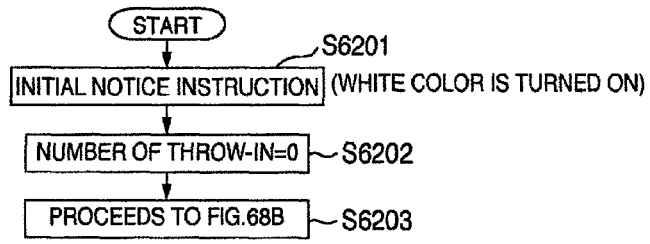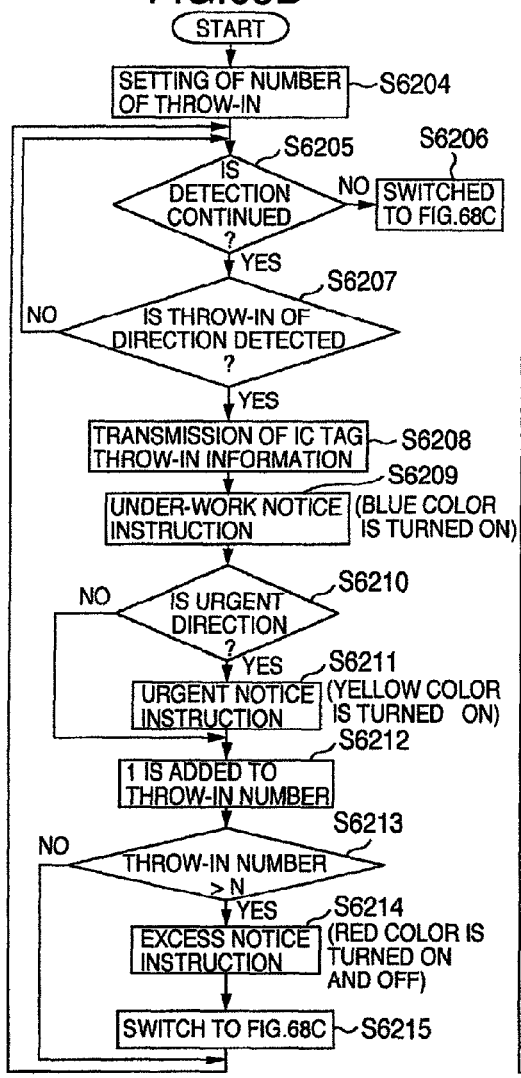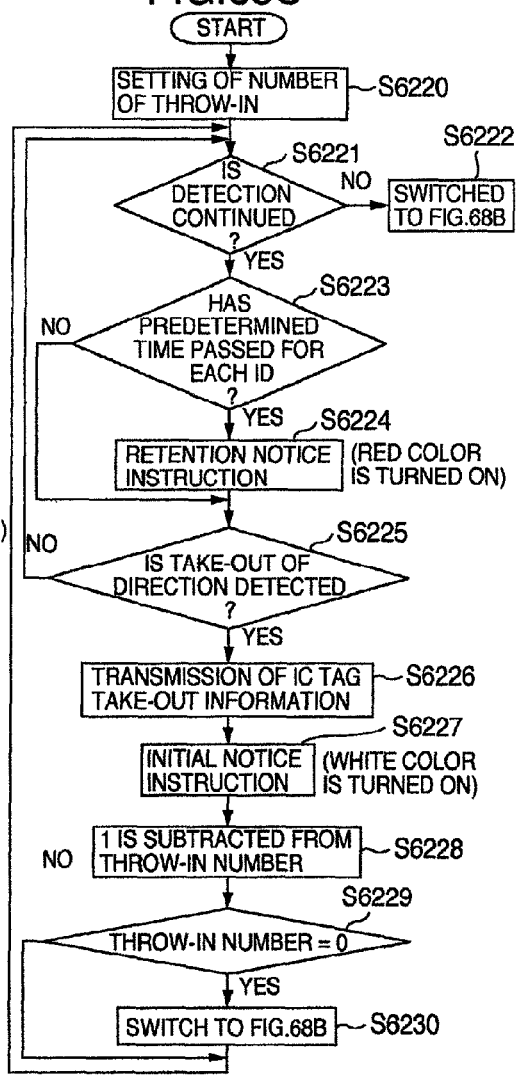

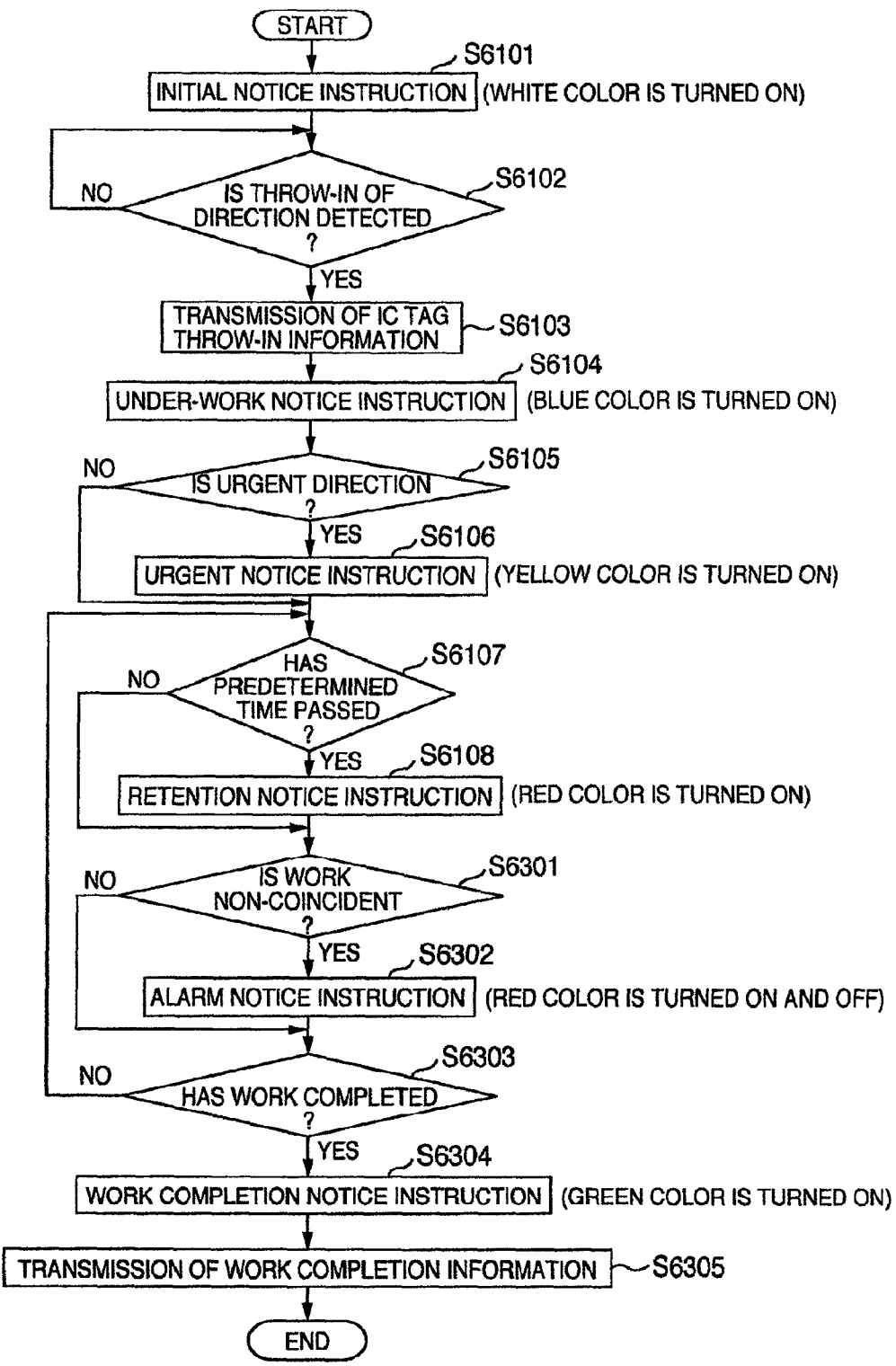

WORK MANAGEMENT APPARATUS, PICKING CARRIAGE, WORK PERFORMANCE COLLECTION SYSTEM, REWORK MEASUREMENT SYSTEM, WORKABILITY MANAGEMENT SYSTEM, REWORK MEASUREMENT MEASURING METHOD, WORK PERFORMANCE COLLECTION METHOD, WORKABILITY MANAGEMENT METHOD AND WORKABILITY MANAGEMENT PROGRAM

CROSS REFERENCE TO RELATED APPLICATION

This is a continuation of U.S. application Ser. No. 11/757,489, filed Jun. 4, 2007 now U.S. Pat. No. 8,190,282. This application relates to and claims priority from Japanese Patent Application No. 2006-160584, filed on Jun. 9, 2006; Japanese Patent Application No. 2006-160585, filed on Jun. 9, 2006; Japanese Patent Application No. 2006-160733, filed on Jun. 9, 2006; Japanese Patent Application No. 2006-174466, filed on Jun. 23, 2006; Japanese Patent Application No. 2006-174811, filed on Jun. 26, 2006 and Japanese Patent Application No. 2006-211782, filed on Aug. 3, 2006. The entirety of the contents and subject matter of all of the above is incorporated herein by reference.

BACKGROUND OF THE INVENTION

This invention relates to a work management apparatus, a picking carriage, a work performance collection system, a rework measurement system, a workability management system, a rework measurement measuring method, a work performance collection method, a workability management method and a workability management program.

To collect work performances, it has been customary in the past to input a work start and a work end from a terminal or a wireless handy terminal of a work performance collection system. According to this method, however, a worker must interrupt an assembly work so as to input work performances, and the drop of assembly efficiency and the increase of a burden to the worker are unavoidable.

As one of the methods of specifying a work time as a kind of information of the work performances, an invention of a method is known (for example, JP-A-2005-182656 (paragraphs 0023 to 0034, FIG. 1)). According to this method, a worker specification ID tag carried by a worker is read by an ID tag reader and a work object article specification ID tag for specifying a work object article is also by the ID tag reader, and after information for specifying a work area is added to the information thus read, this information is transmitted to a performance management CPU. Furthermore, information about a work time of work installation installed in each work area is transmitted by a work installation controller to the performance management CPU and the work time is specified.

When a performance cost of a production process is generally measured, the number of man-hours involved in the production can be calculated by conducting progress management of working (direction) and collecting work performances. However, there are practically a large number of cases where the number of man-hours is grasped by a human system management method using paper, etc, as instrument without making sufficient IT investment depending on scales and business results of companies.

To calculate a loss cost of each production process, a loss cost analysis system of a production process has been devised (for example, JP-A-2003-162310, paragraphs 0013 to 0040, FIG. 1). This system sets "production loss definition parameter" representing the relations between a performance cost of each production process and production performance information and between various losses and the loss cost and automatically calculates how much loss cost occurs in the performance cost on the basis of the production loss definition parameter.

To conduct work performance collection, an ordinary method that has been employed in the past inputs a work start and a work end from a terminal or a wireless handy terminal of a work performance collection system. However, this method involves the problem that the worker must interrupt an assembly work to input the work performances, and the drop of assembly efficiency and the increase of a burden to the worker are unavoidable.

A method of specifying a work time as information of the work performances is known (for example, JP-A-2005-182656 (paragraphs 0023 to 0034, FIG. 1)). According to this method, a worker specification IC tag carried by a worker is read by an IC tag reading apparatus and a work object article specification IC tag for specifying a work object article is also by the IC tag reading apparatus, and after information for specifying a work area is added to the information read, this information is transmitted to a performance management CPU. Furthermore, information about a work time of work installation installed in each work area is transmitted by a work installation controller to the performance management CPU and the work time is specified.

When articles are produced or processed (hereinafter called "production"), attempts have been made so far to manage traceability information of components mounted to the produced articles or processed articles (hereinafter called "products") in such a fashion as to correspond to identification information of the products, to look up the traceability information on the basis of the identification information stored in an IC tag attached to the product when any trouble occurs in the products and to clarify when and where the products are produced (for example, JP-A-2005-35327(paragraphs 0015 to 0016, FIGS. 1 and 2).

A so-called "mass production system" for mass producing products at once has to this date been employed widely. The mass production system is effective for reducing the cost per unit number of products but is not free from the problem that when the number of sales is smaller than the number expected, a large number of products will be kept as dead stock in the warehouse and that discovery and elimination of various wastes (such as variance of the work time per each process) occurring in a plurality of process steps cannot be made.

Recently, a so-called "JIT (Just In Time) production system" that provides a necessary number of necessary products to necessary places has become more and more popular. According to this JIT production system, the problem of a large number of products in stock does not occur. However, because the JIT production system has lower production efficiency than the mass production system, it is necessary to eliminate various wastes in production and to raise production efficiency.

A technology for managing a work time has been disclosed in JP-A-2005-182656, for example. According to this technology, a worker specification ID tag carried by a worker and a work object specification ID tag for specifying a work object article are read by an ID tag reader, and the information so read, information for specifying a work area and operation information of work installation of the work area are transmitted to a work performance management CPU for the management of the work time.

When work management is made, a work start and a work end are ordinarily inputted from a terminal or a wireless handy terminal of a work performance collection system.

As a method of specifying a work time as one of the factors of work management, a technology for managing the work time has been disclosed (for example, JP-A-2005-182656, (paragraphs 0023 to 0034, FIG. 1)). In this technology, a worker specification ID (identification) tag carried by a worker and a work object specification ID tag for specifying a work object article are read by an ID (IC (Integrated Circuit)) tag reader, and the information so read, information for specifying a work area and operation information of work installation of the work area are transmitted to a work performance management CPU for the management of the work time.

SUMMARY OF THE INVENTION

The ID tag reader of the prior art described above is a reading apparatus that is installed in the work area and covers a broad range of this work area into which the work object articles are carried. Because the ID tag reader reads all the ID tags existing in the work area, it reads a large number of information such as the ID tags for traceability management of components other than the worker specification ID tag and the work object article specification ID tags necessary for the work management, and may invite erroneous operations. Work time information of work installation installed in each work area must be transmitted by a work installation controller of the work installation to the performance management CPU. However, the work time information cannot be transmitted in the assembly process that is mainly directed to fitting without the work installation.

According to the prior art technology described above, the loss occurring in each production process such as the time for a rework process (counter-plan for defect), the number of times of reworks, etc, is inputted from a terminal but from the aspect of practical operation, accuracy of the time and the number of times of works that are inputted from the terminal is inadequate and ambiguous in many cases. Therefore, a worker for analyzing the loss cost fails to calculate a sufficient management index and to expand company profit even when the worker calculates the loss amount of the rework loss on the basis of the incorrect input information.

The IC tag reading apparatus of the prior art described above is the reader that is installed in the work area and covers a broad range of the work area into which the work object articles are carried. Because the IC tag reading apparatus reads all the IC tags existing in the work area, it reads a large number of information such as the ID tags for traceability management of components other than the worker specification ID tag and the work object article specification ID tags necessary for the work management, and may invite erroneous operations. Work time information of work installation installed in each work area must be transmitted by the work installation controller of the work installation to the performance management CPU. However, the work time information cannot be transmitted in the assembly process that is mainly directed to fitting without the work installation.

Resources used for producing products such as metal molds, various tools and apparatuses, and so forth, undergo change with time and affect defects of the products produced. In the case of the metal mold, for example, maintenance is carried out in a predetermined cycle designated by a manufacturer of the mold. Because the maintenance is conducted in the designated cycle, the possibility of the occurrence of product defect becomes high even if a greater number of molds than the number designated by the mold manufacturer are used. Because maintenance is conducted in the designated cycle, maintenance is made a greater number of times than the number assumed mold manufacturer even if a smaller number of molds are used. In the former case, the products must be produced over again or the defective products must be corrected. In the latter case, the maintenance cost becomes higher than necessary. In either case, the loss cost of the products increases.

The method using the terminal or the wireless handy terminal of the work performance collection system is not free from the problem that the worker must interrupt working to input the work performance and the drop of assembly efficiency and the increase of the burden to the worker are inevitable.

When a plurality of worker specification ID tags exits in one work area in the prior art technology, it is not possible to correctly grasp what time is necessary for which work.

The IC tag reading apparatus of the prior art described above is the reader that is installed in the work area and covers a broad range of the work area into which the work object articles are carried. Because the IC tag reading apparatus reads all the IC tags existing in the work area, it reads a large number of information such as the IC tags for traceability management of components other than the worker specification IC tag and the work object article specification IC tags necessary for the work management, and may invite erroneous operations. To grasp the progress of working in the work area, it is necessary at present to analyze movement information of work installation by using the performance management CPU.

It is therefore an object of the present invention to provide a work performance collection system that solves at least one of the problems described above and reliably collects information of work performances without applying a burden to a worker in assembly of work object articles.

Alternatively, it is another object of the invention to provide a rework measurement system and a measurement method thereof that can measure work performances of a rework process (defect counter-plan work) occurring in a production process without constituting a work performance collection system (IT system) directed to all the processes of the production process.

Alternatively, it is another object of the invention to provide a work performance collection system and a work performance collection system for reliably collecting information of work performances without applying a burden to a worker in assembly of work object articles.

Alternatively, it is another object of the invention to make it possible to manufacture normal products by managing workability from work history of resources such as a metal mold, selecting the resources to be used in accordance with the workability and suppressing a loss cost resulting from the resources.

Alternatively, it is another object of the invention to solve the problems described above and to manage the time for each of works divided into a plurality of work processes.

Alternatively, it is another object of the invention to provide a work management apparatus, a work management system, a work management method and a picking carriage each capable of easily grasping the progress of working.

To accomplish at least one of the objects described above, the construction employed by the invention includes a work specification ID tag into which information for specifying a work content of a work object article is written, a work management box having a throw-in port into which the work specification ID tag is thrown at the time of working, and an ID tag reader provided to a side surface of the work management box, for reading the work specification ID tag and transmitting the information read to a work performance management apparatus. According to this construction, a worker is required only to throw the work specification ID tag into the work management box at the start of working and to take out the work specification ID tag from the work management box at the end of working.

A rework measurement system includes a direction issuance unit for issuing a direction of a rework when a rework process for reworking a product occurs in a production process of the product, an input unit for registering performances of the rework, a database for managing performance information of the rework and a retrieval unit for retrieving the database in accordance with each monitor item for monitoring the rework performance information. According to such a construction, it is possible to visualize a loss cost occurring besides a standard prime cost by measuring work performance of a rework process (defect counter-plan work) occurring inside a production process without constituting a work performance collection system (IT system) directed to all the processes of a production process and to promote the counter-plan measures against the occurrence causes of the loss cost (that is, quality improvement activities).

Alternatively, the input unit for inputting the work performances has an IC tag reading apparatus for reading a work specification IC tag into which information for specifying work content is written, and transmitting the information read to the database. The IC tag reading apparatus transmits information to the database when communication can be made with the work specification IC tag and also transmits information to the database when communication with the work specification IC tag is disconnected. The database registers the time contained in the information transmitted when the communication can be made, or the time of reception of the information, as communication start information, and also registers the time contained in the information transmitted when the communication is disconnected or the time of reception of the information as communication end time.

Further, the input unit includes a work management box having a throw-in port into which the work specification IC tag is thrown, and the IC tag reading apparatus reads the work specification IC tag thrown into the work management box. According to this construction, a worker is required to only throw the work specification IC tag into the work management box at the start of working and to take out the work specification IC tag from the work management box at the end of working. Even when the worker takes out the work specification IC tag at an intermediate stage of working, a substantial work time can be collected because the throw-in time of the work specification IC tag and its take-out time are stored in the database.

Alternatively, for solving the problems described above, the invention provides a workability management system for storing work history of a resource for processing a work as work history information and managing workability of the resource for estimating a change with time of workability of the resource, the system executing the steps of storing resource identification information for identifying the resource and the work history information described above in association with each other in a storage medium; extracting the work history information corresponding to the resource identification information from the storage medium when a change occurs in the work history information; updating a change content and storing it into the storage medium; extracting the work history information corresponding to the resource identification information of the resource when workability of the resource is judged, from the storage medium, and creating information about the change with time from the work history information extracted; and judging workability of the resource by the information.

Alternatively, a work management system according to the invention includes an information processing unit having a processing unit and a storage portion, a first putting place to which a worker of a preceding work process puts an IC tag, a first reader provided to the first putting place, a second putting place to which the worker in the work space puts the IC tag during working, and a second reader provided to the second putting place.

The processing unit stores the information received from the first and second readers in the storage portion and manages the time about the work.

This also holds true of a work management method.

Alternatively, a work management apparatus includes an IC tag reading unit (such as an IC tag reader/writer) arranged in a putting place (such as work management box) to which an IC tag into which information for specifying a work content is written is put, for detecting an IC tag put in the putting place and reading its information; a work progress judgment unit (such as control portion) for judging the progress of working on the basis of read information of the IC tag reading unit; and a notification unit (such as LED lamp) for notifying the progress of working in accordance with instruction of the work progress judgment unit.

According to such a construction, the worker is required to only put the IC tag into the putting place at the start of working and to only take out the IC tag from the putting place at the end of working. In addition, the worker can know at a glance the progress of working in the work area because the work progress notification unit displays the conditions such as under-working, work retention, work completion or urgent work.

According to the invention, it is possible to reliably collect the information of work performances without applying a burden to the worker during assembly of the work object articles.

According to the invention, it is further possible to measure the work performances of the rework process (defect counter-plan work) occurring in the production process.

According to the invention, it is further possible to reliably collect the information of work performances without applying a burden to the worker during assembly of the work object articles.

According to the invention, it is further possible to manage workability from work history of a resource such as a metal mold, etc, to select the resource used in accordance with workability and to produce normal products while suppressing the loss cost originating from the resource.

According to the invention, it is further possible to manage the time for each working about working divided into a plurality of work processes.

According to the invention, it is further possible to easily grasp the progress of working.

Other objects, features and advantages of the invention will become more apparent from the following description of the embodiments of the invention taken in conjunction with the accompanying drawings.

BRIEF DESCRIPTION OF THE DRAWINGS

FIG. 5 is a structural view showing a work performance collection system according to a second embodiment of the invention;

FIG. 7 is a structural view showing a work performance collection system according to a third embodiment of the invention;

FIGS. 8A to 8C are explanatory views each showing another work performance collection data recorded to the work management recording portion;

FIG. 9 is an explanatory view showing an example of a result of the work performance collection;

FIG. 10 is an explanatory view showing an example of a display picture window of a display device during working;

FIG. 16 is an explanatory view showing an example of an input picture window of a rework direction issuance terminal;

FIGS. 17A and 17B are explanatory views each showing an example of a rework direction list and a rework direction work performance list;

FIG. 18 is a flowchart showing a storage procedure of measurement data of a rework process;

FIG. 19 is an explanatory view showing an example of a rework loss cost list;

FIG. 22 is an explanatory view showing an example of an input picture window of a direction issuance terminal;

FIG. 25 is an explanatory view showing an example of the work performance collection data;

FIG. 26 is an explanatory view showing an example of a result of the work performance collection;

FIG. 33 is a table useful for explaining mold detailed information;

FIG. 34 is a table useful for explaining mold warehousing information;

FIG. 35 is a table useful for explaining material information (BOM);

FIG. 36 is a table useful for explaining direction information (production instruction information);

FIG. 37 is a table useful for explaining molding machine setting information;

FIG. 38 is a table useful for explaining mold movement information;

FIG. 39 is a table useful for explaining mold history management information;

FIG. 40 is a table useful for explaining traceability information of molds for each direction;

FIG. 41 is a table useful for explaining product defect information;

FIG. 42 is a table useful for explaining leveling rule information;

FIGS. 52A to 52D are explanatory views showing examples of information submission;

FIG. 56A is a diagram showing an example of work performance of a step W01;

FIG. 56B is a diagram showing an example of work performance of a step W02;

FIG. 59A is a table showing a time distribution of a work of a direction A01;

FIG. 59B is a table showing a time distribution of a work of a direction A02;

FIGS. 68A to 68C are flowcharts each showing a display procedure of a work progress of the work management apparatus in the second embodiment;

FIG. 70 is a flowchart showing a display procedure of a work progress of the work management apparatus in the third embodiment.

DETAILED DESCRIPTION OF THE EMBODIMENTS

Preferred embodiments of the invention will be hereinafter explained with reference to the accompanying drawings.

First Embodiment

Figure 1:
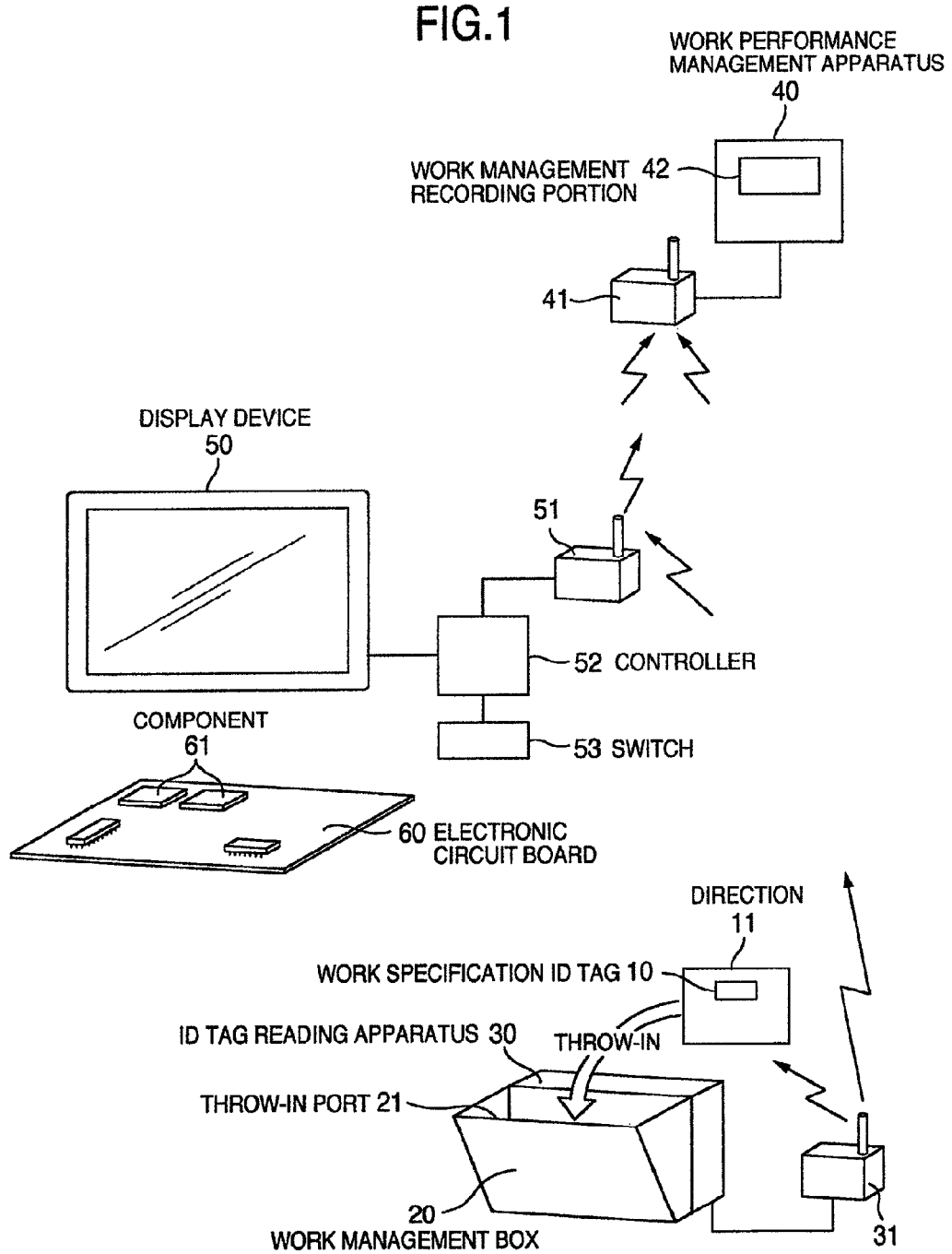
FIG. 1 is a structural view showing a work performance collection system according to a first embodiment of the invention.

FIG. 1 is a structural view showing a work performance collection system according to the first embodiment of the invention. The work performance collection system includes a work specification ID tag 10 to which information for specifying a work content of a work object article is written, a work management box 20 having a throw-in port 21 into which the work specification ID tag 10 is thrown at the time of working, and an ID tag reader 30 mounted to a side surface of the work management box 20, for reading the work specification ID tag 10 and transmitting the information so read to a work performance management apparatus 40. The work content is hereby an assembly process for mounting components 61 to an electronic circuit board 60 by way of example.

A non-contact type wireless ID tag 10 such as an RFID (Radio Frequency Identification) is used for the work specification ID tag 10. The work specification ID tag 10 is attached to a document of directions 11 describing a work process. Information for specifying a work content of a work object article is stored in the work specification ID tag 10 and examples of the information include a work order No., names or model names of products or semi-finished products to be produced and the number to be produced. Detailed information of the information specifying the work content of the work object article includes instruction information when a worker mounts the components 61 to the electronic circuit board 60. Concretely, the direction information includes the kinds of the components 61, the number of the components and a mounting sequence of the components. The direction 11 is a document describing corresponding assembly processes by the workers. More concretely, various kinds of components 61 exist among the components to be mounted to the electronic circuit board 60, and the direction 11 describes routes of process steps for manufacturing one electronic circuit board 60. For example, the process steps include a CPU step, a CPU peripheral component step, a power source step and an I/O interface step. The worker is able to judge the route of the assembly process from the direction 11.

A work management box 20 is the box into which the worker throws at the start of work the direction 11 attached to the electronic circuit board 60 to be assembled. After completing the assembly process of the electronic circuit board 60, the worker takes out the direction 11 from the work management box 20, attaches the direction 11 taken out to the electronic circuit board 60 and delivers it to the next assembly process.

The ID tag reader 30 confirms the communication with the work specification ID tag 10 when the direction 11 is thrown into the work management box 20, reads the information of the work specification ID tag 10 attached to the direction 11 and transmits communication start information with the work specification ID tag 10 and information for specifying the work content of the work object article from communication equipment 31 for wireless LAN to a work performance management apparatus 40. Examples of the communication start information include an ID of the work management box 20 and a work start time. Examples of the information for specifying the work content of the work object article include a work order No., names or type number of products/semi-finished products to be produced and the production number. When the direction 11 is taken out from the work management box 20, the ID tag reader 30 confirms disconnection of the communication with the work specification ID tag 10 and then transmits communication end information with the work specification ID tag 10 and information for specifying the work content of the work object article from the communication equipment 31 for wireless LAN to the work performance management apparatus 40. The communication end information includes the ID of the work management box 20 and the work end time. Examples of the information for specifying the work content of the work object article includes the work order No., the names or type number of the products/semi-finished products to be manufactured and their number.

The ID tag reader 30 transmits the information for specifying the work content of the work object article to a controller 52 that is installed in an assembly work area. The ID tag reader 30 hereby transmits the information for specifying the work content of the work object article to the controller 52 but transmission may well be made from the work performance management apparatus 40 to the controller 52.

The controller 52 displays the information for specifying the work content of the work object article received by the communication equipment 51 for wireless LAN on a display device 50. Information for specifying the work content of the work object article describes indication information for the worker when mounting the components 61 to the electronic circuit board 60 and concrete examples are the kinds and numbers of the components 61 and their mounting sequence.

The controller 52 displays the kinds and numbers of the components 61 mounted to the electronic circuit board 60 on the display device 50. The worker confirms the display content and takes out the corresponding component 61 from a parts box 72 (see FIG. 2) and mounts it to the electronic circuit board 60. After mounting is complete, the worker pushes a switch 53 of the controller 52. Then, the controller 52 transmits the information of the electronic circuit board 60 of the assembly process, the information of the components mounted and mounting end information to the work performance management apparatus 40 through the communication equipment 51. When receiving the signal of the switch 53, the controller 52 displays the kinds and numbers of the components 61 to be next mounted to the electronic circuit board 60 on the display device 50. The controller 50 thereafter transmits similarly the information of the electronic circuit board 60 of the assembly process, the information of the mounted components and the mounting end information.

Here, the mounting end information is transmitted to the work performance management apparatus 40 after mounting of each component is complete but this information may also be transmitted after all the assembly processes in one work area are complete. In this case, the mounting end information contains the time information (time stamp) and matching is preferably established between throw-in and take-out time of the direction 11 into and from the work management box 20.

Receiving the information from the ID tag reader 30 through the communication equipment 41 for wireless LAN, that is, the communication start information, the information for specifying the work content of the work object article and the communication end information, the work performance management apparatus 40 records the information to the work management recording portion 42. Receiving the information from the ID tag reader 30 through the communication equipment 51 for wireless LAN, that is, the information of the electronic circuit board 60 in the assembly process, the information of the mounted components and the mounting end information, the work performance management apparatus 40 records the information to the work management recording portion 42. The time information (time stamp) is added to and recorded with the information received. The work performance management apparatus 40 can manage the work time in accordance with the work content from the information of the work management recording portion 42.

Figure 2:
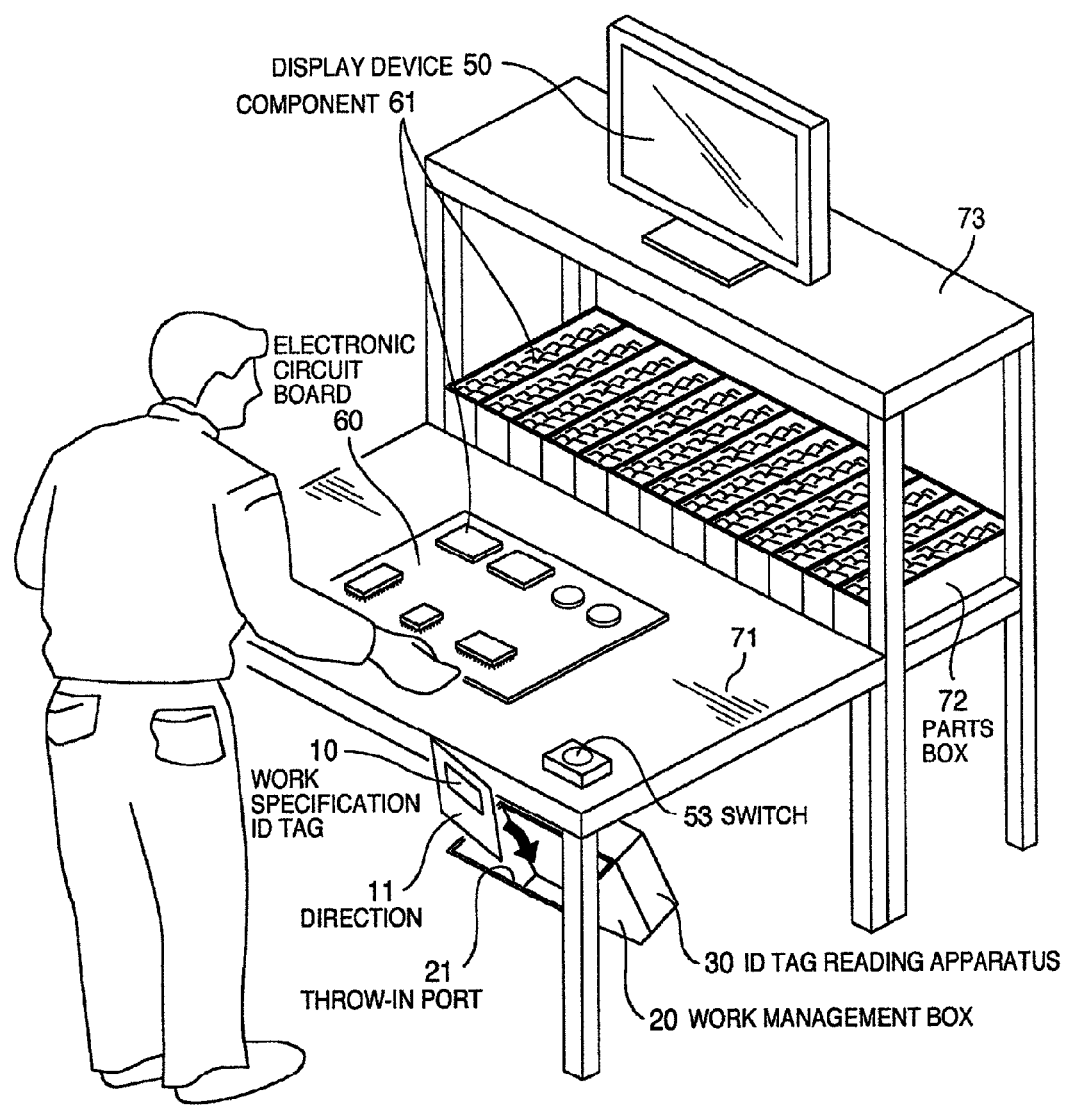
FIG. 2 is an appearance perspective view showing an example of a work bench of a work area.

FIG. 2 is an appearance perspective view showing an example of a work bench of the work area. The work management box 20 is arranged below the work bench 71 and is inclined forward in the drawing so that the worker can easily throw the direction 11 at the start of work and take it out at the end of work. Consequently, the worker can easily confirm the existence of the direction 11 inside the work management box 20. Incidentally, the throw-in port 21 of the work management box 20 preferably faces upward substantially in a vertical direction. The installation area of the work management box 20 can thus be minimized.

The upper portion of the work bench 71 is the assembly work area of the electronic circuit board 60. A plurality of parts boxes 72 are installed in front of the worker. The display device 50 is installed on a work auxiliary bench 73. The worker takes out the component 61 from the part box 72 in accordance with the direction of assembly displayed on the display device 50, mounts it to the electronic circuit board 60 and pushes a switch 53 positioned at a corner of the upper surface of the work bench 71 after the mounting work is complete to finish one work.

Next, the operation will be explained with reference to FIGS. 3 and 4.

Figure 3:
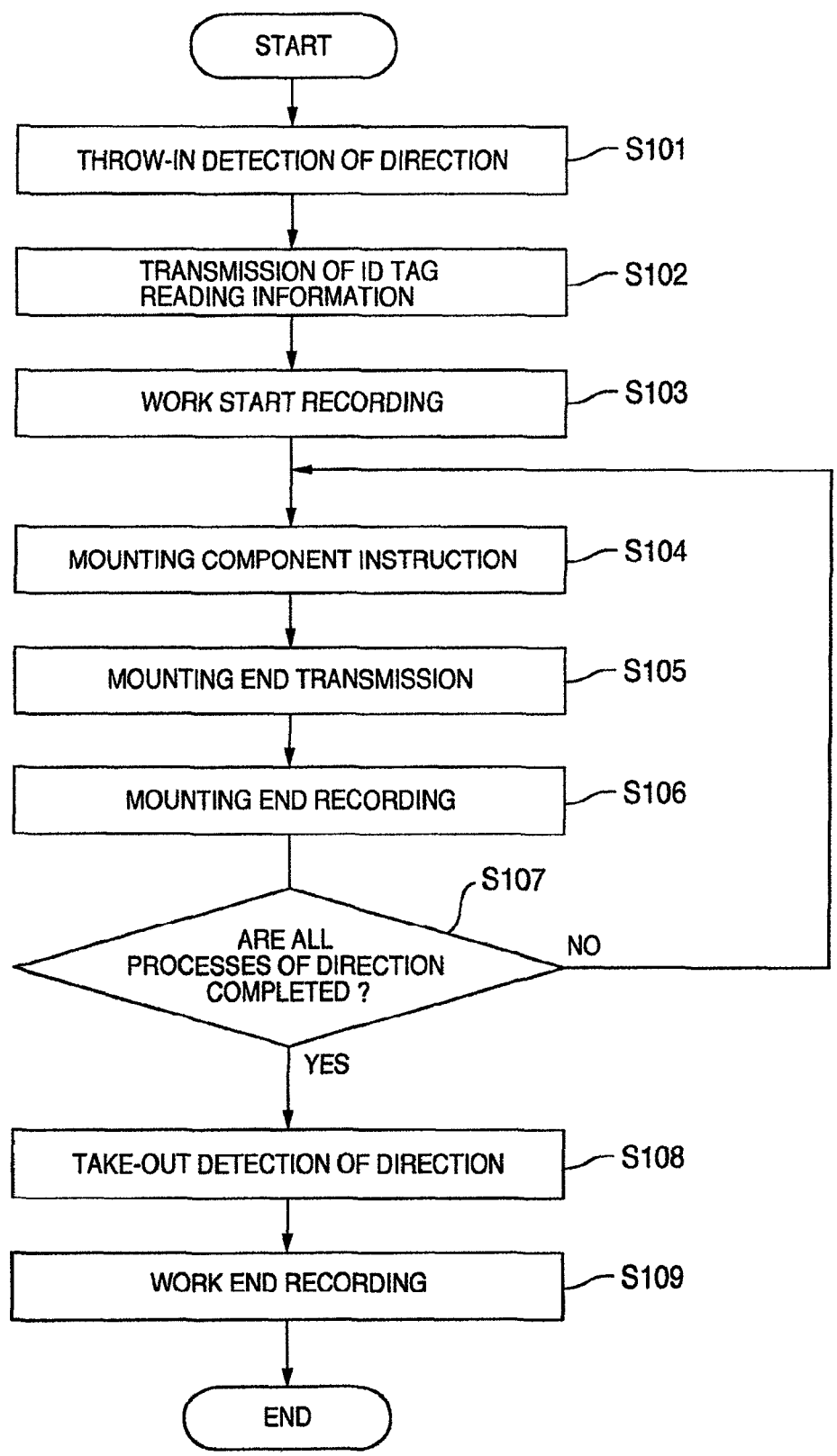
FIG. 3 is a flowchart showing the procedure of the work performance collection system.

FIG. 3 is a flowchart showing the procedure of the work performance collection system. Receiving the electronic circuit board 60 to which the direction 11 is attached, the worker throws the direction 11 into the throw-in port 21 of the work management box 20 installed below the work bench 71. Then, a radio wave containing a control signal is transmitted from an antenna (not shown in the drawings) inside the ID tag reader 30. An antenna inside the work specification ID tag 10 receives the radio wave from the ID tag reader 30 and generates electric power owing to the resonance of the antennas. The electric power so generated actuates the circuit inside the work specification ID tag 10 and executes a necessary processing. The result of this processing is transmitted from the antenna on the side of the work specification ID tag 10. The antenna of the ID tag reader 30 receives the radio wave and detects throw-in of the direction 11 (step S101).

The ID tag reader 30 reads the information of the work specification ID tag 10 detected and transmits the communication start signal with the work specification ID tag 10 and the information for specifying the work content of the work object article from the communication equipment 31 for wireless LAN to the work performance management apparatus 40 (step S102). The ID tag reader 30 also transmits the information for specifying the work content of the work object article to the controller 52 installed in the assembly work area.

The work performance management area 40 records the communication start information with the work specification ID tag 10 received and the information for specifying the work content of the work object article to the work management recording portion 42. The time information (time stamp) is added to the information received at this time and is recorded (step S103).

The controller 52 displays the information for specifying the work content of the work object article received by the communication equipment 51 for wireless LAN on the display device 50 and instructs the mounting component to the worker (step S104).

When detecting the push of the switch 53, the controller 52 transmits the assembly process information (A0001 in FIG. 4, for example), the information of the component mounted (B001 in FIG. 4, for example) and the mounting end information to the work performance management apparatus 40 through the communication equipment 51 (step S105). The work performance management apparatus 40 adds the time information (time stamp) to the information received and records it to the work management recording portion 42 (step S106).

The controller 52 judges whether or not all the processes of the direction 11 are completed (step S107). When all the processes are not yet completed, the flow returns to the step S104. When they are completed, the flow proceeds to the step S108.

The ID tag reader 30 executes communication with the work specification ID tag 10 in a predetermined interval. When the communication in the predetermined interval cannot be confirmed, the ID tag reader 30 detects take-out of the direction 11 by the worker from the throw-in port 21 of the work management box 20 (step S108). The ID tag reader 30 transmits the communication end information with the work specification ID tag 10 from the communication equipment 31 for wireless LAN to the work performance management apparatus 40.

The work performance management apparatus 40 receives the communication end information and the information for specifying the work content of the work object article from the ID tag reader 30 and then adds the time information (time stamp) to the information received and records it to the work management recording portion 42 (step S109). In consequence, a series of procedures of the work collection are completed.

Figure 4:
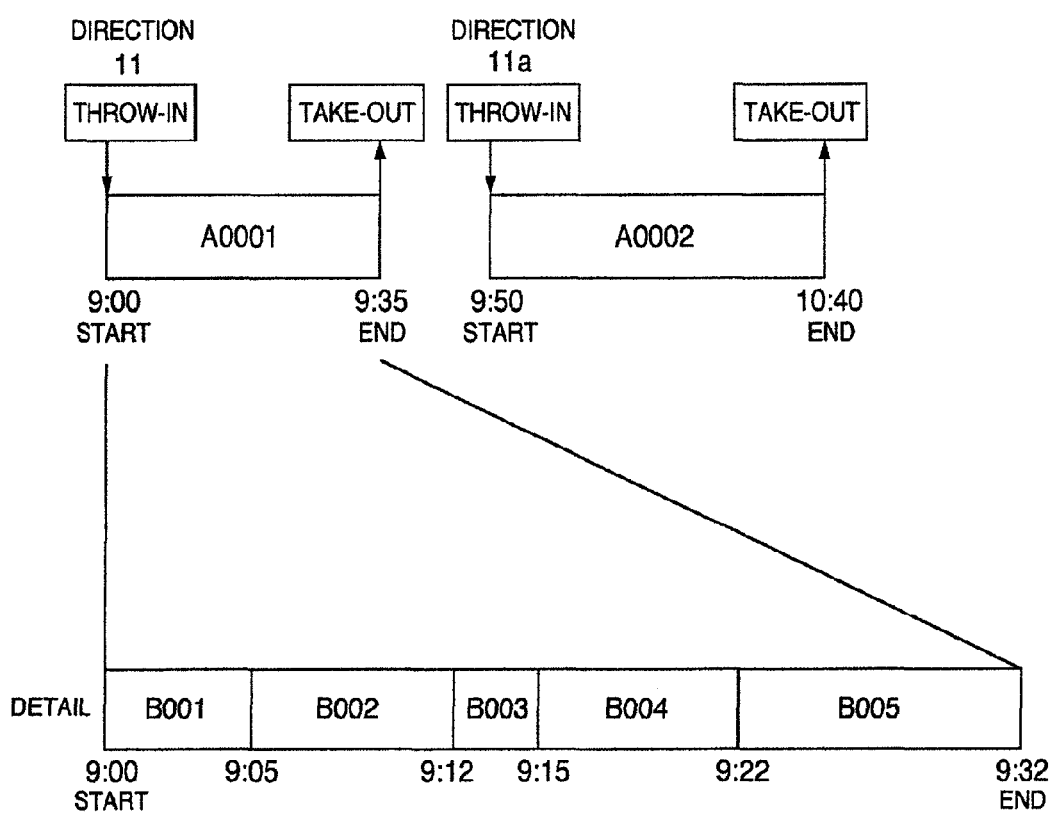
FIG. 4 is an explanatory view useful for explaining work performance collection data recorded to a work management recording portion.

FIG. 4 is an explanatory view useful for explaining the work performance collection data recorded to the work management recording portion. The work content A0001 starts working at a time 9:00 when the direction 11 is thrown into the work management box 20, and finishes working at 9:35 when the direction 11 is taken out from the work management box 20. The assembly step of the work content A0002 starts working at 9:50 when another direction 11a is thrown into the work management box 20 and finishes working at 10:40 when the direction 11a is taken out from the work management box 20.

The detail of the work content A0001 is recorded for each component mounting step to the work management recording portion 42. For example, mounting of the component B001 is completed at 9:05, mounting of the component B002 is complete at 9:12, mounting of the component B003 is completed at 9:15, mounting of the component B004 is completed at 9:22 and mounting of the component B005 is completed at 9:32. The time from 9:32 to 9:35 is regarded as the time for inspection of the work content and the time for removing jigs of the work content, and so forth.

This embodiment employs the work specification ID tag 10 into which the information for specifying the work content of the work object article is written, the work management box 20 having the throw-in port into which the work specification ID tag 10 is thrown at the time of working and the ID tag reader 30 for reading the work specification ID tag 10 and transmitting the information read to the work performance management apparatus 40. Therefore, the worker is required to only throw the work specification ID tag 10 into the work management box 20 at the start of working and to only take out the work specification ID tag 10 from the work management box 20 at the end of working.

Second Embodiment

FIG. 5 is a structural view showing a work performance collection system according to the second embodiment of the invention. The construction shown in FIG. 5 is prepared by adding a worker specification ID tag 80 into which information for specifying a worker is written is added to the work management box 20 of the construction shown in FIG. 1. An employee ID 81 of the worker is attached to the worker specification ID tag 80 and is thrown at the start of working together with the direction 11 having the work specification ID tag 10. Incidentally, the explanation of the same portion as that of the construction shown in FIG. 1 will be omitted.

When the employee ID 81 is thrown into the work management box 20, the ID tag reader 30 first confirms the communication with the worker specification ID tag 80, then reads the information of the worker specification ID tag 80 attached to the employee ID 81 and transmits the communication start information with the worker specification ID tag 80 and the information for specifying the worker (MM0001 in FIG. 6, for example) from the communication equipment 31 for wireless LAN to the work performance management apparatus 40. Examples of the communication start information are the ID of the work management box 20 and the work start time. When the employee ID 81 is taken out from the work management box 20, the ID tag reader 30 confirms disconnection of the communication with the worker specification ID tag 80 and then transmits the communication end information with the worker specification ID tag 80 and the information for specifying the worker from the communication equipment 31 for wireless LAN to the work performance management apparatus 40. Examples of the communication end information are the ID of the work management box 20 and the work end time.

The work performance management apparatus 40 receives the communication start information with the worker specification ID tag 80 and the information for specifying the worker from the ID tag reader 30 through the communication equipment 41 for wireless LAN and records the information to the work management recording portion 42. The time information (time stamp) is attached to the information received and is recorded. The work performance management apparatus 40 can manage the work time for each worker from the information of the work management recording portion 42.

Figure 6A:
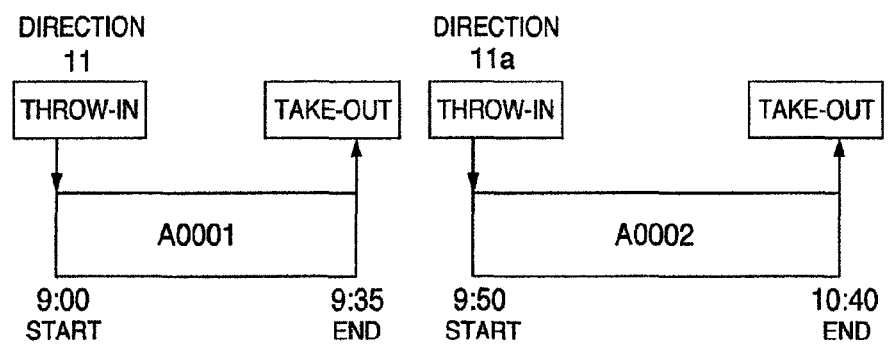
FIGS. 6A and 6B are explanatory views each showing another work performance collection data recorded to the work management recording portion.
Figure 6B:
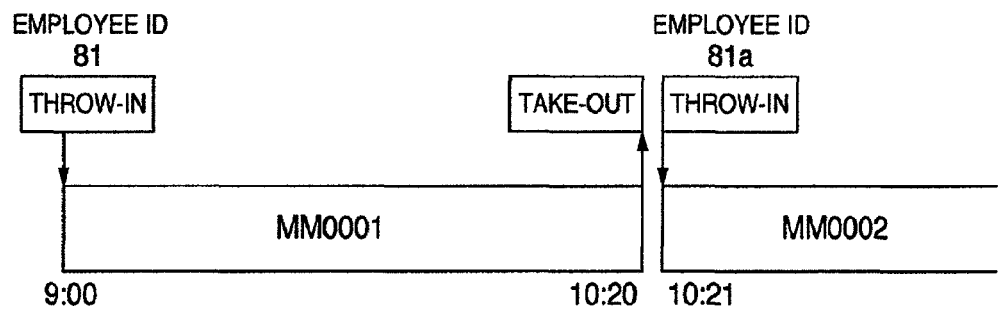

FIGS. 6A and 6B are explanatory views each showing other work performance collection data recorded to the work management recording portion. In comparison with FIG. 4, the information of the worker is added. The worker MM0001 starts working at 9:00 when the employee ID 81 is thrown into the work management box 20 and finishes working at 10:20 when the employee ID 81 is taken out from the work management box 20. The worker MM0002 starts working at 10:21 when the employee ID 81a is thrown into the work management box 20. It is thus possible to know that the worker takes turns during the work content A0002.

This embodiment employs the work specification ID tag 10 into which the information for specifying the work content of the work object article is written, the worker specification ID tag 80 into which the information for specifying the worker is written, the work management box 20 having the throw-in port 21 into which the work specification ID tag 10 and the worker specification ID tag 80 are thrown at the time of working and the ID tag reader 30 provided to a side surface of the work management box 20, for reading the work specification ID tag 10 and the worker specification ID tag 80 and transmitting the information read to the work performance management apparatus 40. Therefore, the worker is required to only throw the work specification ID tag 10 and the worker specification ID tag 80 into the work management box 20 at the start of working and to only take out the work specification ID tag 10 and the worker specification ID tag 80 from the work management box 20 at the end of working.

Third Embodiment

FIG. 7 is a structural view showing a work performance collection system according to the third embodiment of the invention. The construction shown in FIG. 7 is prepared by adding a process identification ID tag 90 into which information for specifying a work process of a work object article is written is added to the work management box 20 of the construction shown in FIG. 5. The third embodiment shown in FIG. 7 further employs the process specification ID tag 90 into which the information for specifying the work process of the work object article in FIG. 5 is written in combination with the work specification ID tag 10 and the worker specification ID tag 80 and represents the method of collecting the work performances by throwing and taking these tags into and out from the work management box 20. Incidentally, the explanation on the same portion as that of FIG. 5 will be omitted.

The process specification ID tag 90 stores the data for specifying the route of the processes described in the direction 11 represented in the first embodiment. Concretely, the components to be mounted to the electronic circuit board 60 include various kinds of components 61 and there are process routes for fabricating one electronic circuit board 60. Examples of the routes of the processes include a CPU process, a CPU peripheral component process, a power source process and an I/O interface process.

When the process specification ID tag 90 is thrown, the ID tag reader 30 confirms the communication with the process specification ID tag 90, then reads the information of the process specification ID tag 90 and transmits the communication start information with the process specification ID tag 90 and the process specification information (W0001 in FIG. 8, for example) from the communication equipment 31 for wireless LAN to the work performance management apparatus 40. The communication start information is the ID of the work management box 20 or the work start time, for example. When the process specification ID tag 90 is taken out from the work management box 20, the ID tag reader 30 confirms disconnection of the communication with the process specification ID tag 90 and transmits the communication end information with the process specification ID tag 90 and the information for specifying the process from the equipment 31 for wireless LAN to the work performance management apparatus 40. The communication end information is the ID of the work management box 20 or the work end time, for example.

When receiving the communication start information with the process specification ID tag 90 and the information for specifying the processes from the ID tag reader 30 through the communication equipment 41 for wireless LAN, the work performance management apparatus 40 records the information to the work management recording portion 42. After added to the information received, the time information (time stamp) is stored. The work performance management apparatus 40 can manage the work time per each work content based on information from the work management recording portion 42.

FIGS. 8A, 8B and 8C are explanatory views each showing another work performance collection data recorded to the work management recording portion. In comparison with FIGS. 6A and 6B, the information of the work step is added in FIGS. 8A, 8B and 8C. The work process W0001 starts working at 9:00 when the process specification ID tag 90 is thrown into the work management box 20 and finishes working at 10:40 when the process specification ID tag 90 is taken out from the work management box 20.

The worker MM0001 starts working at 9:00 when the employee ID 81 is thrown into the work management box 20 and finishes working at 9:40 when the employee ID 81 is taken out from the work management box 20. The worker MM0002 starts working at 9:45 when the employee ID 81a is thrown into the work management box 20 and finishes working at 10:45 when the employee ID 81a is taken out from the work management box 20.

FIG. 9 is an explanatory view showing an example of the work performance collection result. In the work management recording portion 42, information about direction No., work start, work end, work process and worker is recorded as collection parameters of the work performance. It can be appreciated from FIG. 9 that working of the work content A0001 as one of the entire work process W00001, for example, is started by the worker MM0001 at 9:00 on May 10, 2006 and is completed at 9:35. It can also be appreciated that working of the work content A0002 is started by the worker MM0002 at 9:50 on May 10, 2006 and is finished at 10:40.

FIG. 10 is an explanatory view showing an example of a picture window of the display device during working. Direction No. 54, direction content 54a (inclusive of models of products/semi-finished products to be produced, names and numbers), assembly direction information 54b, process ID 55, worker ID 56, finished-products number 57, work start/work end time 58 and detailed work time 59 are displayed on the picture window of the display device 50. Information for specifying the work content of the work object article of the work specification ID tag 10 (A0001 in FIG. 8A, for example) and its detailed information are displayed on the direction number 54, the direction content 54a and the assembly direction information 54b. Information for specifying the process specification ID tag 90 (W0001 in FIG. 8B, for example) is displayed on the process ID 55. Information for specifying the worker in the worker specification ID tag 60 (MM001 in FIG. 8C, for example) is displayed on the worker ID56.

The throw-in time of the work specification ID tag 10 into the work management box is displayed on the work start/work end time 58. The number of products finished among one lot is displayed on the finished-products number 57. The controller 52 displays the number of finished products when the procedure of the assembly direction information 54b is fully completed. The end time of each procedure is displayed on the detailed work time 59 and the controller 52 displays the time at which the switch 53 (see FIG. 2) is pushed. The worker can conduct working while confirming the procedure in accordance with the direction of the work content displayed on the picture window 50.

This embodiment employs the work specification ID tag 10 into which the information for specifying the work content of the work object article is written, the process specification ID tag 90 into which the information for specifying the work process of the work object article is written, the worker specification ID tag 80 into which the information for specifying the worker is written, the work management box 20 having the throw-in port 21 into which the work specification ID tag 10, the process specification ID tag 90 and the worker specification ID tag 80 are thrown at the time of working and the ID tag reader 30 provided to a side surface of the work management box 20, for reading the work specification ID tag 10, the process specification ID tag 90 and the worker specification ID tag 80 and transmitting the information read to the work performance management apparatus 40. Therefore, the worker is required to only throw the work specification ID tag 10, the process specification ID tag 90 and the worker specification ID tag 80 into the work management box 20 at the start of working and to only take out the work specification ID tag 10, the process specification ID tag 90 and the worker specification ID tag 80 from the work management box 20 at the end of working.

Fourth Embodiment

Figure 11:
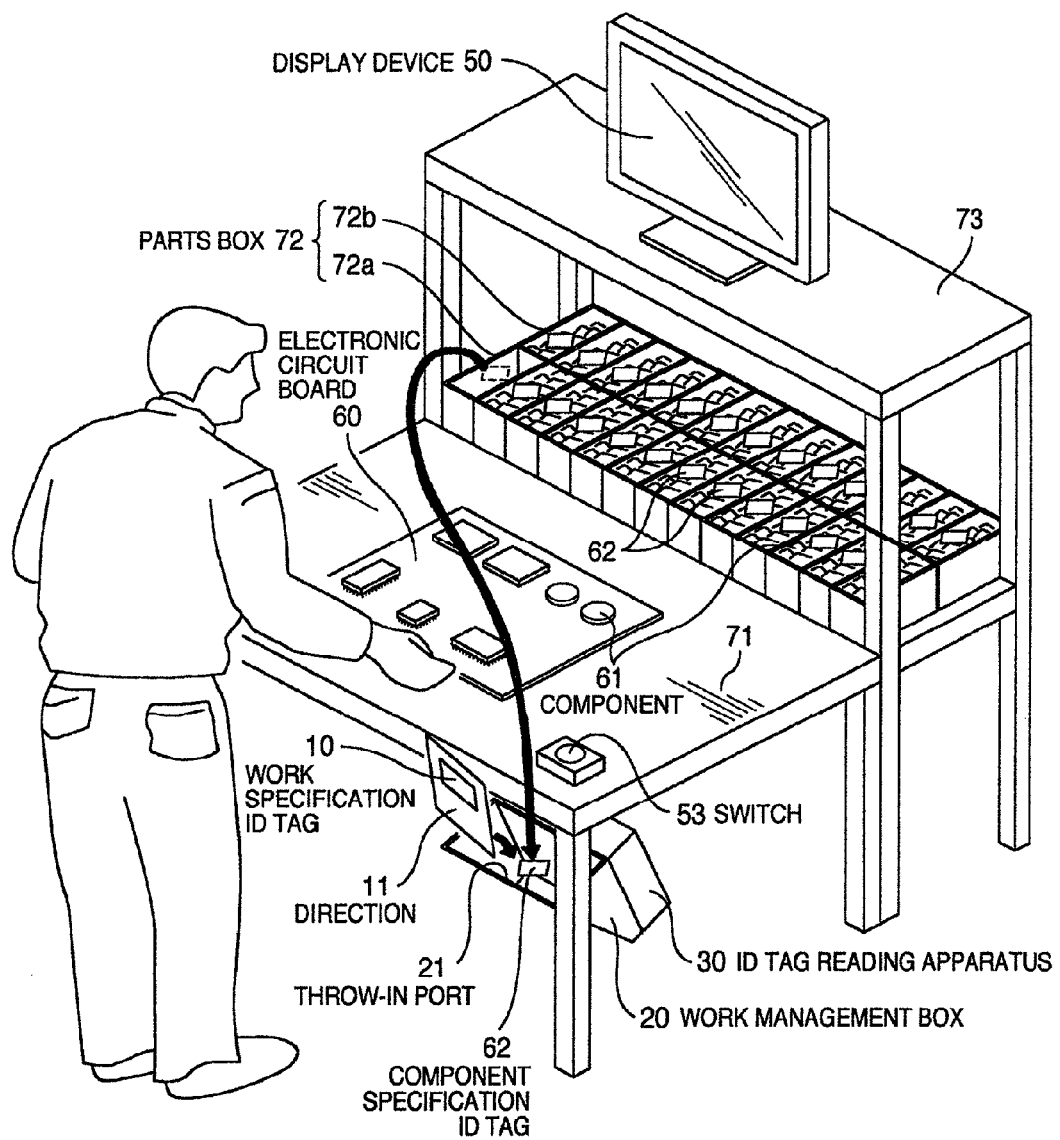
FIG. 11 is an explanatory view showing a method of notifying the supply of components for assembly.

FIG. 11 is an explanatory view showing a method for notifying the supply of components for assembly. The supply of the components 61 becomes necessary in some cases during the mounting work of the components 61 to the electronic circuit board 60 by the worker. In such a case, the worker throws the component specification ID tag 62 stored in the parts box 72 into the work management box 20 and can thus notify the supply to the work performance management apparatus 40.

The construction of the parts box 72 shown in FIG. 11 is changed in comparison with that shown in FIG. 2. A double bucket method is employed as the supplementation method of the components 61. In other words, the parts box 72 includes a parts box 72a and a parts box 72b and the same components 61 are put thereinto.

When the parts box 72a arranged on the forehand becomes empty, the worker throws the component specification ID tag 62 placed in the parts box 72a into the work management box 20 and the ID tag reader 30 transmits the communication start information with the component specification ID tag 62 thrown and the component information for specifying the components 61 of the component specification ID tag 62. Examples of the communication start information are the ID of the work management box 20 and the component supply request time. The component information includes the models and names of the components and their numbers.

The work performance management apparatus 40 receives the communication start information with the component specification tag 62 and the component information from the ID tag reader 30 through the communication equipment 41 for wireless LAN and then records the information to the work management recording portion 42. Time information (time stamp) is added to the information received and is recorded. The work performance management apparatus 40 judges that the components are consumed on the corresponding bench 71 and preferably notifies the supplementation request of the component to a component server. The ID of the work management box 20, the model of the component and its name and number may be transmitted to a portable terminal of the component server as a notification method of the component server.

According to this embodiment, the worker is required to only throw the component specification ID tag 62 into the work management box 20 when the worker needs the component to be mounted, and no burden is imparted to the worker to prepare a request slip for the supply of the component.

In the foregoing embodiments, the ID tags thrown by the worker into the work management box 20 are the work specification ID tag 10, the worker specification ID tag 80, the process specification ID tag 90 and the component specification tag 62 by way of example. However, the ID tags are not particularly limited to the work specification ID tag 10, the worker specification ID tag 80, the process specification ID tag 90 and the component specification tag 62. For example, a work area specification ID tag for specifying the work area is known. An ID tag for managing traceability may be used, too. Traceability information for identifying production history must be recorded to the traceability management ID tag to trace the manufacturing date and the associated production equipment from the production serial number and the production lot number or to ascertain the same production history. The basic information of the traceability information is the information about the components constituting the product and is furthermore the discrete identification information of the components used in practice. In other words, the basic traceability information is so-called "BOM (Bill of Materials)" and is the names and models of the component and their manufacturing serial numbers or manufacturing lot numbers of one product. Information for specifying the work content of the work object article or information for specifying the work area may further be contained.

In the embodiments of the invention, the ID tag reader 30 is fitted to the side surface of the work management box 20. It is also possible to transmit the information recorded from the work performance management apparatus 40 to the work management recording portion 42 to an ID tag reader/writer at the end of working and to write it into the work specification ID tag 10. In this way, the work performance management information can be held inside the work specification ID tag 10.

Another embodiment of the invention is directed to visualize an actual loss cost exceeding a standard prime cost while suppressing IT investment in a production site and to rationalize (to conduct quality improvement) of production activities through the visualization. In other words, the invention explains an IT system that executes partial visualization of the production process and can achieve expansion of company profits by a minimum IT system investment.

The embodiment will be explained with reference to the drawings.

Figure 12:
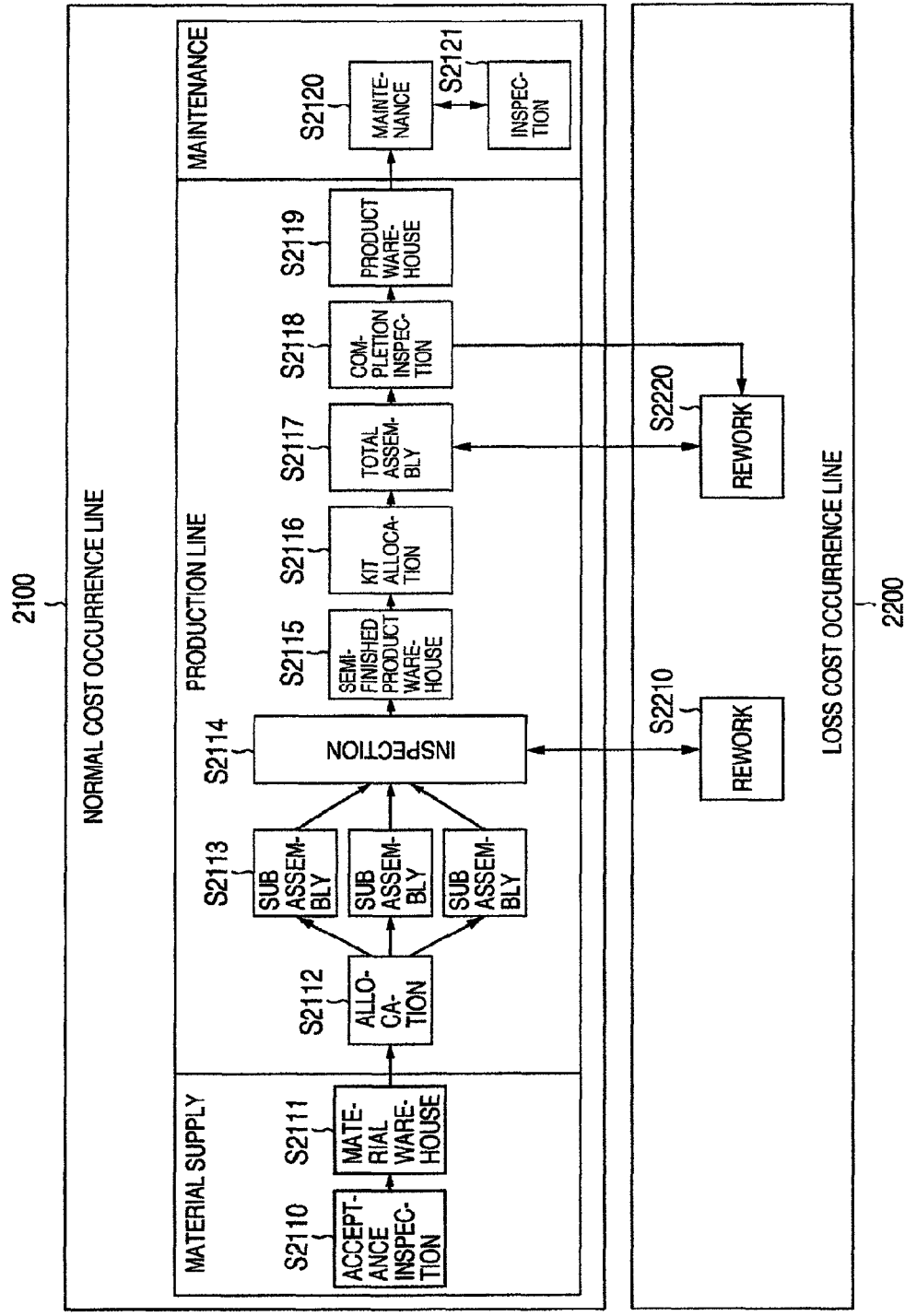
FIG. 12 is an explanatory view useful for explaining positioning of a rework process in a production process.

FIG. 12 is an explanatory view showing positioning of a rework process in a production process. The production line is divided into a normal cost occurrence line 2100 and a loss cost occurrence line 2200 from the aspect of the production cost for the sake of explanation. Here, a production line of an electronic circuit board will be explained as a production line by way of example.

To manufacture products, it is necessary for the normal cost occurrence line 2100 to purchase necessary components on the basis of an order slip. When the components are delivered, a worker in charge of acceptance inspection accepts the components purchased on the basis of a purchase slip, executes an acceptance inspection and accepts the components (step S2110). A parts case accommodating the components is put into a material warehouse and preserved on a predetermined rack (step S2111).

Next, allocation workers or workers in charge of allocating the components take out the assembly components divided in small lots from cases of the component warehouse in accordance with allocation slip, carry them to the production shop of the production lines and allocate the components to the work benches (step S2112). Here, the term "assembly components" is those components which are necessary for assembling the products or in other words, those components which constitute the manufacture. When the predetermined components are arranged on the component rack of the production shop, the production workers or workers in charge of production assemble the semi-finished products (SUB assembly) in accordance with the production slip (production direction) (step S2113).

When the production workers finish the assembly of the assembly components directed by the assembly slip (production direction), the inspection workers or workers in charge of inspection conduct inspection (step S2114). After this inspection is completed, the allocation workers take the semi-finished products into the product warehouse and preserve them on predetermined racks (step S2115). The allocation workers then arrange a predetermined number of semi-finished products (kit arrangement) and take them to the complete assembly shop (step S2116). Next, when the predetermined number of semi-finished products are arranged on the component racks of the production shop, the production workers conduct complete assembly of products in accordance with the production slip (production direction) (step S2117).

When the production worker finishes the total assembly directed by the production slip (production direction), the inspection worker conducts the finish inspection (step S2118). The allocation worker puts the products approved by the inspection into the product warehouse (step S2119). The maintenance worker or worker in charge of maintenance periodically conducts inspection and maintenance of products (step S2120) and repairs the products whenever necessary for maintenance (step S2121). The process described above is a normal cost occurrence line S2100.

In the loss cost occurrence line 2200, working for removing defects are carried out when any defects are found by inspection and work checks during the products and the semi-finished products manufactured during the production process. When the mounting defect of IC components is found occurring (due to insufficiency of solder), the solder is applied to that portion. When the pin of the IC is found broken among the mounting defects, the solder of this IC component is removed and a new IC component of the same kind must be again mounted by soldering. The working for removing the cause of defects of the products/semi-finished products and changing the defective components to the normal state is called "reworking". The place where this reworking is carried out is the rework process. In FIG. 12, steps S2210 to S2220 correspond to the rework process.

Depending on manufacturers, there is the case where both normal operation and rework operation (correction operation) are processed inside the same process without clearly separating the rework process. When the ordinary operation zone and the rework operation zone are managed in the same way to measure the loss cost, clear distinction becomes necessary.

Figure 13:
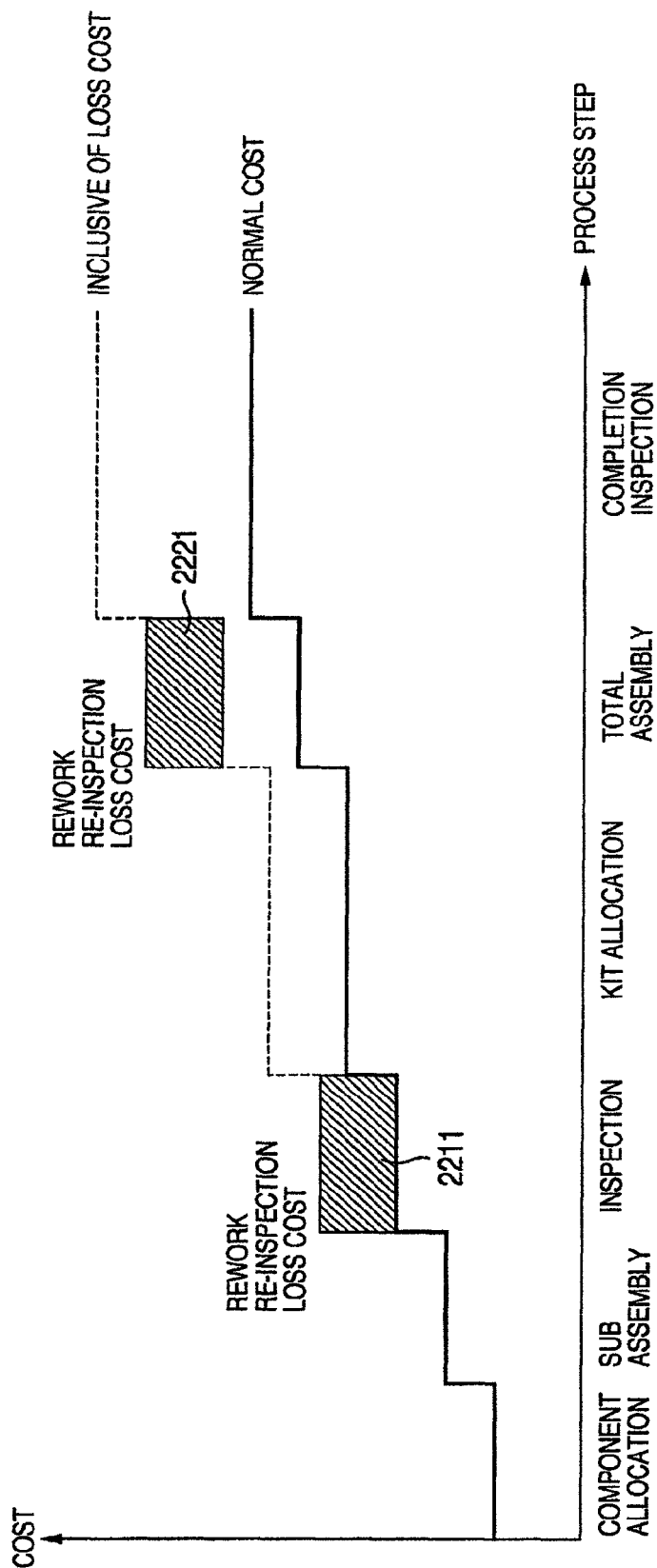
FIG. 13 is an explanatory view useful for explaining stepwise a production cost.

FIG. 13 is an explanatory view for explaining the production cost for each process step. The abscissa represents the process of the production line shown in FIG. 12 and includes the component allocation step, the SUB assembly step, the inspection step, the kit allocation step (that hereby contains delivery of the semi-finished products into and out from the semi-finished product warehouse and storage of the inspected products into total assembly shop), the total assembly step and the finished product inspection step (that hereby contains the storage of the inspected products into the product warehouse). The ordinate represents the total cost of each process step. When reworking becomes necessary in the inspection step, the loss cost 2211 occurs owing to the rework step and the re-inspection step. When rework becomes necessary in the finish inspection of the finished products, the loss cost 2221 occurs owing to the rework process and the re-inspection. Finally, the overall product cost becomes higher by the loss costs 2211 and 2221. Therefore, it is important to measure with high accuracy the loss costs 2211 and 2221.

Figure 14:
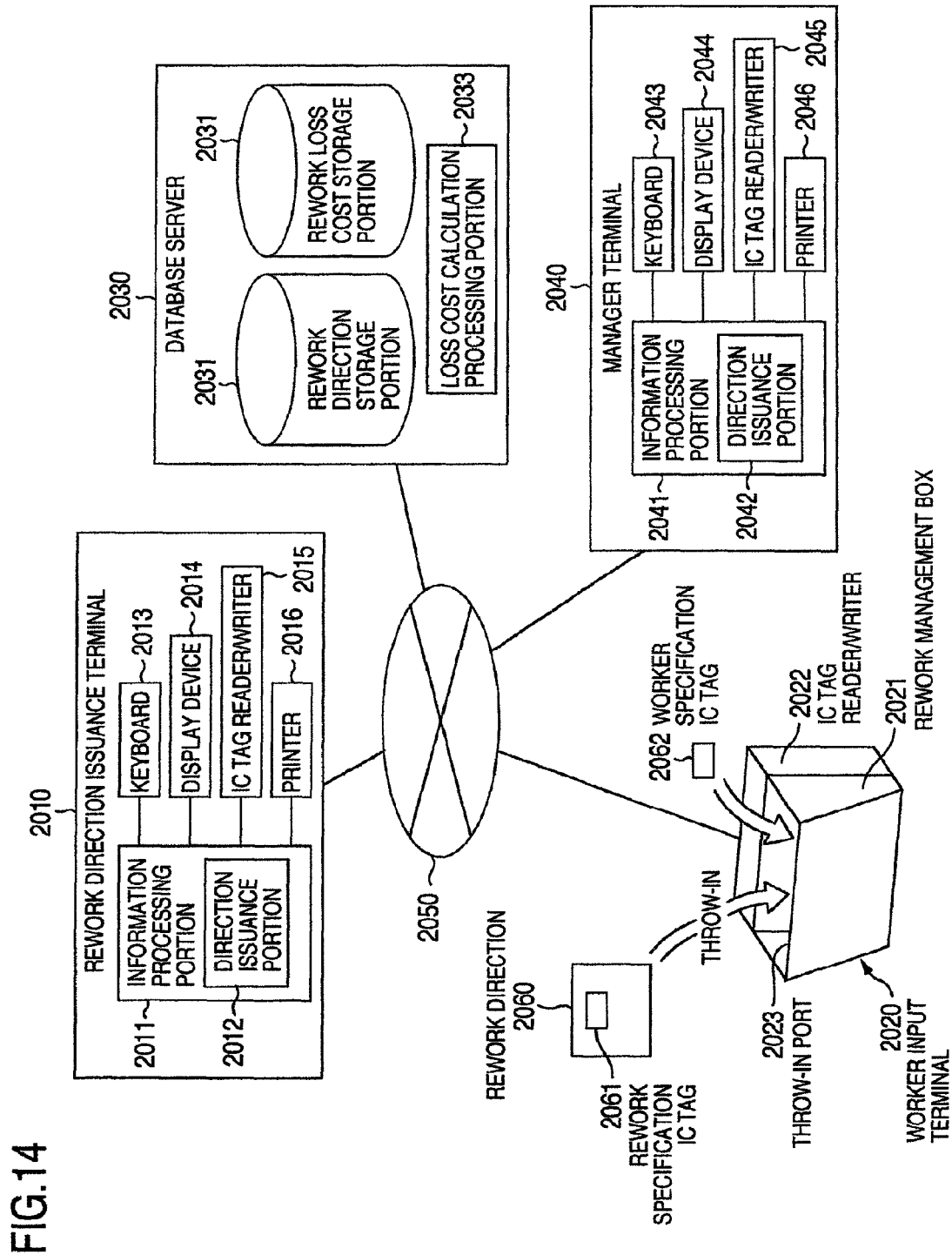
FIG. 14 is a structural view showing a rework measurement system.

FIG. 14 is a structural view showing a rework measurement system. The rework measurement system includes a rework direction issuance terminal 2010, a worker input terminal 2020, a database server 2030 and a manager terminal 2040. The rework direction issuance terminal 2010, the worker input terminal 2020, the database server 2030 and the manager terminal 2040 are connected to one another by a network 2050 such as LAN (Local Area Network).

When rework becomes necessary in the inspection step and the finish inspection step, the rework direction issuance terminal 2010 is the terminal that issues a direction and a rework product is registered to a rework direction storage portion 2031 of the database server 2030. Registration of the rework product for executing the rework step (correction operation) means registration of models and types of products and semi-finished products and a lot No. and a serial No. for discretely identifying them if such information is allocated. Furthermore, the direction No. of the object inspected, the defects discovered and the causes and number of defects are registered.

The rework direction issuance terminal 2010 includes an information processing portion 2011, a keyboard 2013, a display device 2014, an IC tag reader/writer 2015 and a printer 2016. The information processing information 2011 has a direction issuance portion 2012 for issuing the direction for executing the rework step and outputs a rework direction 2060 to the printer 2016 in accordance with the instruction of the direction issuance portion 2012. The IC tag reader/writer 2015 writes information for specifying the rework to the rework specification IC tag 2016 in accordance with the instruction of the direction issuance portion 2012. Examples of the information for specifying the rework include rework direction No., model numbers of products/semi-finished products and their number. An IC tag for wireless communication such as RFID (Radio Frequency Identification) is used for the rework specification IC tag 2061 and is attached to documents of the rework direction 2060.

The worker input terminal 2020 includes a rework management box 2021 having a throw-in port 2023 and an IC tag reader/writer 2022 mounted to a side surface of the rework management box 2021, for reading a rework specification IC tag 2061 and transmitting the information read to a database server 2030.

The rework management box 2021 is a box into which a rework direction 2060 is thrown at the start of the rework process. The worker takes out the rework direction 2060 from the rework management box 2021 when the rework process is complete, attaches the rework direction 2060 so taken out to the electronic circuit board as the rework product and transfers it to the inspection process.

When the rework direction 2060 is thrown into the rework management box 2021, the IC tag reader/writer 2022 confirms the communication with the rework specification IC tag 2061, reads the information of the rework specification IC tag 2061 attached to the rework direction 2060 and transmits the communication start information with the rework specification IC tag 2061 and the information for specifying the work process of the rework product to the database server 2030. Examples of the communication start information are the ID of the rework management box 2021 and the work start time. Examples of the information for specifying the work process of the rework product are the number (No.) of the rework direction 2060, the model numbers of products and semi-finished products to be produced and the number of rework products. When the rework direction 2060 is taken out from the rework management box 2021, the IC tag reader/writer 2022 confirms disconnection of the communication with the rework specification IC tag 2061 and then transmits the communication end information with the rework specification IC tag 2061 and the information for specifying the work process of the rework product to the database server 2030. Examples of the communication end information are the ID of the rework management box 2021 and the work end time. Examples of the information for specifying the work process of the rework product are No. of the rework direction 2060, model numbers of products and semi-finished products to be produced and the number of rework products.

Incidentally, a plurality of IC tags may be put into the rework management box 2021. An example of other IC tag is a worker specification IC tag 2062 into which information for specifying the worker is written. When the worker specification IC tag 2062 is put, the IC tag reader/writer 2022 reads the information of the worker specification IC tag 2062 and transmits the communication start information with the worker specification IC tag 2062 and the information for specifying the worker (worker number 2033 in FIG. 17B, for example) to the database server 2030. Examples of the communication start information are the ID of the rework management box 2021 and the work start time. When the worker specification IC tag 2062 is taken out from the rework management box 2021, the IC tag reader/writer 2022 confirms disconnection of the communication with the worker specification IC tag 2062 and then transmits the communication end information with the worker specification IC tag 2062 and the information for specifying the worker to the database server 2030. Examples of the communication end information are the ID of the rework management box 2021 and the work end time.

The database server 2030 is the server that stores and analyzes the loss cost information on the production line and stores the information from the rework direction issuance terminal 2010, the worker input terminal 2020 and the manager terminal 2040. The database server 2030 includes a rework direction storage portion 2031, a rework loss cost storage portion 2032 and a loss cost calculation processing portion 2033.

The database server 2030 stores the registration information from the rework direction issuance terminal 2010 to the rework direction storage portion 2031. When receiving the information from the IC tag reader/writer 2022, that is, the communication start information, the information for specifying the work process of the rework product and the communication end information, the database server 2030 stores these kinds of information to the rework direction storage portion 2031. After the time information (time stamp) containing the year, month and day is added, these kinds of information are stored. The loss cost calculation processing portion 2033 of the database server 2030 calculates the work time for each rework direction, for example, from the information of the rework direction storage portion 2031 and stores the calculation result in the rework loss cost storage portion 2032.

The manager terminal 2040 is the terminal that retrieves the database server 2030 in accordance with each monitor item about the work performances of the rework process occurring in the production process, visualizes the loss cost occurring besides the standard prime cost and analyzes the cause of the occurrence of the loss cost. The monitor items include those according to the causes, to the defect occurring process, to the line, to the plant, to the time zone/period and to the completion/non-completion of counter measures, for example, respectively.

The manager terminal 2040 includes an information processing portion 2041, a keyboard 2043, a display device 2044, an IC tag reader/writer 2045 and a printer 2046. The information processing portion 2041 has a database retrieval portion 2042 for retrieving the rework process in accordance with the monitor item, and the retrieval result by the database retrieval portion 2042 is displayed on the display device 2044 or is outputted by writing the result by the IC tag reader/writer 2045 to the IC tag or by the printer 2046.

Figure 15:
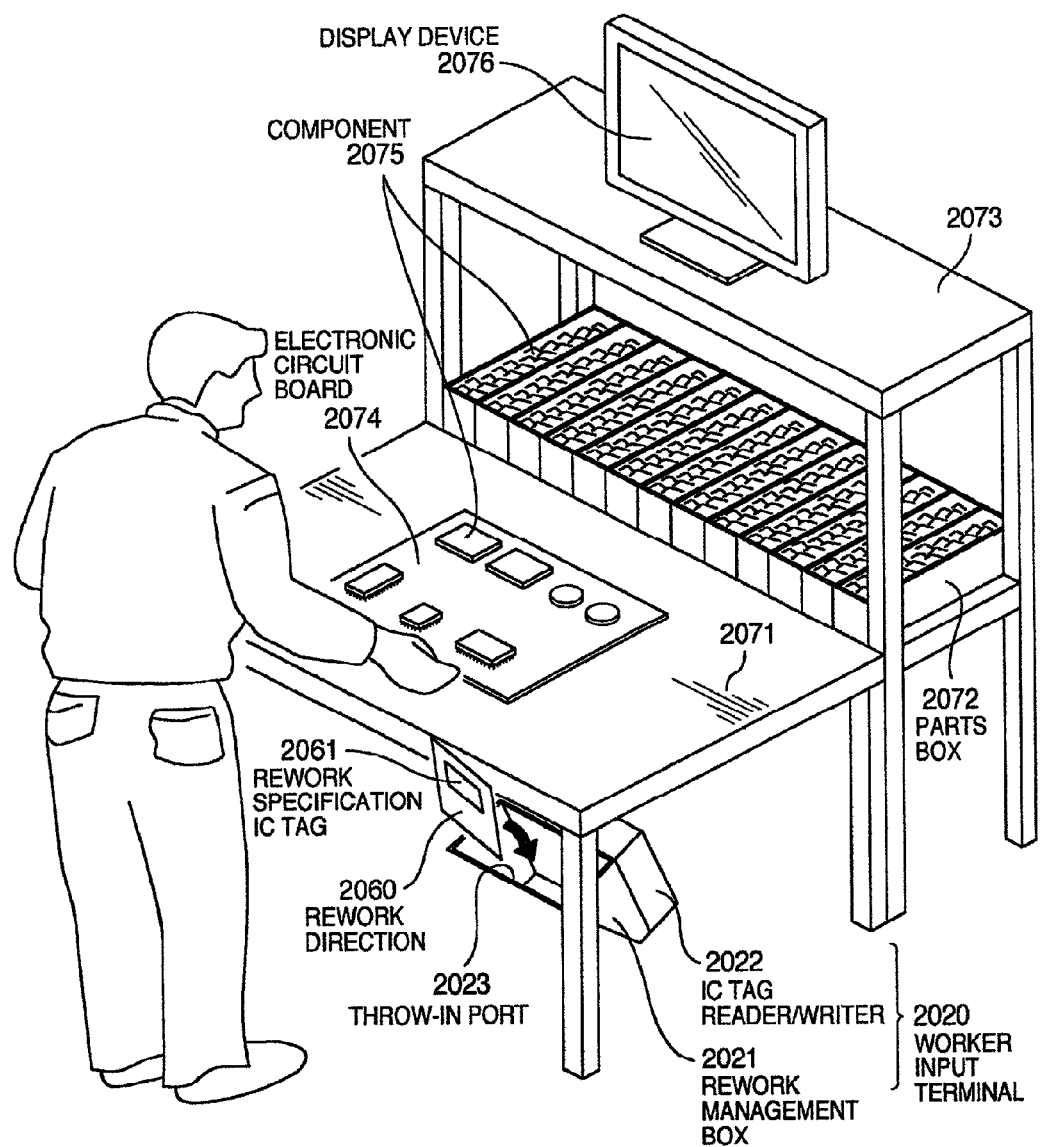
FIG. 15 is an appearance perspective view showing an example of a work bench of a rework shop.

FIG. 15 is an appearance perspective view showing an example of the work bench of the rework shop. The rework management box 2021 of the worker input terminal 2020 is installed below the work bench 2071 and the IC tag reader/writer 2022 is mounted to the rework management box 2021. The rework management box 2021 is inclined forward in the drawing so that the worker can easily throw in and take out the rework direction 2060 at the start and end of the work. Consequently, the worker can easily confirm the existence of the rework direction 2060 inside the rework management box 2021, too. Incidentally, the throw-in port 2023 of the rework management box 2021 preferably exists at the top in the substantially vertical direction. In this way, the installation space of the rework management box 2021 can be minimized.

The upper part of the work bench 2071 is the assembly work area of the electronic circuit board 2074 as the rework product. A plurality of parts boxes 2072 is arranged in front of the worker. The display device 2076 is installed above the auxiliary work table 2073 and displays the information of the rework specification IC tag 2061. The worker conducts the correction work of the electronic circuit board 2074 in accordance with the information displayed on the display device 2076. The worker takes out the component 2075 from the parts box 2072 and mounts it to the electronic circuit board 2074 when the component needs to be exchanged.

Here, the rework management box 2021 is disposed as the worker input terminal 2020 and the work performance can be collected during the rework process without applying the burden to the worker. A PC (Personal Computer) connected to the network 2050 may be used as another worker input terminal 2020. When receiving the rework direction, the worker executes the selection of the rework direction 2060 and the operation of the work start indicated on the display device 2076 to declare the work start. The worker executes the work end operation at the end of the work.

Next, the procedure will be explained with reference to FIGS. 16 to 19.

FIG. 16 is an explanatory view showing an example of the picture window of the rework direction issuance terminal. When the necessity for the rework arises in the inspection process, the inspection worker registers the rework process from the rework direction input window 2080 of the display device 2014 shown in FIG. 16. More concretely, the direction number 2081, the model number 2082, the model name 2083 and the number of pieces 204 are inputted and the causes as being factors (such as 2055: IC pin breakage, 2056: connector pin breakage) are selected from the pull-down menu 2085. Maker's model 2086, lot number 2087 for individual identification and serial number 2088 can be registered if they are allocated. When the inspection worker pushes a registration button 2090 after completion of the inspection, the input information is registered (stored) in the database server 2030. FIG. 17A shows an example of the storage data stored in the database server 2030. Incidentally, the inspection worker needs to push a cancel button 2091 to cancel the registration content during the registration.

When the inspection worker pushes the direction issuance button 2093 after the registration of the rework process is complete, the direction issuance portion 2012 outputs the rework direction 2060. When the inspection worker pushes the IC tag issuance button 2094, the direction issuance portion 2012 writes the information for specifying the work process of the rework product to the IC tag. Incidentally, a detailed condition of the inspection result is described in the column "remarks 2089" and this is particularly advisable when the cause of the trouble cannot be specified.

When the cause of the trouble cannot be specified, it is not basically possible to immediately carry out the correction work. Therefore, a request for the analysis of the defect must be sent to a department in charge of the analysis of the defect. The correction work can be commenced first after the defect analysis department analyzes the case and establishes the counter-plan. When the defect analysis department clarifies the cause and establishes the counter-plan method, the rework direction 2060 is issued to the defect analysis department. The lots of products/semi-finished products or their serial products must be preserved separately lest they mix with normal products/semi-finished products until the rework direction 2060 is issued. When the inspection worker pushes a temporary save button 2092 at this time, the input information is temporarily saved in the database server 2030.

FIG. 18 is a flowchart showing a storage procedure of measurement data of the rework process. The worker (worker in charge of production) in the work area receives the electronic circuit board 2874 to which the rework direction 2060 is attached, and throws the rework direction 2060 from the throw-in port 2023 of the rework management box 2021 installed below the work bench 2071. Then, a radio wave containing a control signal is transmitted from the antenna (not shown in the drawing) inside the IC tag reader/writer 2022. An antenna inside the rework specification IC tag 2061 receives the radio wave from the IC tag reader/writer 2022 and generates electric power owing to the resonance of the antennas. The power thus generated actuates the circuit inside the rework specification IC tag 2061 to execute necessary processing. The processing result is transmitted from the antenna on the side of the rework specification IC tag 2061. The radio wave is received by the antenna of the IC tag reader/writer 2022 and throw-in of the rework direction 2060 is detected (step S2301). Similarly, when the worker specification IC tag 2062 is thrown in, the IC tag reader/writer 2022 detects throw-in of the worker specification IC tag 2062.

The IC tag reader/writer 2022 reads the information of the rework specification IC tag 2061 detected and transmits the communication start information with the rework specification IC tag 2061 and the information for specifying the work process of the rework product to the database server 2030 (step S2302). Similarly, the IC tag reader/writer 2022 reads the information of the worker specification IC tag 2062 and transmits the communication start information with the worker specification IC tag 2062 and the information for specifying the worker to the database server 2030.

The database server 2030 stores, as the work start record, the communication start information with the rework specification IC tag 2061 and the information for specifying the worker received to the rework direction storage portion 2031. Similarly, the database server 2030 stores, as the work start record, the communication start information with the worker specification IC tag 2062 and the information for specifying the worker received to the rework direction storage portion 2031. Time information including year, month and day (time stamp) is added to the information received at this time and is stored (step S2303).

The IC reader/writer 2022 executes communication with the rework specification IC tag 2061 in a predetermined time interval and when the communication cannot be confirmed within the predetermined time, the IC tag reader/writer 2022 detects that the worker takes out the rework direction 2060 from the throw-in port 2023 of the rework management box 2021 (step S2304). The IC tag reader/writer 2022 transmits the communication end information with the rework specification IC tag 2061 to the database server 2030. Similarly, when detecting that the worker takes out the worker specification IC tag 2062 from the throw-in port 2023 of the rework management box 2021, the database server 2030 transmits the communication end information with the work specification IC tag 2062 to the database server 2030.

When receiving the communication end information and the information for specifying the rework of the rework product from the IC tag reader/writer 2022, the database server 2030 adds the time information containing year, month and day (time stamp) to the information received and stores the information to the rework direction storage portion 2031 (step S2305). Similarly, when receiving the communication end information and the information for specifying the worker from the IC tag reader/writer 2022, the database server 2030 adds the time information containing year, month and day (time stamp) to the information received and stores the information to the rework direction storage portion 2031. After a series of these operations are conducted, the storage procedure of the measurement data of the rework process is completed.

Next, a concrete example of the information stored in the database server 2030 will be explained.

FIGS. 17A and 17B are explanatory views showing an example of each of the rework direction table and the rework direction work performance list. Namely, FIG. 17A is the rework direction table and FIG. 17B is the rework direction work performance list. The rework direction storage portion 2031 stores the information transmitted from the rework direction issuance terminal 2010 and the worker input terminal 2020.

As shown in FIG. 17A, the rework direction table includes No. (registration No.), rework direction No., models of products or semi-finished products, rework number, rework cause, shop number, rework start time, rework end time and worker's parameter. The registration No., the rework direction No., the model of the product or semi-finished product, the rework number and the rework cause are stored on the basis of the transmission data from the rework direction issuance terminal 2010.

As shown in FIG. 17B, the rework direction work performance list adds the transmission data from the worker input terminal 2020 on the basis of the rework direction table. More concretely, the shop No. is decided from the ID of the rework management box 2021 of the communication start information and the work start time of the communication start information is set to the rework start time (for example, "0604211412" is 2006 Apr. 21, 14:12). The work end time of the communication end information is set to the rework end time. Furthermore, the worker number is decided from the information that specifies the worker.

FIG. 19 is an explanatory view showing an example of the rework direction work loss cost list. In the rework direction work loss cost list, the loss cost calculation processing portion 2033 executes the calculation processing in accordance with the calculation execution instruction of the manager terminal 2040 and the list is generated. The loss cost calculation processing portion 2033 calculates the loss cost from the data of the rework work performance list of the rework direction storage portion 2031, generates the rework direction work loss cost list and stores it in the rework loss cost storage portion 2032. In the case of the rework direction No. 060421-1, for example, the work time is 4 hours and 1 minute (241 minutes) and the loss cost is calculated as 20,075 (Yen) by multiplying the work time by a work unit price 83.3 (Yen) per minute.

As shown in FIG. 19, the work time, the work unit price and the loss cost are further added to the rework direction work performance list in the rework direction work loss cost list. It is possible from this list to analyze the model numbers of products or semi-finished products, the defect causes (rework causes) and the defect occurrence time zone/period, for example.

The following can be listed up as possible utilization methods of the data stored in the rework loss cost storage portion 2032.

(1) Collection of rework performances of each of the types and models of products/semi-finished products as rework objects, and rework work frequency distribution;
(2) Work frequency distribution of products/semi-finished products as rework objects per each period (per each month, per each week, etc);
(3) Occurrence frequency of each defect cause or defect cause code of products/semi-finished products as rework objects and time change trend;
(4) Collection of products/semi-finished products as rework objects in accordance with defect zone (parts defect, work defect, design-originated defect)
(5) Collection of component defects in accordance with makers and maker models and their time change trend;
(6) Collection of defect occurrence frequency for each worker due to work defect;
(7) Total work time of rework number of man-hour (money base collection in some cases);
(8) Ratio of defective products forwarded to next step (existence/absence of return work due to forwarding step and overlapping work)
(9) Calculation of yield (total man-power used for rework process/total number of production workers)

Activities for improving productivity or product quality that become possible by the calculation of the information described above include:

(A) Level-up of acceptance inspection for those components which are causes of production of products/semi-finished products having low production yield;
(B) Assessment of parts makers of those components which are causes of production of products/semi-finished products having low production yield;
(C) Re-examination of work method as the cause of production of products/semi-finished products having low production yield;
(D) Re-examination of production technology as the cause of production of products/semi-finished products having low production yield.

In the production process according to the embodiment described above, the rework measurement system includes a direction issuance unit for generating the direction of the rework (rework direction issuance terminal 2010, for example) when the rework process for re-examining the product occurs in the production process of the products, an input unit for registering the rework performance (worker input terminal 2020, for example), database (database 2030, for example) for managing the performance information of rework and a retrieval unit for retrieving the database in accordance with each monitor item for monitoring the rework performance information (manager terminal 2040, for example). It is therefore possible to visualize those factors which may oppress the company profit by collecting the number of man-hours of counter-plans for the component defects, the work defects and the design defects that may occur during the production. It is also possible to visualize those factors which may oppress the company profit by making an IT system investment in only the rework process without picking up the entire production process as the investment object. Furthermore, assistance to promote production improvement activities for reducing the production cost because the loss cost deteriorating the company profit can be visualized.

Problems of products occurring in production processes in the manufacturing industry such as component defects and component mounting defects, and problems caused when defects of design as the upstream side of the production process are as such carried into the production site, may occur in any manufacturing industry. Depending on the unit cost of the products or the degree of easiness of reworking in the counter-plan for the defects, the defective products are discarded as scraps in some cases without reworking but the amounts of scraps will decrease in future in view of the recent environmental problems.

Examples of the manufacturing industry are the production of finished products and components of automobiles, electric/electronics, precision equipment, and so forth. Although pharmaceuticals and foodstuffs are also included, the operation for correcting the products by the rework operation is limited for the reason of the tasting period, and the like.

Still another embodiment of the invention will be explained with reference to the drawings.

Figure 20:
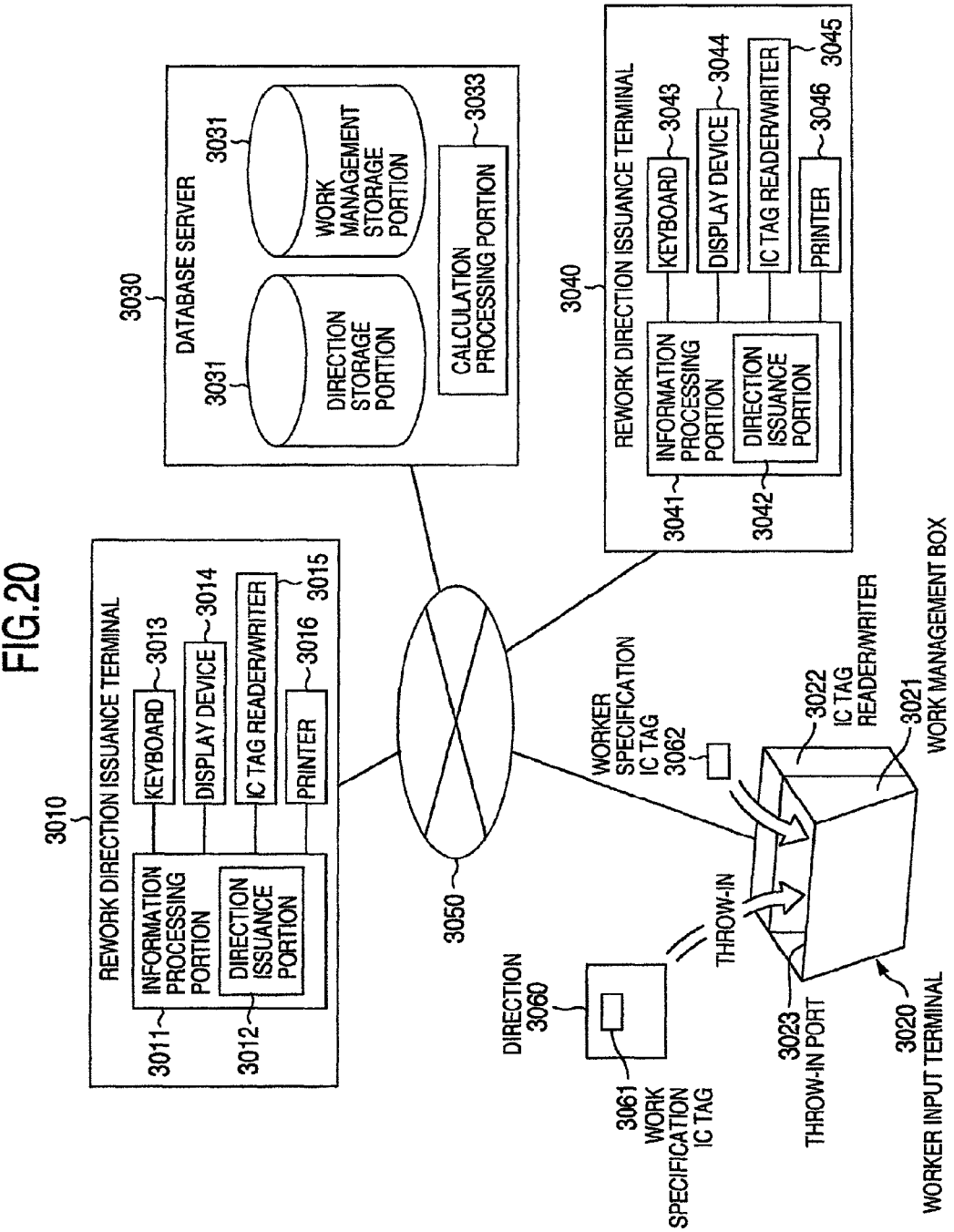
FIG. 20 is a structural view showing a work performance collection system according to the invention.

FIG. 20 is a structural view showing a work performance collection system. The work performance collection system includes a direction issuance terminal 3010, a worker input terminal 3020, a database server 3030 and a manager terminal 3040. The direction issuance terminal 3010, the worker input terminal 3020, the database server 3030 and the manager terminal 3040 are connected to one another through a network 3050 such as an LAN (Local Area Network).

The direction issuance terminal 3010 is the terminal that issues a direction when the work is necessary, and registers direction content and assembly instruction information to a direction storage portion 3031. Incidentally, the term "assembly instruction information" means the information of components and procedures that are necessary for assembling products/semi-finished products. An example of the assembly instruction information is hereby an assembly process for mounting the components to the electronic circuit board 3074 (see FIG. 21).

The direction issuance terminal 3010 includes an information processing portion 3011, a keyboard 3013, a display device 3014, an IC tag reader/writer 3015 and a printer 3016. The information processing portion 3011 includes a direction issuance portion 3012 for issuing a direction and outputs the direction 3060 to the printer 3016 in accordance with the instruction of the direction issuance portion 3012. The IC tag reader/writer 3015 writes information for specifying the work content to the work specification IC tag 3061 in accordance with the direction issuance portion 3012.

Examples of the information for specifying the work content are a direction number, name of model of products or semi-finished products to be produced and their numbers. Assembly information for the assembly worker to mount the components 3075 (see FIG. 22) to the electronic circuit board 3074 (see FIG. 21) is described as detailed information of the information for specifying the work content of the work object article and its concrete example is the kind and number of the components 3075 and the compound mounting sequence.

The direction 3060 is the document to which the assembly process is described. Concretely, the components 3075 to be mounted to the electronic circuit board 3074 include various kinds of components, and the direction 3060 describes routes of the assembly process for producing one electronic circuit board 3074. Examples are a CPU process, a CPU peripheral component process, a power source process and an I/O interface process. The worker can judge the route of the process from the direction 3060. A non-contact type IC tag for wireless communication such as RFID (Radio Frequency Identification) is used for the work specification IC tag 3061 and is attached to the document of the direction 3060.

The worker input terminal 3020 includes a work management box 3021 having a throw-in port 3023 and an IC tag reader/writer 3022 fitted to a side surface of the work management box 3021, for reading the work specification IC tag 3061 and transmitting the information read to the database server 3030.

The work management box 3021 is the box into which the direction 3060 is thrown at the start of working. When working is completed, the assembly worker takes the direction 3060 out from the work management box 3021, attaches the direction 3060 to the electronic circuit board 3074 and delivers it to the next process.

When the direction 3060 is thrown into the work management box 3021, the IC tag reader/writer 3022 confirms the communication with the work specification IC tag 3061, reads the information of the work specification IC tag 3061 attached to the work direction 3060 and transmits the communication start information with the work specification IC tag 3061 and the information for specifying the work content to the database server 3030. Examples of the communication start information are the ID of the work management box 3021 and the communication start time. Examples of the information for specifying the work content are the direction number of the direction 3060, the model numbers of products and semi-finished products to be produced and the number of workers. When the direction 3060 is taken out from the work management box 3021, the IC tag reader/writer 3022 confirms disconnection of the communication with the work specification IC tag 3061 and then transmits the communication end information with the work specification IC tag 3061 and the information for specifying the work content to the database server 3030. Examples of the communication end information are the ID of the work management box 3021 and the communication end time. Examples of the information for specifying the work content are the direction number of the direction 3060, model numbers of products and semi-finished products to be produced and the number of workers.

Incidentally, a plurality of IC tags may be thrown into the work management box 3021. An example of other IC tag is a worker specification IC tag 3062 to which information for specifying the worker is written. When the worker specification IC tag 3062 is thrown, the information of the worker specification IC tag 3062 is read by the IC tag reader/writer and the communication start information with the worker specification IC tag 3062 and the information for specifying the worker (worker M0001 in FIG. 25, for example) are transmitted to the database server 3030 by the IC tag reader/writer. Examples of the communication start information are the ID of the work management box 3021 and the communication start time. When the worker specification IC tag 3062 is taken out from the work management box 3021, the IC tag reader/writer 3022 confirms disconnection of the communication with the operator specification IC tag 3062 and then transmits the communication end information with the worker specification IC tag 3062 and the information for specifying the worker to the database 3030. Examples of the communication end information are the ID of the work management box 3021 and the communication end time.

The database server 3030 is the server that stores and analyzes the work performance information on the production line and stores the information from the direction issuance terminal 3010, the worker input terminal 3020 and the manager terminal 3040. The database server 3030 includes a direction storage portion 3031, a work management storage portion 3032 and a calculation processing portion 3033.

The database server 3030 stores the registration information from the direction issuance terminal 3010 to the direction storage portion 3031. When receiving the information from the IC tag reader/writer 3022, that is, the communication start information, the information for specifying the work content and the communication end information, the database server 3030 stores these kinds of information to the direction storage portion 3031. After the time information (time stamp) containing the year, month and day is added, these kinds of information are stored. The time information stored in the direction storage portion 3031 includes the communication start time contained in the communication start information, the communication end time contained in the communication end information and the time information (time stamp) added to the received information. The time information (time stamp) added to the received information may be utilized as backup of the communication start time and the communication end time. When the time information is not contained in the information sent from the IC tag reader/writer 3022, the time information (time stamp) added to the received information is utilized for managing the received information. The calculation processing portion 3033 of the database server 3030 calculates the work time for each rework direction, for example, from the information of the direction storage portion 3031 and stores the calculation result in the operation management storage portion 3032.

The manager terminal 3040 is the terminal that retrieves the database server 3030 in accordance with each monitor item about the work performances of the production process and analyzes the work time for predetermined items. The predetermined items include those according to the directions, to the process, to the worker, to the line, to the plant, to the time zone/period and to the work time/period, year, month, day-of-week and day.

The manager terminal 3040 includes an information processing portion 3041, a keyboard 3043, a display device 3044, an IC tag reader/writer 3045 and a printer 3046. The information processing portion 3041 has a database retrieval portion 3042 for retrieving the database for the predetermined items. The database retrieval portion 3042 displays the result of retrieval on the display device 3044 or writes the retrieval result to the IC tag through the IC tag reader/writer 3045 or outputs it through the printer 3046.

Figure 21:
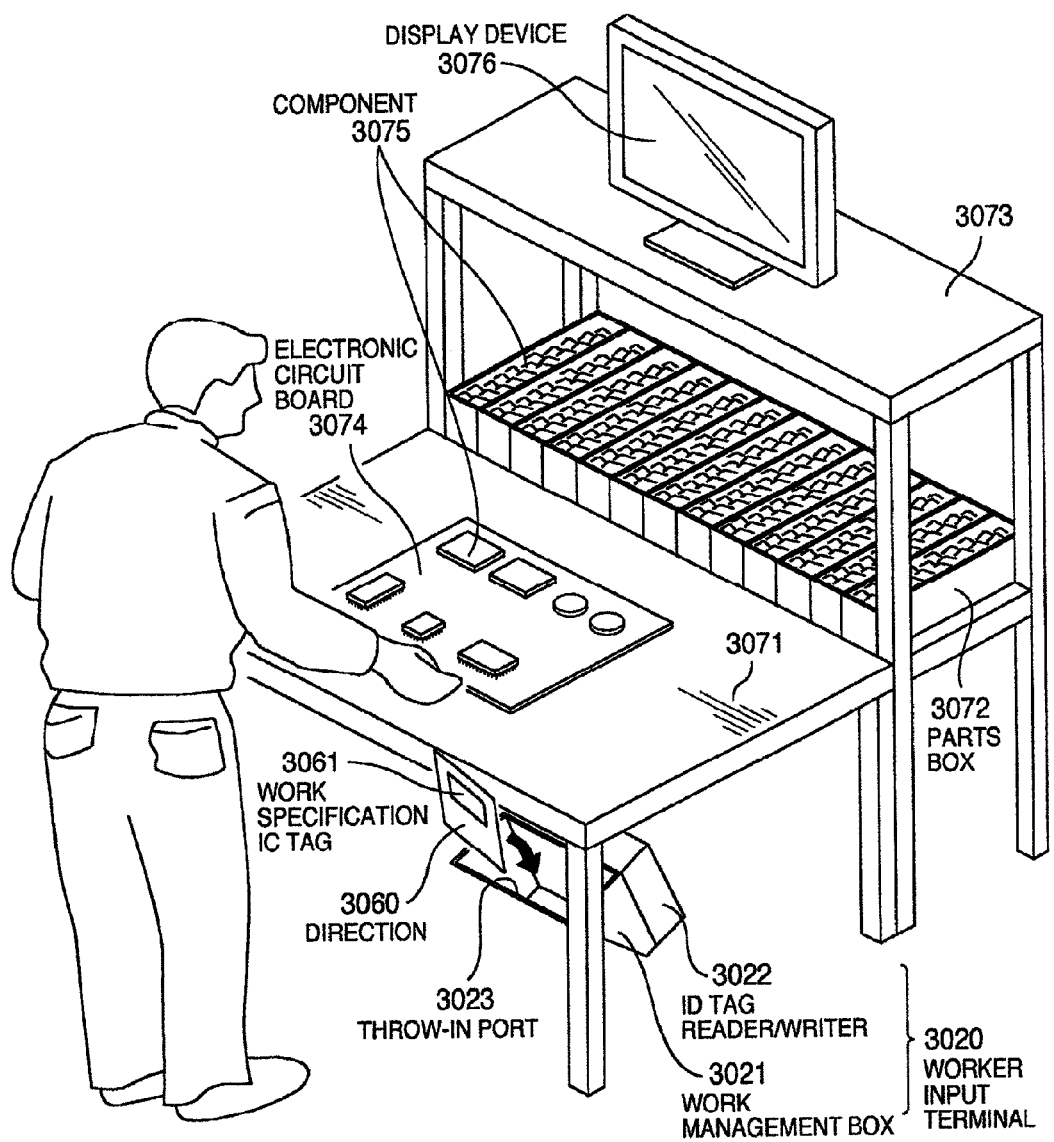
FIG. 21 is an appearance perspective view showing an example of a work bench of a work area.

FIG. 21 is an appearance perspective view showing an example of the work bench of the work area. The work management box 3021 of the worker input terminal 3020 is installed below the work bench 3071 and the IC tag reader/writer 3022 is mounted to the work management box 3021. The work management box 3021 is inclined forward in the drawing so that the worker can easily throw in and take out the direction 3060 at the start and end of the work. Consequently, the worker can easily confirm the existence of the direction 3060 inside the work management box 3021, too. Incidentally, the throw-in port 3023 of the work management box 3021 preferably exists at the top in the substantially vertical direction. In this way, the installation space of the work management box 3021 can be minimized.

The upper part (upper surface) of the work bench 3071 is the assembly work area of the electronic circuit board 3074. A plurality of parts boxes 3072 is arranged in front of the worker. The display device 3076 is installed above the auxiliary work table 3073 and displays the information of the work specification IC tag 3061. The worker conducts working of the electronic circuit board 3074 in accordance with the information displayed on the display device 3076. Here, the work management box 3021 is disposed as the worker input terminal 3020, and the work performance can be collected without applying the burden to the worker. A PC (Personal Computer) connected to the network 3050 (see FIG. 20) may be used as another worker input terminal 3020. When receiving the direction 3060, the worker executes the selection of the direction 3060 and the operation of the work start indicated on the display device 3076 to declare the work start. The worker executes the work end operation at the end of the work.

Next, the procedure will be explained with reference to FIGS. 22 to 26.

FIG. 22 is an explanatory view showing an example of the input window of the direction issuance terminal. When the necessity for the issuance of the direction arises, the direction issuing worker registers the work content from the direction input window 3080 of the display device 3014 (see FIG. 20). More concretely, the direction number 3081, the direction content 3082 (inclusive of the model numbers model names of products/semi-finished products to be produced) and the number of workers) and the process ID 3083 are inputted from each input column. The assembly procedure of the worker and the work content are inputted as assembly instruction information 3084 from each input column. For example, "Parts 001 mounting" for the assembly number B001 and "Parts 002 mounting" for the assembly number B002. Notes of the assembly indication information are described in remarks 3085. When the direction issuing worker pushes a registration button 3090 after registration is completed, the input information is registered (saved) in the database server 3030 (see FIG. 20). Incidentally, the inspection worker needs to push a cancel button 3091 to cancel the registration content during the registration. A temporary save button 3092 is pushed when the direction issuing worker preserves the input content during the input operation.

When the direction issuing worker pushes the direction issuance button 3093 after registration of the direction is completed (see FIG. 20), the direction issuance portion 3012 (see FIG. 20) outputs the direction 60. The direction issuance portion 3012 writes the information for specifying the work content into the IC tag when the inspection worker pushes the IC tag issuance button 3094.

Figure 23:
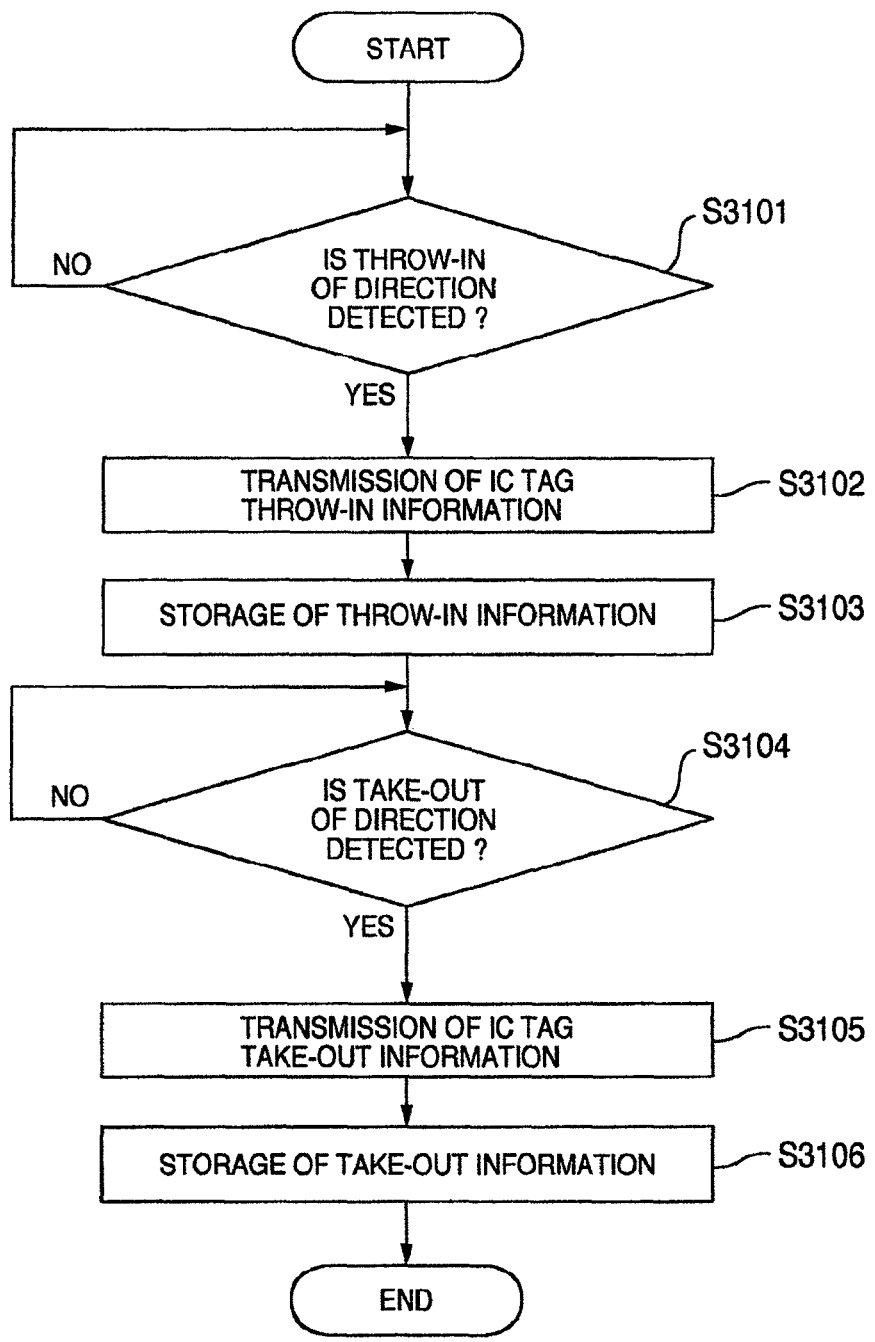
FIG. 23 is a flowchart showing a storage procedure of the work performance collection data.

FIG. 23 is a flowchart showing a storage procedure of work performance collection data. When receiving the electronic circuit board 3074 to which the direction 3060 is attached as shown in FIG. 21, the worker of the work area throws the direction 3060 from the throw-in port 3023 of the work management box 3021 disposed below the work bench 3071. The IC tag reader/writer 3022 transmits in a predetermined time interval a radio wave containing a control signal from an antenna (not shown in the drawing) inside the IC tag reader/writer 3022 and judges whether or not throw-in of the direction exists (step S3101). Incidentally, the radio wave containing the control signal may be continuously transmitted from an antenna (not shown) inside the IC tag reader/writer 3022 in step S3101.

An antenna inside the work specification IC tag 3061 receives the radio wave from the IC tag reader/writer 3022 and generates electric power owing to the resonance of the antennas. The electric power thus generated actuates the circuit inside the work specification IC tag 3061 to execute necessary processing. The processing result is transmitted from the antenna on the side of the rework specification IC tag 3061. The transmitted radio wave is received by the antenna of the IC tag reader/writer 3022 and throw-in of the direction 3060 is detected (step S3101, Yes) by the IC tag reader/writer 3022. The flow proceeds to "No" of step 3101 when throw-in of the direction 3060 is not detected by the IC tag reader/writer 302. Similarly, when the worker specification IC tag 3062 is thrown in, the IC tag reader/writer 3022 detects throw-in of the worker specification IC tag 3062.

The IC tag reader/writer 3022 reads the information of the work specification IC tag 3061 detected and transmits the communication start information with the work specification IC tag 3061 as the IC tag throw-in information and the information for specifying the work process of the rework product to the database server 3030 (step S3102). Similarly, the IC tag reader/writer 3022 reads the information of the worker specification IC tag 3062 and transmits the communication start information with the worker specification IC tag 3062 and the information for specifying the worker to the database server 3030.

The database server 3030 stores, as the communication start record, the communication start information with the work specification IC tag 3061 and the information for specifying the work content to the direction storage portion 3031. Similarly, the database server 3030 stores, as the communication start record, the communication start information with the worker specification IC tag 3062 received and the information for specifying the worker to the direction storage portion 3031. Time information including year, month and day (time stamp) is added to the information received at this time and is stored (step S3103).

The IC reader/writer 3022 executes communication with the work specification IC tag 3061 in a predetermined time interval and when the communication is confirmed, the IC tag reader/writer 3022 does not detect that the worker takes out the direction 3060 from the throw-in port 3023 of the work management box 3021 (step S3104, No). When the communication cannot be confirmed within the predetermined time, the IC tag reader/writer 3022 detects that the worker takes out the direction 3060 from the throw-in port 3023 of the work management box 3021 (step S3104, Yes). The IC tag reader/writer 3022 transmits the communication end information with the work specification IC tag 3061 as the IC tag take-out information and the information for specifying the work content to the database server 3030 (step S3105). Similarly, when detecting that the worker takes out the worker specification IC tag 3062 from the throw-in port 3023 of the work management box 3021, the IC tag reader/writer 3022 transmits the communication end information with the worker specification IC tag 3062 and the information for specifying the worker to the database server 3030.

When receiving the communication end information and the information for specifying the work content from the IC tag reader/writer 3022, the database server 3030 adds the time information containing year, month and day (time stamp) to the information received and stores the information to the direction storage portion 3031 (step S3106). Similarly, when receiving the communication end information and the information for specifying the worker from the IC tag reader/writer 3022, the database server 3030 adds the time information containing year, month and day (time stamp) to the information received and stores the information to the direction storage portion 3031. After a series of these operations are conducted, the storage procedure of the work performance collection is completed.

Figure 24A:
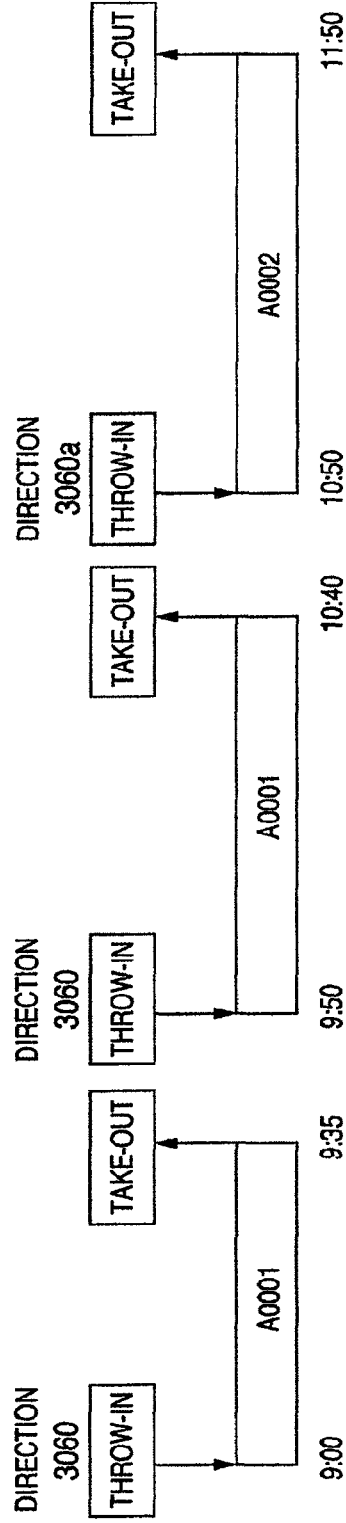
FIGS. 24A and 24B are explanatory views each showing the work performance collection data stored in a direction storage portion.
Figure 24B:
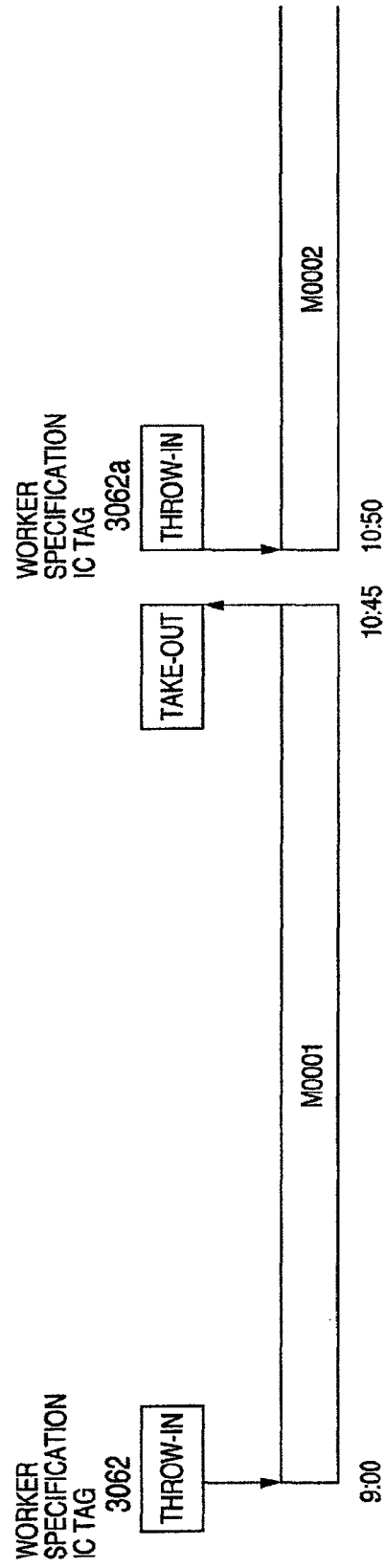

FIGS. 24A and 24B are explanatory views showing the work performance collection data stored in the direction storage portion to the work content A. Further, when the direction 3060 is thrown into the work management box 3021, the time 9:00 is stored as the communication start information to the work content A0001. When the direction 3060 is taken out from the work management box 3021, the time 9:35 is stored as the communication end information to the work content A. Further when the direction 3060 is thrown once again into the work management box 3021, the time 9:50 is stored as the communication start information to the work content A0001. When the direction 3060 is taken out from the work management box 3021, the time 10:40 is stored as the communication end information to the work content A0001. In consequence, it is possible to know that the worker once suspends working and again starts and ends working in accordance with the direction 3060. The time information is similarly stored, as shown in FIGS. 24A and 24B, when the worker throws the work specification IC tag 3061 into the work management box 3021 of another work area at the re-start, and the ends working by taking it out, too. The change of the work area can thus be identified from the ID of the work management box 3021 when the worker changes the work area.

When another direction 3060*a* is thrown into the work management box 3021, the time 10:50 is stored as the communication start information to the work content A0002. When the direction 3060*a* is taken out from the work management box 3021, the time 11:50 is stored as the communication end information to the work content A0002.

When the worker specification IC tag 3062 is thrown into the work management box 3021, the time 9:00 is stored as the communication start information to the worker M0001 and when the worker specification IC tag 3062 is taken out from the work management box 3021, the time 10:45 is stored as the communication end information to the worker M0001. When the worker specification IC tag 3062*a* is thrown into the work management box 3021, the time 10:50 is stored as the communication start information to the worker M0002. It can be thus understood that the workers take their turns after the work content A0001 is complete.

FIG. 25 is an explanatory view showing an example of work performance collection data. Information about direction No., throw-in time and take-out time, work process and worker is recorded as collection parameters of the work performance into a direction storage portion 3031. It can be appreciated from FIG. 25 that working of the work content (direction No.) A0001 as one of the entire work steps W0001, for example, is started by the worker M0001 at 9:00 on May 10, 2006 and is completed at 9:35. It can also be appreciated that the work content A0001 is again started by the worker M0001 at 9:50 on May 10, 2006 and is finished at 10:40.

It can also be appreciated that the work content (direction No.) A0002 is started by the worker M0002 at the throw-in time 10:50 on May 10, 2006 and is completed at the take-out time 11:50.

FIG. 26 is an explanatory view showing an example of the work performance collection result. The direction work performance list is subjected to the operation processing by the operation processing portion 3033 in accordance with the operation execution instruction of the manager terminal 3040 to create a list. The operation processing portion 3033 calculates the work time, the work interruption time and the number of times of interruption from the work performance data of the direction storage portion 3031, generates the direction work performance list and stores it to the work management storage portion 3032. Concretely, when a plurality each of throw-in time and take-out time exists with the same direction number (direction No.), the first throw-in time is set to the operation start time and the last take-out time is set to the work end time. The work time is different between the last take-out time and the first take-out time. The work interruption time is calculated from the difference between the intermediate throw-in time and the intermediate take-out time. In the case of the direction No. of A0001, for example, the work start time is 9:00, the work end time is 10:40 and their difference 1:40 is the work time. The interruption time is 15 minutes and the number of times of interruption is 1.

Figure 27A:
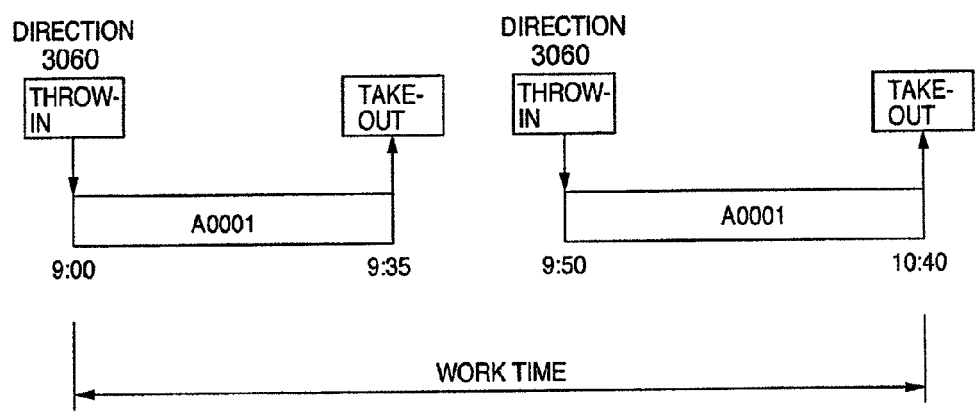
FIGS. 27A and 27B are explanatory views each showing an operation method of the work performance collection system.
Figure 27B:
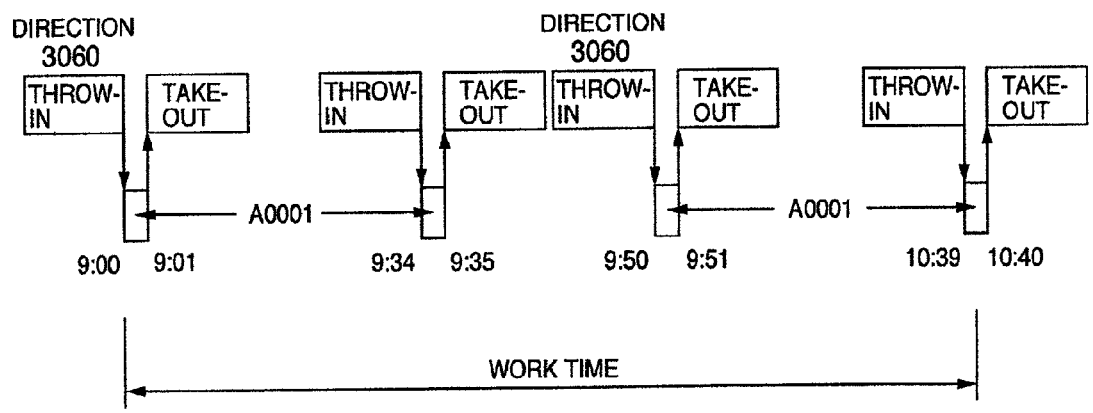

FIGS. 27A and 27B are explanatory views showing an operation method of a work performance collection system. Various methods must be taken into consideration as the operation method of the manager. In FIG. 27A, for example, a method is known that includes the steps of throwing the work specification IC tag 3061 into the work management box 3021 at the start of working, keeping the state during working and taking out the work specification IC tag 3061 from the work management box 3021 at the end of working (see FIG. 24). In FIG. 27B, there is shown a method involving the steps of throwing and taking the work specification IC tag 3061 into and out from the work management box 3021 at the start and end of working, respectively. In either method, when a plurality of throw-in time and take-out time exist with the same direction number (direction No.), the first throw-in time is set to the work start time and the last take-out time is set to the work end time.

According to the method shown in FIG. 27A, the work start time is 9:00, the work end time is 10:40 and their difference as the work time is 1:40 as shown in FIG. 26. The interruption time is 15 minutes and the number of times of interruption is 1. In contrast, according to the method shown in FIG. 27B, the work start time is 9:00 and the work end time is 10:40 in the same way as in the method shown in FIG. 27A but the interruption time and the number of times of interruption are not known. Therefore, the manager may select the operation method shown in FIG. 27A or 27B in accordance with the necessity for grasping the interruption time and the number of times of interruption.

According to this embodiment, the worker input terminal 3020 includes the work management box 3021 having the throw-in port 3023 into which the work specification ID tag 3061 having the information for specifying the work content is thrown, and the ID tag reader/writer 3022, which is disposed in the work management box 3021, for reading the work specification ID tag 10 and transmitting the information read to the database. The IC tag reader/writer 3022 reports the throw-in time to the database server 3030 when communication with the work specification IC tag 3061 can be made and the take-out time to the database server 3030 when the communication with the work specification IC tag 3061 is cut off. Therefore, the worker is required to only throw the work specification IC tag into the work management box at the start of working and to only take out the work specification IC tag from the work management box at the end of working. Because the throw-in time of the work specification IC tag and its take-out time are stored in the database, the substantial work time can be collected even when the worker takes out the work specification IC tag at an intermediate part of working.

The database server 3030 stores the work performances by associating predetermined items with one another. When a plurality each of throw-in times and take-out times exist in the work performances stored in accordance with the predetermined items, the calculation is executed by setting the first throw-in time to the work start time and the last take-out time to the work end time. Furthermore, the database server 3030 can calculate the work time, the work interruption time or the number of times of work interruption from the difference between the throw-in time and the take-out time.

In the embodiment described above, the IC tags thrown into the work management box 3021 are the work specification IC tag 3061 and the worker specification IC tag 3062, by way of example. However, the IC tags are not particularly limited to the work specification IC tag 3061 and the worker specification IC tag 3062. For example, the IC tags may include a process specification IC tag, a component specification tag or a work area specification IC tag for specifying the work area. An IC tag for managing traceability may be used, too. Traceability information for identifying production history must be recorded to the traceability management IC tag to trace the manufacturing date and the associated production equipment from the production serial number and the production lot number or to ascertain the same production history. The basic information of the traceability information is the information about the components constituting the product and is furthermore the discrete identification information of the components used in practice. In other words, the basic traceability information is so-called "BOM (Bill of Materials)" and is the names and models of the component and their manufacturing serial numbers or manufacturing lot numbers of one product. Information for specifying the work content of the work object article or information for specifying the work area may further be contained.

Still another embodiment of the invention will be explained. This embodiment explains a metal mold as an example of resources. Although this invention relates to inventions of a workability management system, a workability management method and a workability management program, the following explanation will mainly deal with the workability management system.

Figure 28:
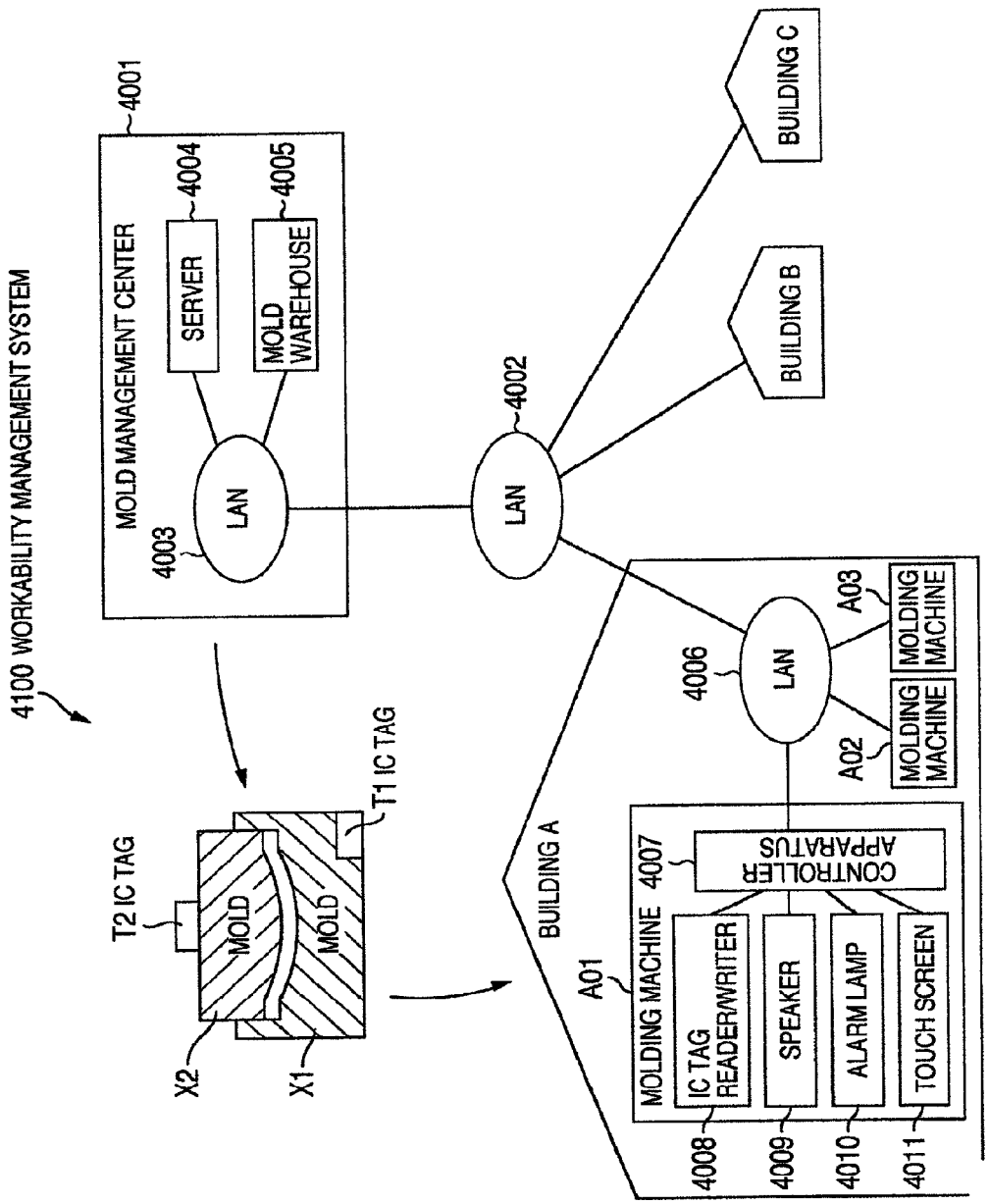
FIG. 28 is a block diagram showing a construction of a workability management system according to an embodiment of the invention.

To begin with, the construction of the workability management system of this embodiment will be explained. FIG. 28 is a block diagram showing the construction of the workability management system of this embodiment. It will be assumed that this workability management system 4100 includes a mold management center 4001, buildings A, B and C and LAN (Local Area Network) 4002 inside a predetermined site.

This embodiment assumes the case where communication can be made between the mold management center 4001 and the buildings A, B and C through the LAN 4002 but WAN (Wide Area Network) may also be used. In this case, the mold management center 4001 and the buildings A, B and C need not always be installed inside the same site. For example, the mold management center 4001 may be installed inside the building A.

The mold management center 4001 includes LAN 4003 for intra-communication of the mold management center 4001, a server (mold management apparatus) 4004 connected to this LAN 4003, for managing the information of workability of the mold as will be later described, and a mold warehouse 4005 having a communication interface that is connected to the LAN 4003 and is not shown in the drawing.

Molding machines A01, A02 and A03 and LAN 6 are installed inside the building A. Here, A01, etc, is the molding machine ID. Incidentally, the explanation of the buildings B and C will be omitted because they have the same construction as that of the building A. The ID of the molding machines installed in the buildings B and C are B01, etc, and C01, etc, respectively. Furthermore, the number of molding machines A01, etc, installed in each structure is not limited to 3 and the LANs 4002, 4003 and 4006 may be either wired or wireless.

The molding machine A01 includes a controller 4007 such as a microcomputer, an IC tag reader/writer 4008, a speaker 4009, an alarm lamp 4010 and a touch screen 4011. The controller 4007 controls the operation of the molding machine A01. The controller 4007 submits the information inputted from the IC tag reader/writer 4008 and the touch screen 4011 to the touch screen 4011 and executes communication with the mold management center 4001 through an interface, not shown, and through the LAN 4006. The controller 4007 further outputs various kinds of information from the speaker 4009 and the touch screen 4011, and turns on the alarm lamp 4010 when any alarm exists.

Figure 29:
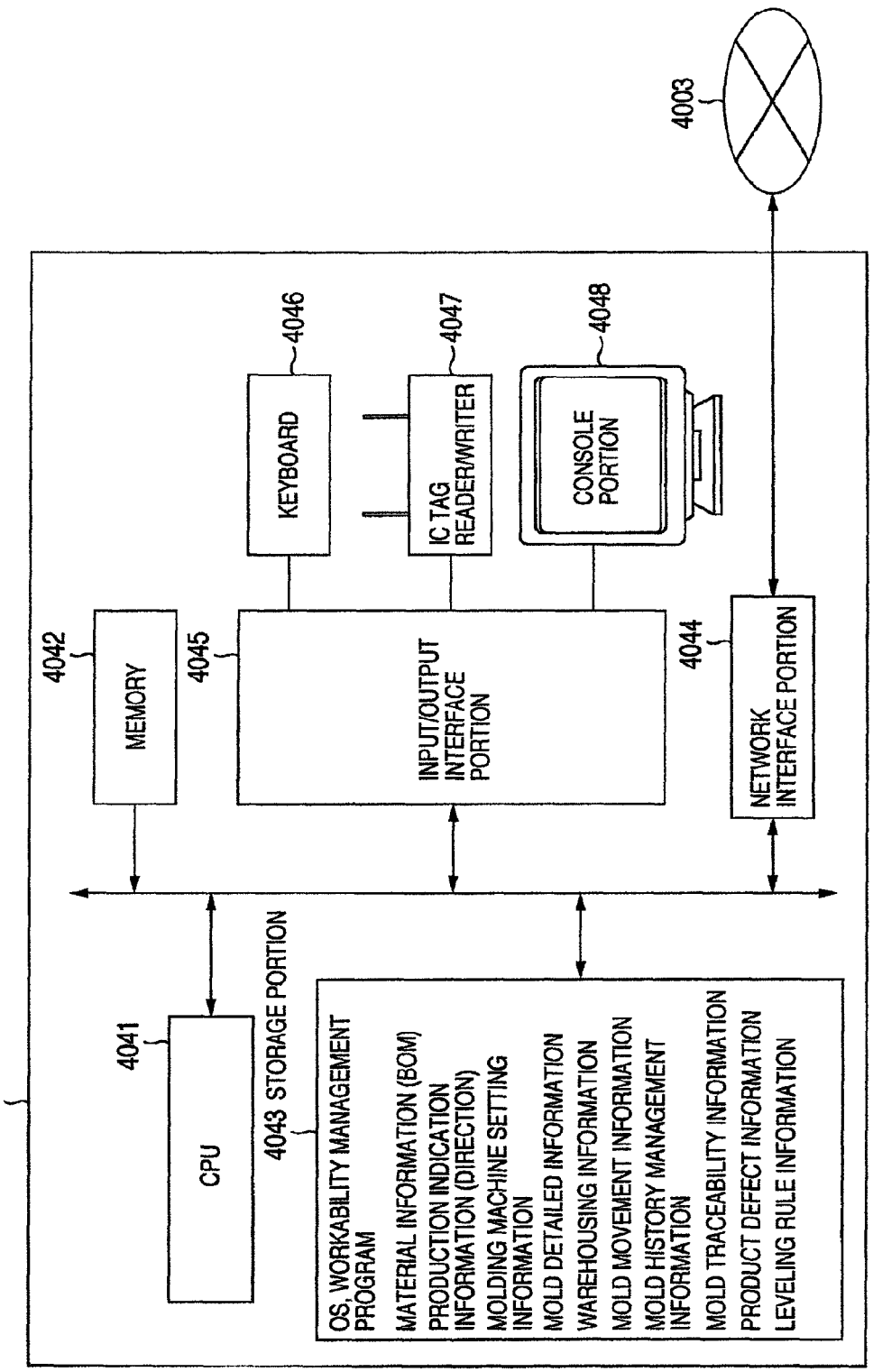
FIG. 29 is a block diagram showing a construction of a server according to an embodiment of the invention.

Next, the construction of the server (computer) 4004 will be explained. FIG. 29 is a block diagram showing the construction of the server according to this embodiment. This server 4004 includes CPU (Central Processing Unit) 4041, a memory 4042, a storage portion (storage medium) 4043, a network interface portion 4044, an input/output interface portion 4045, a keyboard 4046, an IC tag reader/writer 4047 and a console portion 4048 such as a display.

The CPU (processing portion) 4041 expands and executes an OS (Operating System) and a workability management program on the memory 4042. The memory 4042 is RAM (Random Access Memory). The storage portion 4043 is an HD (Hard Disk) or a flash memory for storing the OS, the workability management program and various kinds of other information. The various kinds of information include material information (BOM: Bill of Materials), production indication information (direction), molding machine setting information, mold detailed information, warehousing information (also called "work history information"), mold history management information (also called "work history information"), mold traceability information (also called "total use information"), product defect information, leveling rule information (also called "priority reference information"), and so forth. Detail of each kind of information will be later described.

The network interface portion 4044 controls the communication with LAN 4003. The input/output interface portion 4045 controls the input/output operations among the keyboard 4046, the IC tag reader/writer 4047 and the console portion 4048.

Figure 30:
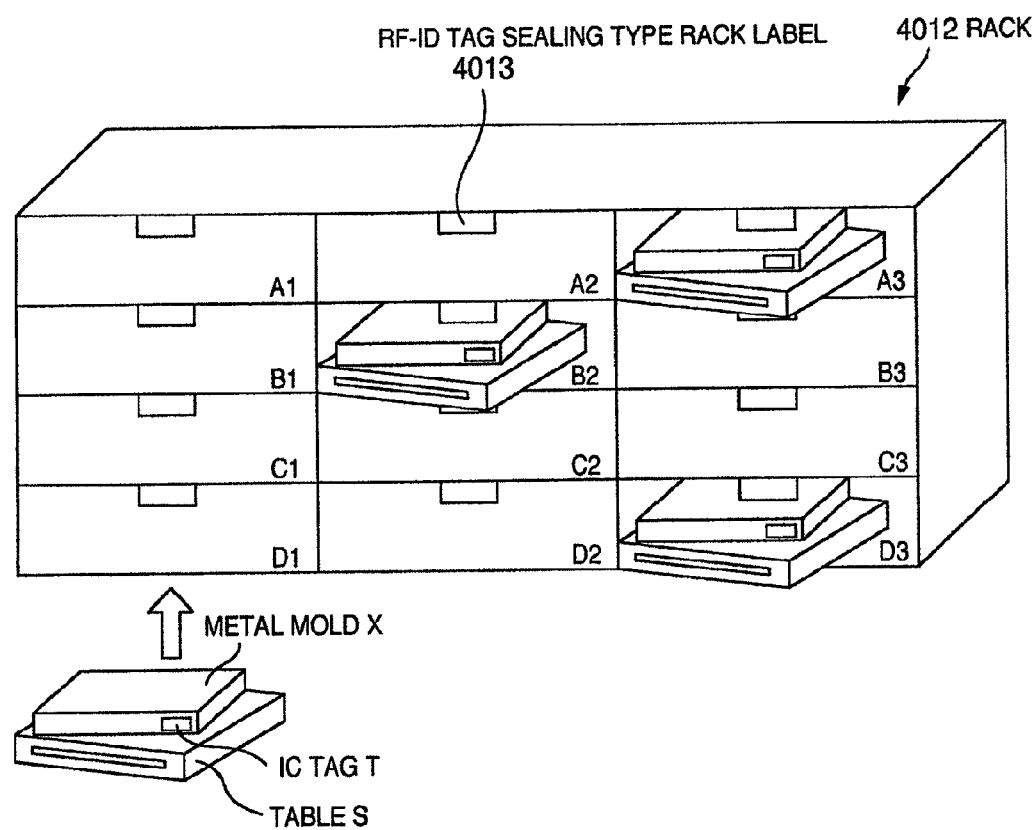
FIG. 30 is an explanatory view useful for explaining an example of a rack for storing metal molds in a mold warehouse shown in FIG. 1.

Next, an example of the accommodation state of molds inside the mold warehouse 4005 will be explained. FIG. 30 is an explanatory view showing an example of a rack for accommodating the molds in the mold warehouse shown in FIG. 28. The rack 4012 is divided into accommodation racks A1, etc, of 4×3 stages. In this accommodation racks A1, etc, the accommodation rack ID of A1, A2, A3 from the left of the uppermost stage, B1, B2, B3 from the left of the second stage, C1, C2, C3 from the left of the third stage and D1, D2 and D3 from the fourth (lowermost) stage are allocated, respectively. An RF-ID (Radio Frequency Identification) tag sealing type rack label 4013 is attached to each accommodation rack A1, etc, and each accommodation rack ID is saved.

On the other hand, the mold X accommodated in each accommodation rack A1, etc is put on a table S and is carried. An IC tag reader/writer, not shown, is mounted to the table S. When the table S is accommodated in each accommodation rack A1, etc, the IC tag reader/writer reads out the mold ID (mold identification information (resource identification information)) from the IC tag T attached to the mold X and the rack ID of the accommodation rack A1, etc, from the RF-ID tag sealing type rack label 4013 attached to each accommodation rack A1, etc, and transfers the mold ID and the rack ID to the server 4004 through the communication interface and LAN 4002, not shown in the drawings.

Figure 31:
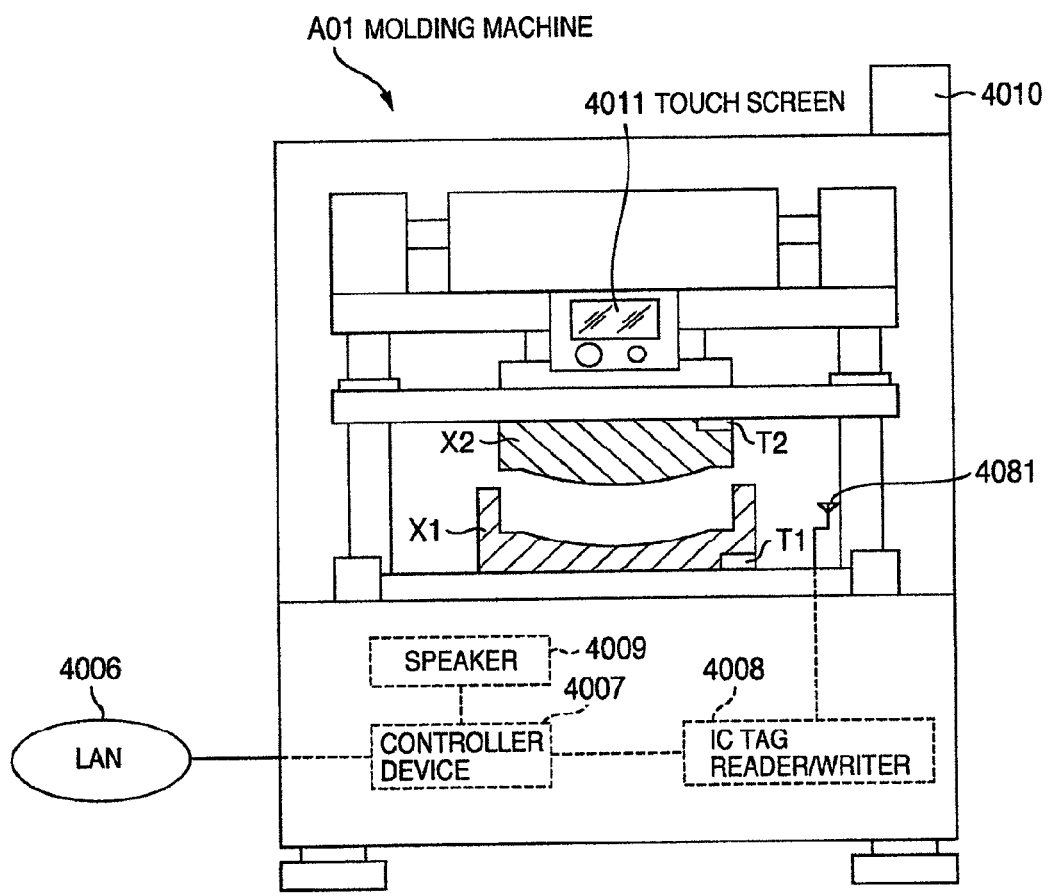
FIG. 31 is an explanatory view showing a front surface of a molding machine shown in FIG. 1.

Next, the molding machine A01, etc, will be explained. FIG. 31 is an explanatory view showing the front surface of the molding machine shown in FIG. 28. This molding machine A01, etc, includes the controller 4007, the IC tag reader/writer 4008, the speaker 4009, the alarm lamp 4010 and the touch screen 4011 that are mounted to the molding machine as described above. An antenna 4081 connected to the IC tag reader/writer 4008 is set up within a range in which it can communicate with the IC tags T1 and T2 of the molds X1 and X2 mounted to the molding machine A01. In other words, the IC tag reader/writer 4008 reads the mold ID from the IC tags T1 and T2 via the antenna 4081 when the molds X1 and X2 are fitted to the molding machine A01 and then delivers the mold ID to the controller 4007. At this time, the controller 4007 acquires the time of a timepiece, not shown, as the time stamp, associates the time stamp with the mold ID and transfers them to the server 4004.

When the molds X1 and X2 are demounted from the molding machine A01 and when the IC tag reader/writer 4008 is out of the range of communication with the IC tags T1 and T2 of the antenna 4081, the IC tag reader/writer 4008 delivers the information to the controller 4007. The controller 4007 acquires the time of a timepiece, not shown, as the time stamp, associates the time stamp with the mold ID and transfers them to the server 4004.

Figure 32:
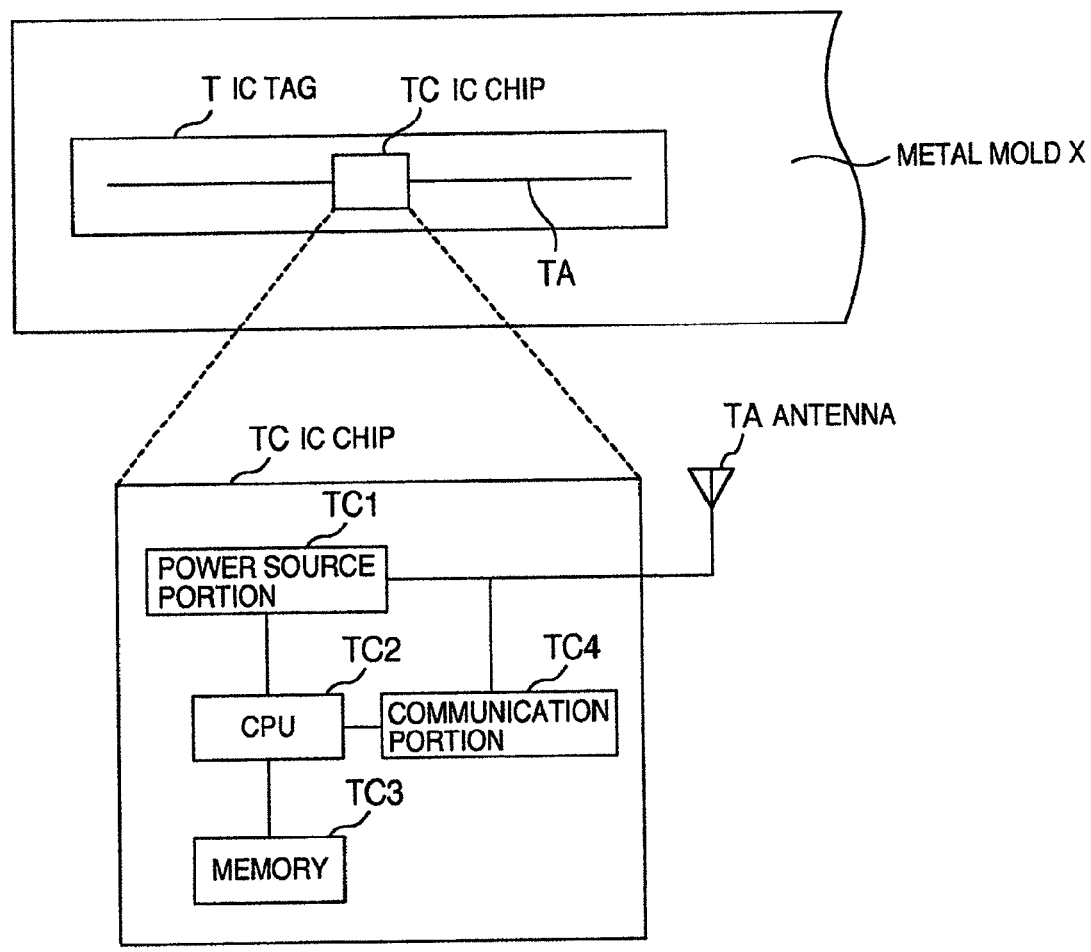
FIG. 32 is an explanatory view showing a structure of an IC tag attached to the mold used in the embodiment of the invention.

Next, the construction of the IC tag T fitted to the mold X will be explained. FIG. 32 is an explanatory view showing the construction of the IC tag fitted to the mold used in this embodiment. The IC tag T fitted to this mold X has an IC chip TC and an antenna TA that are built in. The IC chip TC has a power source portion TC1, a CPU TC2, a memory TC3 and a communication portion TC4 that are built in. An antenna TA is connected in parallel with the power source portion TC1 and the communication portion TC4. Therefore, the signal inputted from the antenna TA is received by the communication portion TC4. Power of the signal inputted from the antenna TA is handed over to the power source portion TC1 and is used as power for the operation of the CPU TC2. The memory TC3 is a non-volatile memory such as a flash memory. This memory stores the mold ID. Incidentally, the RF-ID tag sealing type rack label 4013 (see FIG. 30), too, has a similar construction.

Here, the flow from the delivery of the mold till its discard through maintenance will be briefly explained with appropriate reference to FIGS. 28 to 31. When the ordered mold is delivered from a mold manufacturer, a worker at the mold management center 4001 attaches the IC tag storing a predetermined mold ID to the mold. Registration of the mold ID to the IC tag attached to the mold at this time may be executed by using the IC tag reader/writer 4047 of the server 4004 or the IC tag reader/writer, not shown, of the mold warehouse 4005. The server 4004 associates the mold ID stored in the IC tag, the mold name, maintenance information (schedule) and the mold specification information with one another and registers them as mold detailed information.

Next, the worker puts the mold to a suitable position of the rack 4012 of the mold warehouse 4005 and the IC reader/writer, not shown, reads the mold ID and the rack ID from the IC tag T of the mold and from the RF-ID tag sealing type rack label 4013, respectively, links them together and sends them to the server 4004 through the LAN 4003. The server 4004 links the mold ID and the rack ID and stores them as mold warehousing information to the storage portion 4043 by associating these ID with the time of the timepiece, not shown.

When BOM and a direction are issued in accordance with the production plan, the worker takes out the necessary mold from the mold warehouse 4005 as shown in FIG. 30. The mold number and the mold type are submitted to BOM as will be later described (FIG. 35). In the mold warehouse 4005, the IC tag reader/writer, not shown, reads the mold ID and the rack ID from the IC tag T of the mold X taken out and from the RF-ID tag sealing type rack label accommodated in the IC tag T and sends the information to the server 4004 through the LAN 4003. Then, the server 4004 retrieves the mold warehousing information with the mold type or mold name of the mold as the key or the mold ID and the rack ID as the key, takes out the corresponding mold warehousing information, and stores the information as the mold warehousing information in the storage portion 4043 in such a manner as to correspond to the mold warehousing information taken out by using the time of the timepiece, not shown, as the mold outgoing time.

Next, when the worker fits the mold X (X1, X2) to the molding machine A01 as shown in FIG. 31, the IC tag reader/writer 4008 in the molding machine A01 reads the mold ID from the IC tag T (T1, T2) of the mold X, links the time with the molding machine ID and sends the information to the server 4004 through the LAN 4006, 4002 and 4003. Then, the server 4004 allocates the time linked with the mold ID and the molding machine ID as the start time to the mold movement information and the mold history management information, and stores the information to the storage portion 4043.

After molding of the product is completed, the worker demounts the mold X (X1, X2) from the molding machine A01 as shown in FIG. 31. In the molding machine A01, the IC tag reader/writer 4008 reads the mold ID from the IC tag T (T1, T2) of the mold X, links the time with the molding machine ID and sends the information to the server 4004 through the LAN 4006, 4002 and 4003. Then, the server 4004 allocates the time linked with the mold ID and the molding machine ID as the end time to the mold movement information and the mold history management information and stores the information to the storage portion 4043.

Next, each of the information stored in the storage portion shown in FIG. 29 will be explained. Hereinafter, mold detailed information, mold warehousing information, material information (BOM), direction (production indication information), molding machine setting information, mold movement information, mold history management information, traceability information, product defect information and leveling rule information will be serially explained.

FIG. 33 is a table for explaining the mold detailed information. This mold detailed information links the mold name, maintenance information (maintenance 1, maintenance 2, maintenance 3, . . . ), use inhibition flag and mold specification information with the mold ID. In other words, when the mold ID is specified, the mold name, the maintenance information, the use inhibition flag and the mold specification information can be known. The mold ID uses the serial number of a mold manufacturer or the management number of the user. The mold name and the mold specification information are the information provided by the mold manufacturer.

The maintenance information represents the date of performance and its scheduled date when the mold is periodically executed. When maintenance is not made even though the maintenance schedule date is reached, for example, the use inhibition flag provides the judgment rule for inhibiting the use of the object mold. Here, maintenance is carried out when a predetermined period elapses (when a predetermined total use time (total use information) elapses). For example, the maintenance is carried out every four months. When the mold is put into the mold warehouse 4005 after the maintenance is executed, this putting date is updated as the performance date of the maintenance. The next maintenance schedule date is set to the date after the passage of the predetermined period such as four months from this performance date and is added to the column added afresh.

Incidentally, the period from mounting of the mold to the molding machine to its demounting from the molding machine may be counted as the total use period, or the time in which the molding machine is under operation and uses the mold may be counted, too. The use time of the mold may further be calculated from the work start date indicated by the direction and the work end date (schedule) without actually counting the time of using the mold.

The maintenance information may be the number of times of shots of the mold instead of the date. In this case, the number of times of shots may be counted by providing an acceleration sensor to the mold and calculating the number of times of shots from the change of the acceleration of the acceleration sensor, or by using a counter built in the molding machine and not shown in the drawing. The number of times of shots may further be calculated by adding the production performance numbers of the directions. In this case, the information to be added is called "total use number-of-times (total use information)" in the same way as the total use time. However, overlap of inherent ID is preferably avoided.

Incidentally, the mold ID may well be allocated in advance to the IC tag itself. In other words, when the ID inherent to the IC tag is stored, the inherent ID may be read out and utilized as the mold ID.

Maintenance of molds includes, for example, cleaning for removing adhesion of resin, build-up welding for deficits of inner walls of the molds and application of a coating agent to a peel position of the doting agent. In the case of this embodiment, maintenance of the IC tag such as the bonding condition of the IC tag is preferably conducted.

As damage forms of the mold, life factors (discard factors) of the cold mold includes wear, seizure, breakage, fragmentation, crack, deformation, and so forth. Life factors of the hot mold include wear, heat check (thermal fatigue crack), breakage, cracks, deformation, permanent set, and so forth. Therefore, their physical and chemical inspections are also included in the maintenance.

FIG. 34 is a table for explaining the mold warehousing information. This mold warehousing information links the mold name, the entering date, the time (entering date), the rack position, the outgoing date and the time (outgoing time) with the mold ID. Therefore, other information can be referred to in this mold warehousing information, too, if the mold ID is specified, and each kind of information can be updated, too. The mold ID, the mold name, the entry date, the entry time and the rack position are lined at the time of entry and are stored. At the time of outgoing, the outgoing date and the time (outgoing time) are linked and stored.

Incidentally, the mold warehousing information may be updated whenever the warehousing operation is made, or may be stored every time to a new record and stored as history. When the mold is accommodated into a different rack next time, the information may be updated to the new rack position and the entry date and the time (entry time) may be updated, too. In this case, the data of the columns of the outgoing date and the time (outgoing) are updated to "Null".

FIG. 35 is a table for explaining the material information (BOM). This BOM links the product name and its material (name) and the models and types of the mold (upper mold) and the mold D (lower mold). Here, the term "material" is a work, which is molded into the product by the mold. When the product is a cup formed of a resin, for example, the material (work) is a sheet of a resin. Because the model number and the type of the mold are linked in this way with the BOM, it is possible to refer to the mold detailed information (see FIG. 33) linked with the model number and the type of the mold. Though the model number and the type of the mold are hereby linked with the BOM, the mold ID may be linked, too.

FIG. 36 is a table for explaining the information of the direction (production indication information). In the information of this direction (production indication information), the production indication number (direction ID), the product ID, the product name, the production indication number, the production performance number and the completion date are linked. Because the production performance number is represented, the performance of the mold can be expressed by the product of the direction production number and the number of shots per product. The END-START (Time) direction work time such as the start date of the object direction and the end time may be linked as the performance as described already. It is hereby possible to acquire the actual shot number counted by the molding machine and to use it as the performance of the mold, though the detailed explanation is omitted.

By the way, the product ID of the direction is linked with the product ID of the BOM. In other words, when the direction is specified, the BOM can be specified, too, and when the BOM is specified, the direction can be specified. The information of the direction is displayed in a predetermined form by print-out or on the display window. The display form may be of any type and may be of the table form shown in this embodiment.

FIG. 37 is a table for explaining the molding machine setting information. In this molding machine setting information, set values of various kinds of setting information (XXXXX, etc) are linked with the molding machine ID. An example is a value of a pressure applied to the mold. The molding machine setting information may be sent either automatically or by the instruction of the worker from the side of the server 4004 during the operation of the molding machine.

FIG. 38 is a table for explaining the mold movement information. In this mold movement information, the direction ID, the molding machine (molding machine ID), the operation date, the start time, the end time and the operation time are linked with the mold ID. When a mold is taken out from the mold warehouse 4005 and is used by turns by a plurality of molding machines, the mold movement information is used for recording the time (operation time) from fitting of the mold to each molding machine to its removal. Here, the operation time is calculated from the operation date and the time stamp of the start (time) and the time stamp of the end (time).

FIG. 39 is a table for explaining the mold history management information. This mold history management information links the start (time) of a status and its end (time) and a daily total and a full total for each mold when the status such as an operation, an inspection, etc, occurs. Incidentally, the term "total" represents "total use time (total use information)".

FIG. 40 is a table for explaining traceability information of the mold for each direction. In this traceability information, the molding machine ID, the use mold name, the mold ID, the use start time Start and the use end time End are linked with the direction ID. This traceability information can be generated by extracting necessary information from the direction (FIG. 36), the mold movement information (FIG. 38) and the mold history management information (FIG. 39). In other words, the traceability information is generated by tracing these kinds of information when any defect occurs in the product.

FIG. 41 is a table for explaining product defect information. In this product defect information, the product type (mold ID), a defect code and the direction ID are linked. Incidentally, it will be assumed that the product type is marked on the product. In this case, the product type of the product defect information is inputted by a worker who reads the mark, through a keyboard or the like, not shown. This also holds true of the defect code. The term "product type" represents the product ID.

Therefore, the direction ID can be acquired by looking up the information of the direction (see FIG. 36) linked with the product ID and extracting the corresponding value. This may be the case where the label having the product type printed thereon is attached to the product, the case where the direction ID is stored in the IC tag in the IC tag bonded to the product and the case where a bar code label to which the product type is allocated is attached to the product. As the traceability information (see FIG. 40) is generated with the direction ID of the product defect information as the key, it is possible to trace by which mold the object product is produced.

FIG. 42 is a table for explaining leveling rule information. This leveling rule information (preference reference information) is the rule for indicating which of the molds of the same type should be used preferentially and the mold ID of the same type are linked with one another. Examples of the leveling rule information include the case where "a mold having a smaller total use time is to be used preferentially", the case where "a mold having a smaller number of times of use is to be used preferentially" and the case where "a mold of the latest maintenance is to be used preferentially". Incidentally, this leveling rule information is freely changeable by the worker.

Figure 43:
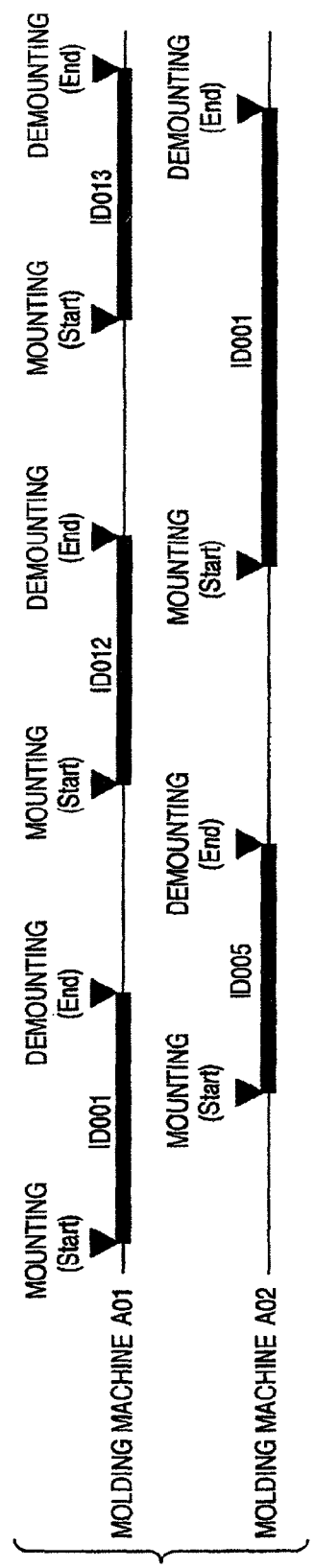
FIG. 43 is a time chart useful for explaining the relation between mold mounting/demounting performance to and from a molding machine and a time stamp in a total time management.

Next, the relation between the mold mounting/demounting performance to and from the mold machine and the time stamp in the case of the total time management will be explained. FIG. 43 is a time chart for explaining the relation between the mold mouthing/demounting performance to and from the molding machine and the time stamp in the case of the total time management. The time chart shows the case where the molds of the ID001, ID012 and ID013 are mounted and demounted to and from the molding machine A01 and the molds of the ID005 and ID001 are mounted and demounted to and from the molding machine A02. The abscissa represents the time having its base on UTC (Coordinated Universal Time) as the reference (this time will be hereinafter called "absolute time").

Therefore, the total time in which the mold would be operated on the molding machine can be calculated by recording the time stamp at the time of mounting of the mold and recording also the time stamp at the time of demounting of the mold. In other words, the time from mounting till demounting of the mold is regarded as the operation time of the mold. Incidentally, it will be hereby assumed that the molding machines A01 and A02 using the respective molds are operated in accordance with the mutually different directions.

Figure 44:
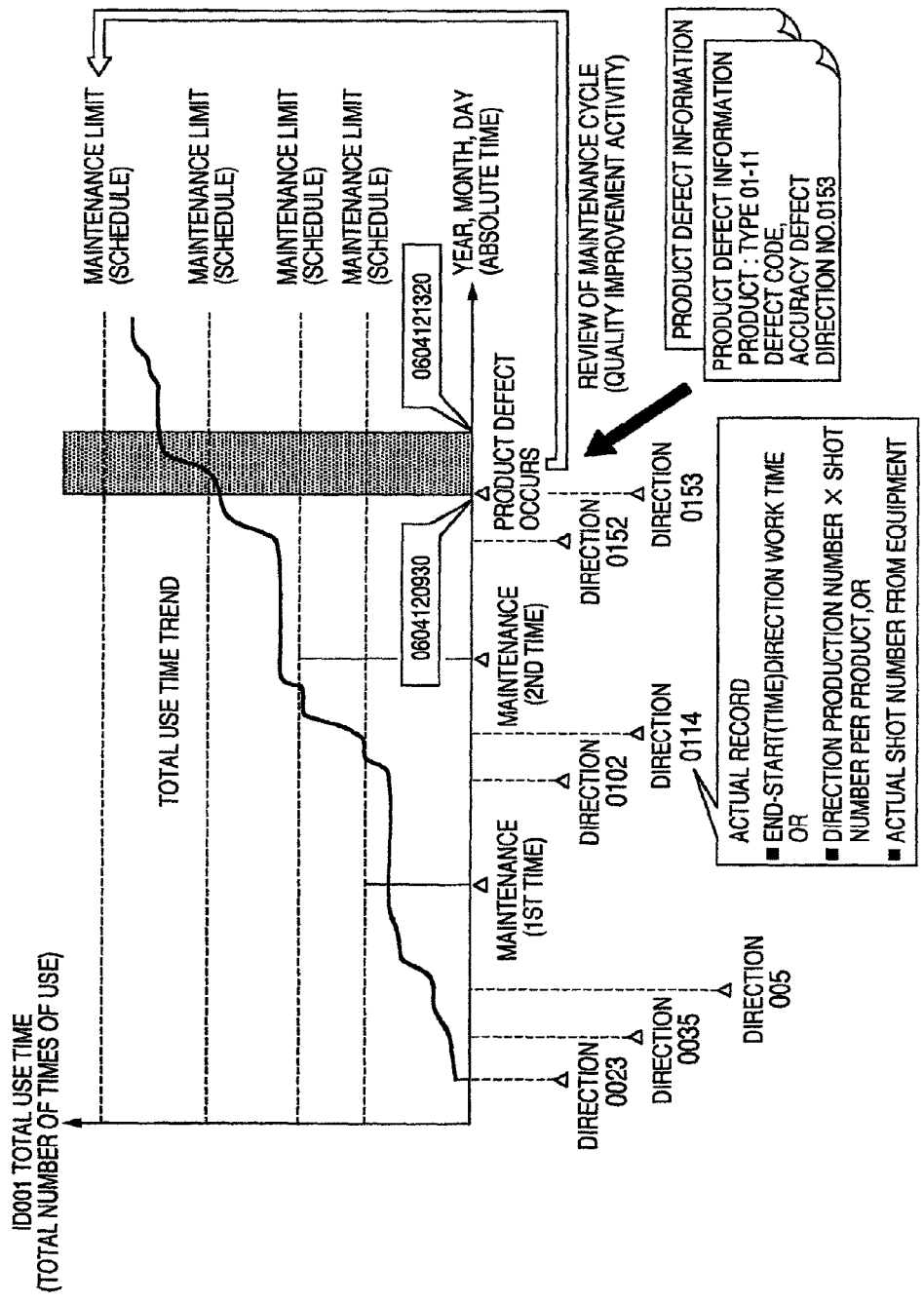
FIG. 44 is a diagram useful for explaining a casual sequence graph acquired by workability analysis.

Next, the casual sequence acquired by workability analysis will be explained. FIG. 44 is a diagram showing an example of a casual sequence graph acquired by workability analysis. The graph hereby illustrates a casual sequence of the mold ID001. An absolute time is plotted on the abscissa and the total use time, on the ordinate. Incidentally, the total use time may be similarly plotted on the ordinate. The graph represents a total use time trend of the mold ID001 by plotting the total use time of the mold ID001 from the mold movement information shown in FIG. 38 and the mold history management information shown in FIG. 39. The performance of maintenance is submitted on the basis of the mold detailed information in FIG. 33. The maintenance limit (schedule) is four months, for example. This is also based on the mold detailed information shown in FIG. 33.

This total use time trend feeds back and displays the direction information about the occurrence (or the possibility of occurrence) of the product defect originating from mold quality among product information (inspection information) of the product. Hatching represents a period (absolute time) in which the product is produced on the basis of the direction of the direction ID contained in the product defect information shown in FIG. 41. In other words, the products produced by using the mold used in this period have high possibility of defect.

In this graph, the direction ID used for the corresponding absolute time is added to the abscissa. It can be understood that working is started by the direction 0023 and that the first maintenance is carried out during the use of the direction 005. It can be further understood that in the hatched range, in particular, the direction inviting the product defect is ID0153. Because the performance can be known from the direction as has been explained with reference to FIG. 36, it can be estimated that the products produced by the direction have high possibility of defect. Because the occurrence of the product defect can be grasped in the total use time trend, the trend is useful for improving quality such as re-examination of the maintenance cycle.

Because the worker can know that maintenance is not appropriately conducted at the maintenance limit (schedule) when the casual sequence graph is displayed on the picture window or printed out, the maintenance cycle can be checked once again.

Figure 45:
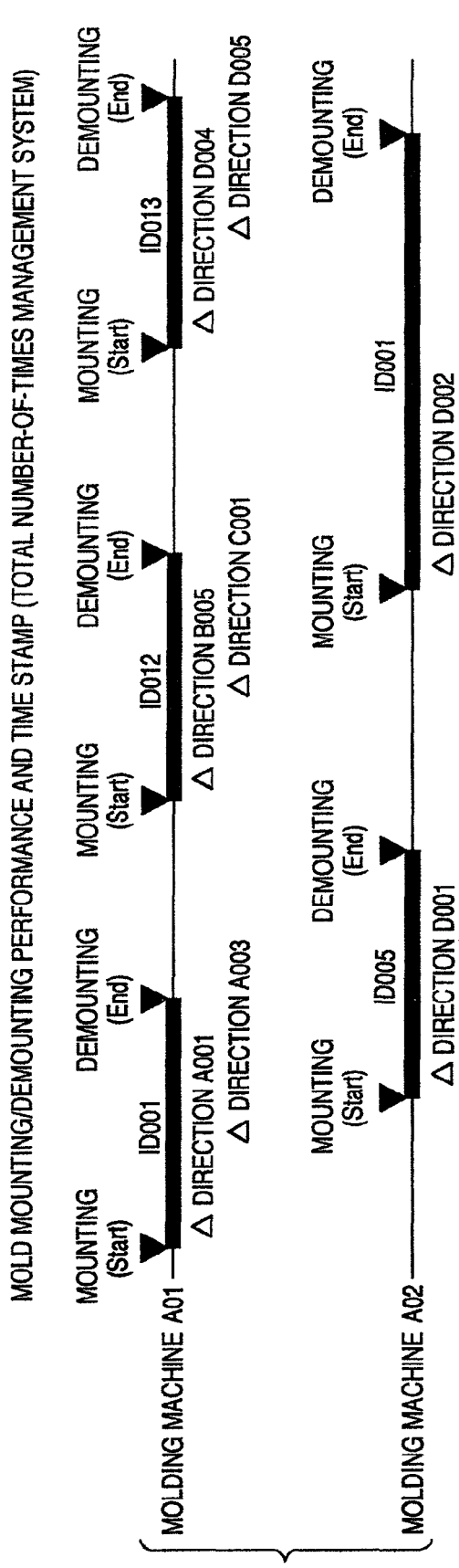
FIG. 45 is a time chart useful for explaining the relation between mold mounting/demounting performance to and from the molding machine and a time stamp in a total number-of-times management.

Next, the relation between the mold mounting/demounting performance to and from the molding machine and the time stamp in the case of the total number-of-times management will be explained. FIG. 45 is a time chart useful for explaining the relation between the mold mounting/demounting performance to and from the molding machine and the time stamp in the case of the total number-of-times management. In this case, too, the chart represents the case where the molds of ID001, ID012 and ID013 are mounted and demounted to and from the molding machine A01 and the case where the molds ID005 and ID001 are mounted and demounted to and from the molding machine A02. The abscissa represents the absolute time.

In this case, the number of shots after mounting of the mold is calculated from the direction. When working is conducted on the basis of the two directions, i.e. the direction A001 and the direction A003 in the case of the mold ID001 mounted to the molding machine A01, for example, the sum of the production indication number designated by the direction A001 and the production indication number designated by the direction A003 can be calculated as the number of shots. Incidentally, it is also possible to monitor the operating condition of the molding machine A01 and to count the actual number of shots.

Figure 46:
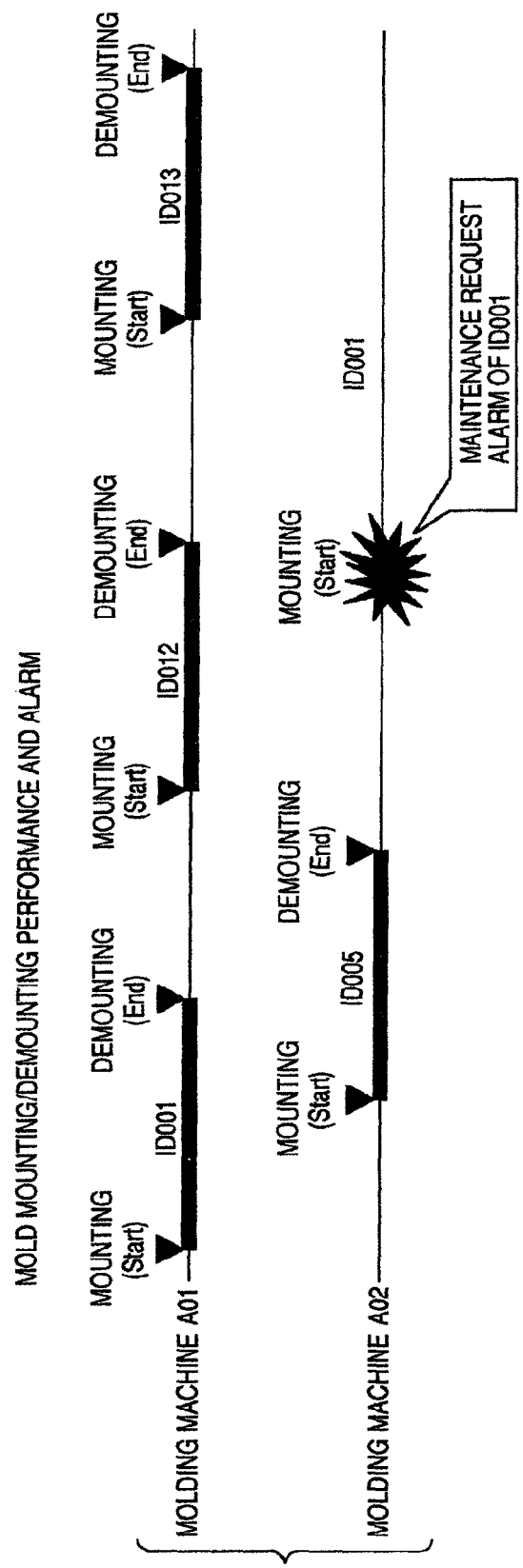
FIG. 46 is a time chart useful for explaining the relation between mounting/demounting of the mold and an alarm.

Next, the concept of an indication method for inhibiting the use of a predetermined mold or molds will be explained. FIG. 46 is a time chart for explaining the relation between mold mounting/demounting and an alarm. The server 4004 receives the mold outgoing information from the molding machine A02 when the mold ID001 is mounted to the molding machine A02 and the CPU 4041 looks up the use inhibition flag contained in the mold detailed information shown in FIG. 33. When the use inhibition flag stands (× mark in FIG. 33), the CPU 4041 generates an instruction for indicating the use inhibition and sends the indication to the molding machine A02. Then, the molding machine A02 raises an alarm from the speaker 4009, turns ON the alarm lamp 4010 or displays the message on the touch screen 4011. The mold outgoing indication may be sent to the mold warehouse 4005 when the mold X outgoes from the mold warehouse 4005. In this case, the speaker provided to the mold warehouse 4005, not shown in the drawing, may raise the alarm.

Figure 47:
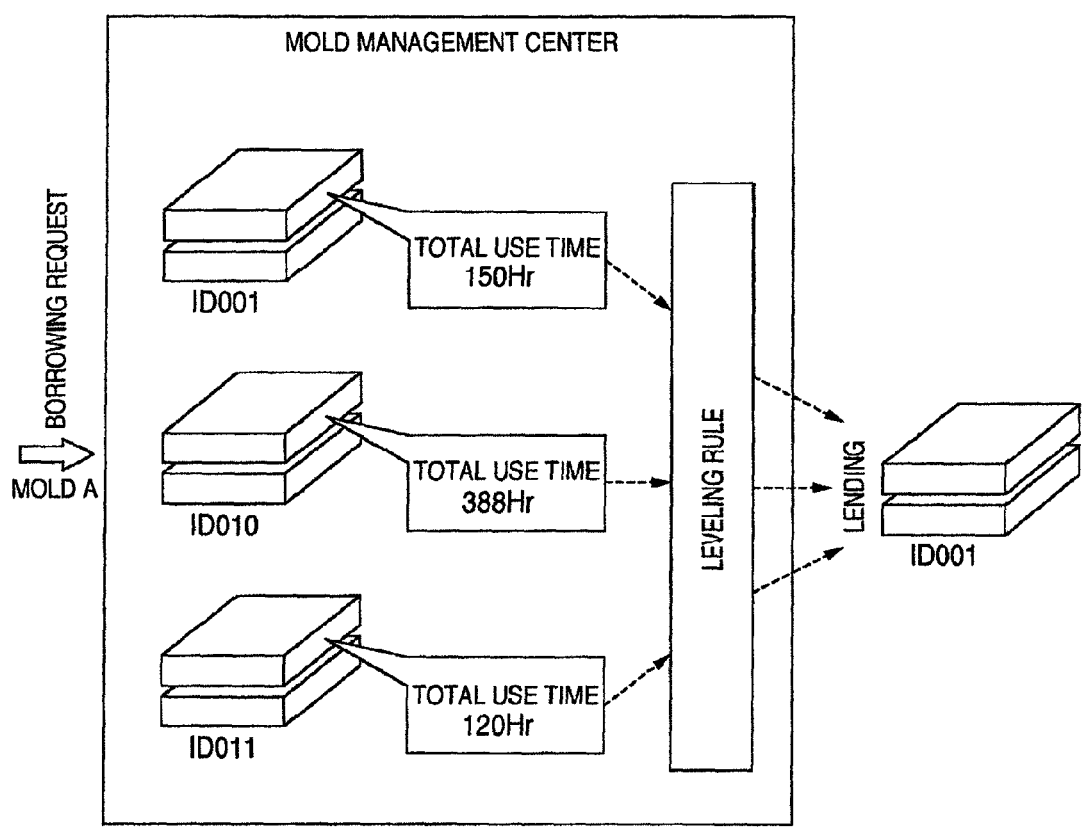
FIG. 47 is an explanatory view useful for explaining the concept of a leveling rule.

Next, the concept of the leveling rule will be explained. FIG. 47 shows an explanatory view for explaining the concept of the leveling rule. In the mold management center 4001, the server 4004 accepts a borrowing request of a mold of a type A, for example, then looks up the mold detailed information (FIG. 33) and extracts the corresponding mold detailed information. The server 4004 extracts the total use time of the respective molds by using the mold ID contained in the corresponding mold detailed information as the key. Further, the server 4004 extracts the leveling rule information containing a corresponding the mold ID as the key. Furthermore, when the leveling rule gives a higher priority to "a shorter total use time", the server 4004 compares the total use time of each mold ID and selects the mold of corresponding ID 011. The server 4004 displays the selection result on the display device, not shown, reports it to the worker and lends the mold of ID 001 of the type A. Therefore, the use of the molds of the same kind can be leveled.

Subsequently, the processing of the server 4004 will be explained in further detail in accordance with the flowcharts of FIGS. 48 to 51 with appropriate reference to FIGS. 28 to 47. The explanation will be given dividedly on the delivery of the mold, processing at the time of entry of the mold, processing at the time of outgoing of the mold, processing during the operation of the mold and the work analysis processing of the mold.

Figure 48:
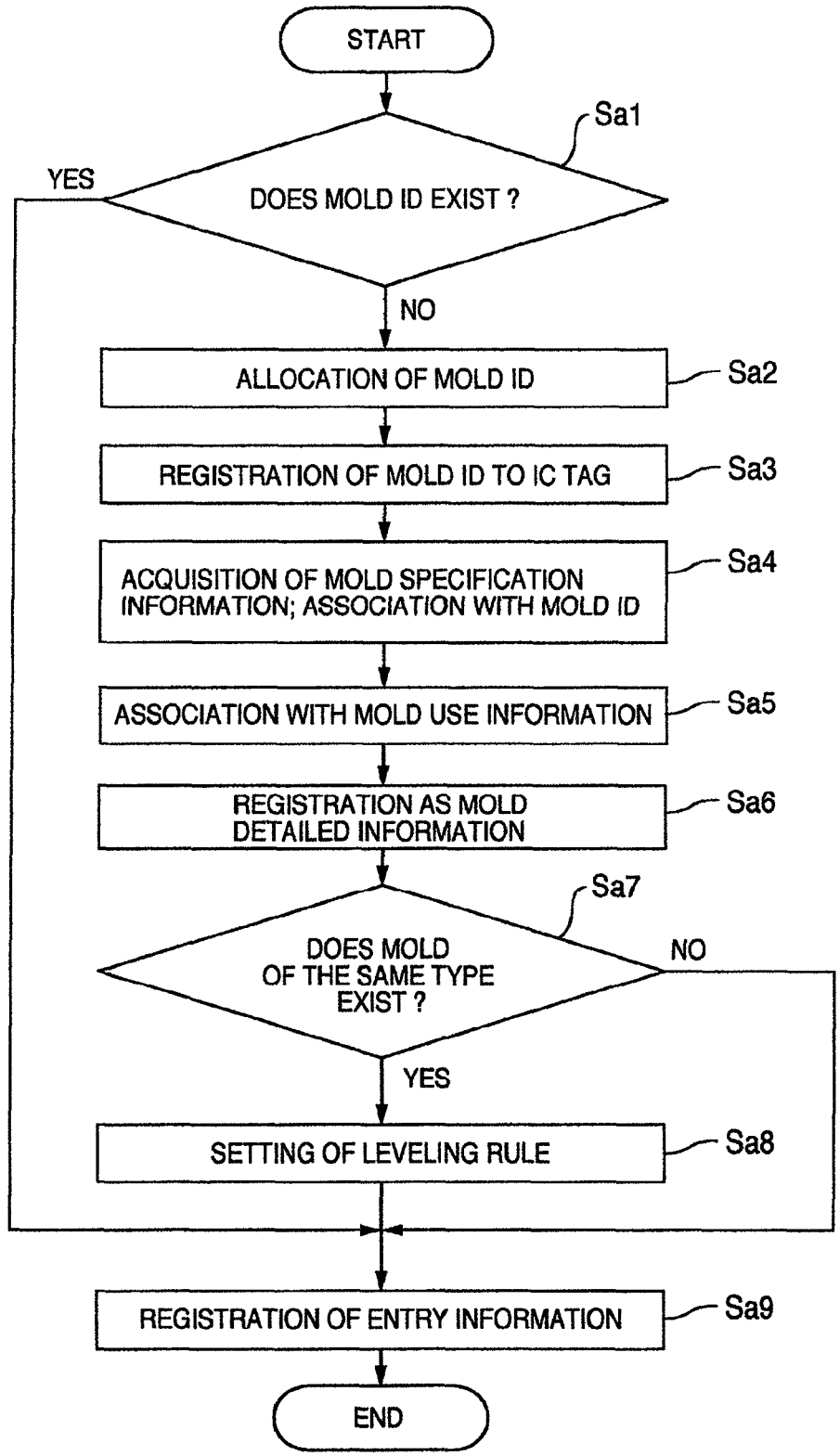
FIG. 48 is a flowchart showing a processing at the time of warehousing of molds.

FIG. 48 is a flowchart showing the processing at the time of delivery and entry of the mold. First, the CPU 4041 in the server 4004 confirms whether or not the mold ID exists because the mold ID tag is not known even though the IC tag is attached to the mold (Sa1). When the mold ID exists (Yes in Sa1), the CPU 4041 updates (registers) the warehousing information (see FIG. 34) inside the storage portion 4043 to the entry information sent from the mold warehouse 4005 in order to represent whether the mold is the one that is put into the warehouse after the processing in the molding machine or the mold that is returned after completion of maintenance (Sa9). In the case of maintenance, the CPU 4041 updates the maintenance information of the mold detailed information (see FIG. 33), too.

On the other hand, when the mold ID does not exist (No in Sa1), the CPU 4041 allocates the mold ID to represent that the mold is new one delivered by the mold manufacturer (Sa2) and registers the mold ID to the IC tag attached to the mold ID (Sa3). The CPU 4041 reads the mold specification information provided by the mold manufacturer from the storage medium, not shown, links the mold specification information with the mold ID (Sa4), further links it with the mold use information (maintenance schedule (limit), (link with the absolute time)) (Sa5) and registers it as the mold detailed information to the storage portion 4043 (Sa6).

Subsequently, the CPU 4041 retrieves the mold detailed information inside the storage portion 4043 and judges whether or not the mold of the same type exists (Sa7). When the mold of the same type does not exist (No in Sa7), the CPU 4041 links the entry information sent from the mold warehouse 4005 with the mold ID allocated and registers the information as the warehousing information to the storage portion 4043 (Sa9). When the mold of the same type exists (Yes in Sa7), the CPU 4041 causes the user to input the leveling rule, sets this information as the leveling rule information (Sa8), registers it to the storage portion 4043, links the entry information sent from the mold warehouse 4005 with the mold ID allocated and registers the information as the warehousing information to the storage portion 4043 (Sa9).

Figure 49:
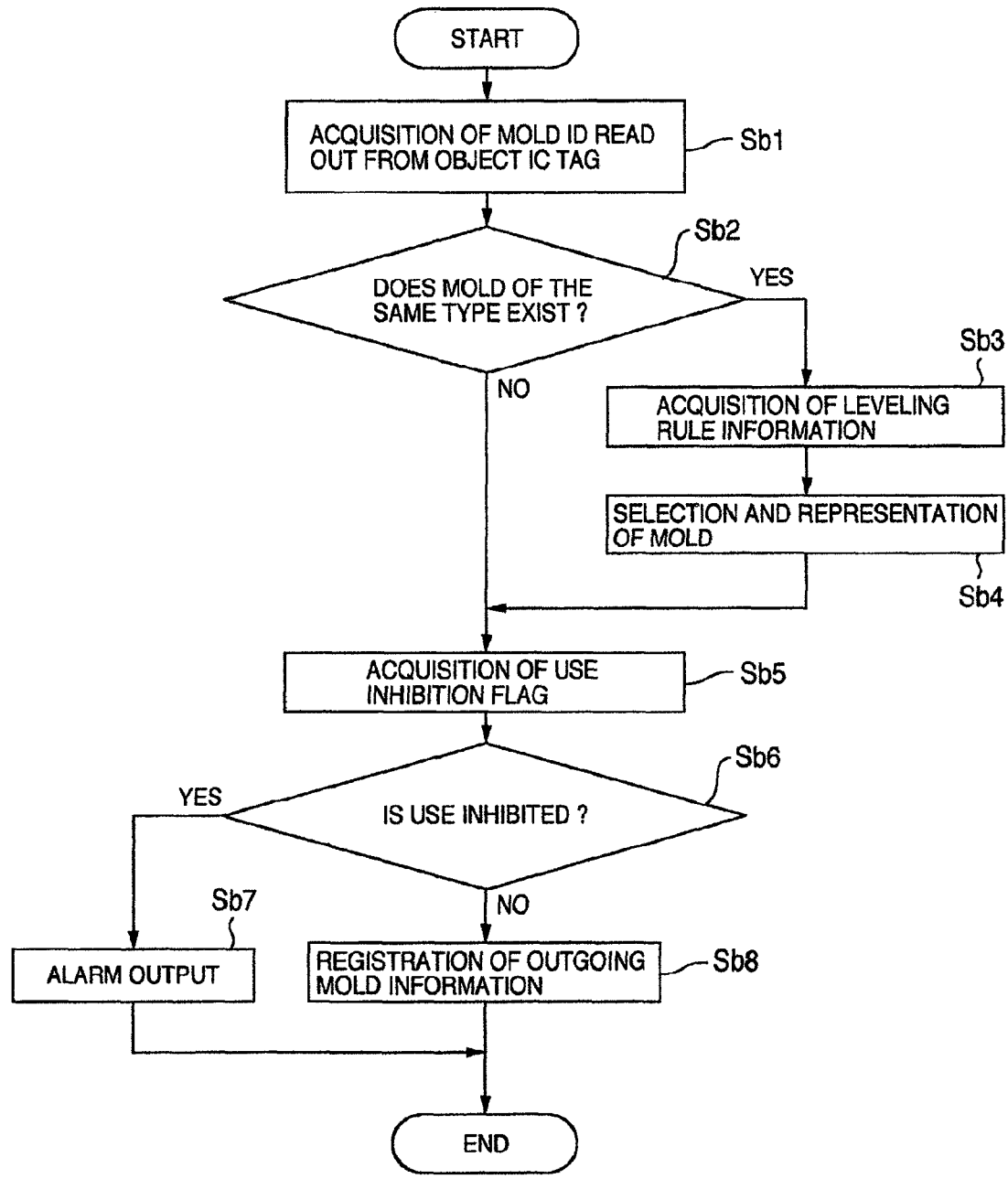
FIG. 49 is a flowchart showing a processing at the time of shipment of molds.

FIG. 49 is a flowchart showing the flowchart at the time of outgoing of the mold. In the server 4004, the CPU 4041 acquires the mold ID read out from the object IC tag on the side of the mold warehouse 4005 with the mold outgoing information (Sb1), then retrieves the mold detailed information (see FIG. 33) stored in the storage portion 4043 with the mold ID as the key and judges the existence/absence of the mold of the same type (Sb2). The CPU 4041 passes the processing to Sb5 when the mold of the same type does not exist (No in Sb2). The CPU 4041 acquires the leveling rule information from the storage portion 4043 (Sb3) when the mold of the same type exists (Yes in Sb2), selects the mold in accordance with the leveling rule as explained with reference to FIG. 47, represents the information such as the selected mold ID (Sb4) and passes the processing to Sb5. This information may be displayed on the console portion 4048 of the server 4004 or on the display device, not shown, on the side of the mold warehouse 4005.

Subsequently, the CPU 4041 acquires the use inhibition flag from the mold detailed information (Sb5) and judges whether or not the use is inhibited (Sb6). The CPU 4041 outputs the alarm (Sb7) as explained with reference to FIG. 46 and finishes the processing when the use is inhibited (Yes in Sb6). On the other hand, when the use is not inhibited (No in Sb6), the CPU 4041 registers (updates) the mold outgoing information to the warehousing information (Sb8).

Figure 50:
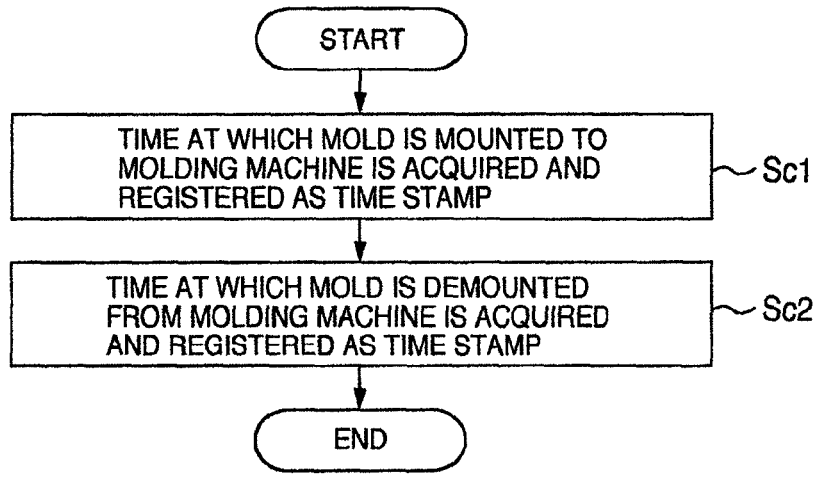
FIG. 50 is a flowchart showing a processing at the time of operation of molds.

FIG. 50 is a flowchart showing the processing at the time of operation of the mold. In the server 4004, the CPU 4041 acquires the time of mounting of the mold to the molding machine as the time stamp from the molding machine and registers the time stamp to the mold movement information (see FIG. 38) and to the mold history management information (see FIG. 39) (Sc1). The CPU 4041 acquires also the time of demounting of the mold from the molding machine as the time stamp from the molding machine and registers the time stamp to the mold movement information (see FIG. 38) and to the mold history management information (see FIG. 39) (Sc2).

Figure 51:
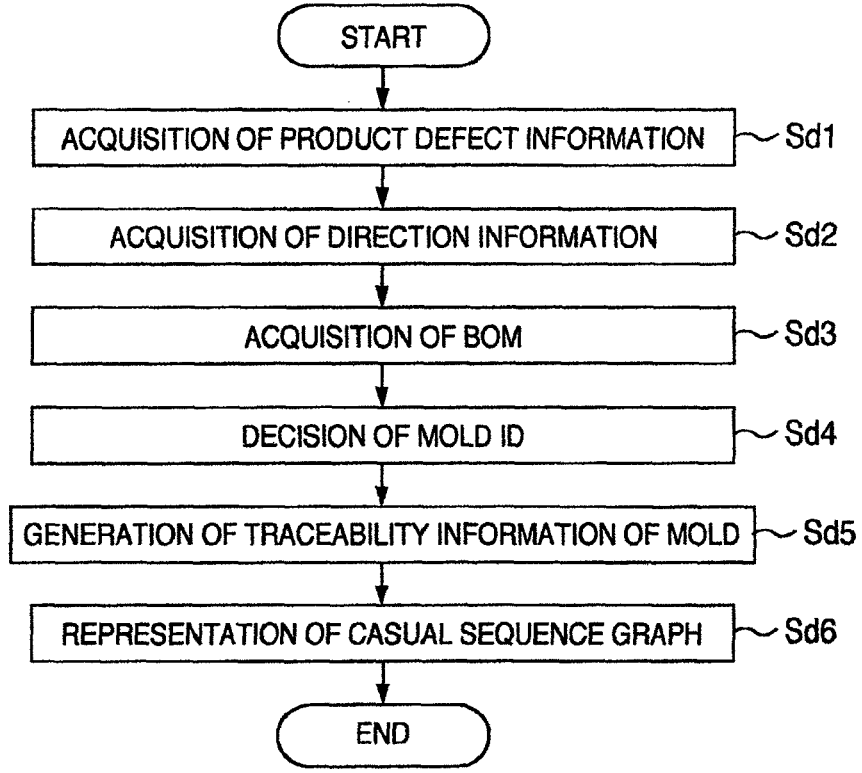
FIG. 51 is a flowchart showing a workability analysis processing of molds.

FIG. 51 is a flowchart showing the workability analysis processing of the mold. In the server 4041, the CPU 4041 acquires the product defect information (see FIG. 41) in accordance with the operation of the keyboard 4046, etc, by the worker (Sd1). The direction ID among the product defect information is acquired in the next step Sd2. In other words, the CPU 4041 searches the information of the direction (product indication information) with the product ID of the product defect information as the key and acquires the information of the corresponding direction (Sd2). The CPU 4041 registers the direction ID so acquired to the column of the direction ID of the product defect information.

Subsequently, the CPU 4041 retrieves the BOM (see FIG. 35) by using the direction ID as the key and acquires the corresponding BOM (Sd3). The CPU 4041 extracts the mold ID contained in the BOM acquired and decides the mold ID (Sd4). Next, the CPU 4041 generates the traceability information of the mold such as the one shown in FIG. 40 from each information acquired (Sd5), takes out the information (total use time) relating to the change with time from the traceability information of all the directions, for example, creates the information about the casual sequence graph such as shown in FIG. 44 (casual sequence information) and represents the casual sequence graph on the console portion 4448 (Sd6). The CPU 4041 stores the casual sequence information to the storage portion 4043, whenever necessary.

FIGS. 52A to 52D are explanatory views each useful for explaining a display example of information. It is possible to display the product defect information (FIG. 52A), the traceability information (FIG. 52B), the mold detailed information (FIG. 52C) and the molding machine setting information (FIG. 52D) when the casual sequence graph is displayed on the console portion 4048 by the processing in accordance with the flowchart shown in FIG. 51.

As explained above, this embodiment can grasp traceability from the total use time (work history) of the mold and can therefore judge appropriately the maintenance timing of the mold. Because maintenance can be made appropriately, it is possible to produce normal products while suppressing the loss cost resulting from the resources. It is also possible to improve management accuracy of the molds and the installation as well as productivity and to prevent in advance possible problems. Because the mold is selected in accordance with the leveling rule, a plurality of molds can be used equally.

Incidentally, this embodiment has been explained on the assumption that the server 5004 of the mold management center 5001 executes the processing. However, the worker may store various kinds of information to the mobile terminal he/she carries, and lets the mobile terminal execute the processing in the same way as the server 5004. The mobile terminal may well be provided with the IC tag reader/writer and reads each ID from the IC tag and the RF-ID tag sealing type rack label.

This embodiment has been explained about the case where only the mold ID is registered to the IC tag. When the IC tag has a large capacity, however, the IC tag may store not only the mold ID but all the information such as the mold detailed information of the object mold.

This embodiment has been explained about the case where the mold ID is registered to the IC tag attached to the mold. However, a bar code may be used, too, or the mold ID engraved to the metal mold may be read by a character recognition apparatus. The engraved metal ID may further be inputted manually by the worker.

This embodiment has been explained about the mold by way of example but the resources are not particularly limited to the mold as long as they involve the change with time. Besides the mold, the resources may be electric tools, molding machines (press machines) and workers (labors). In the case of the labors among them, the factors of the change with time can be handled as the level of skill. In the case of working that calls for a high level of skill, for example, workers having a high level of skill can be allocated by comparing the work time, etc, linked with the worker ID (in the case of such a leveling rule).

This embodiment has been explained about the case where the molds are mutually lent/borrowed between the building A and so on but the case can also include the following cases:

(1) the case where the molds are lent/borrowed between the plants of the same company;

(2) the case where the molds are lent by group companies or rental companies.

In the case (2), the building A and so on may be paraphrased as "plants A" and the molds can be lent/borrowed in the same way as in the case of the building A and so on.

A work management system according to another embodiment of the invention will be explained.

Figure 53:
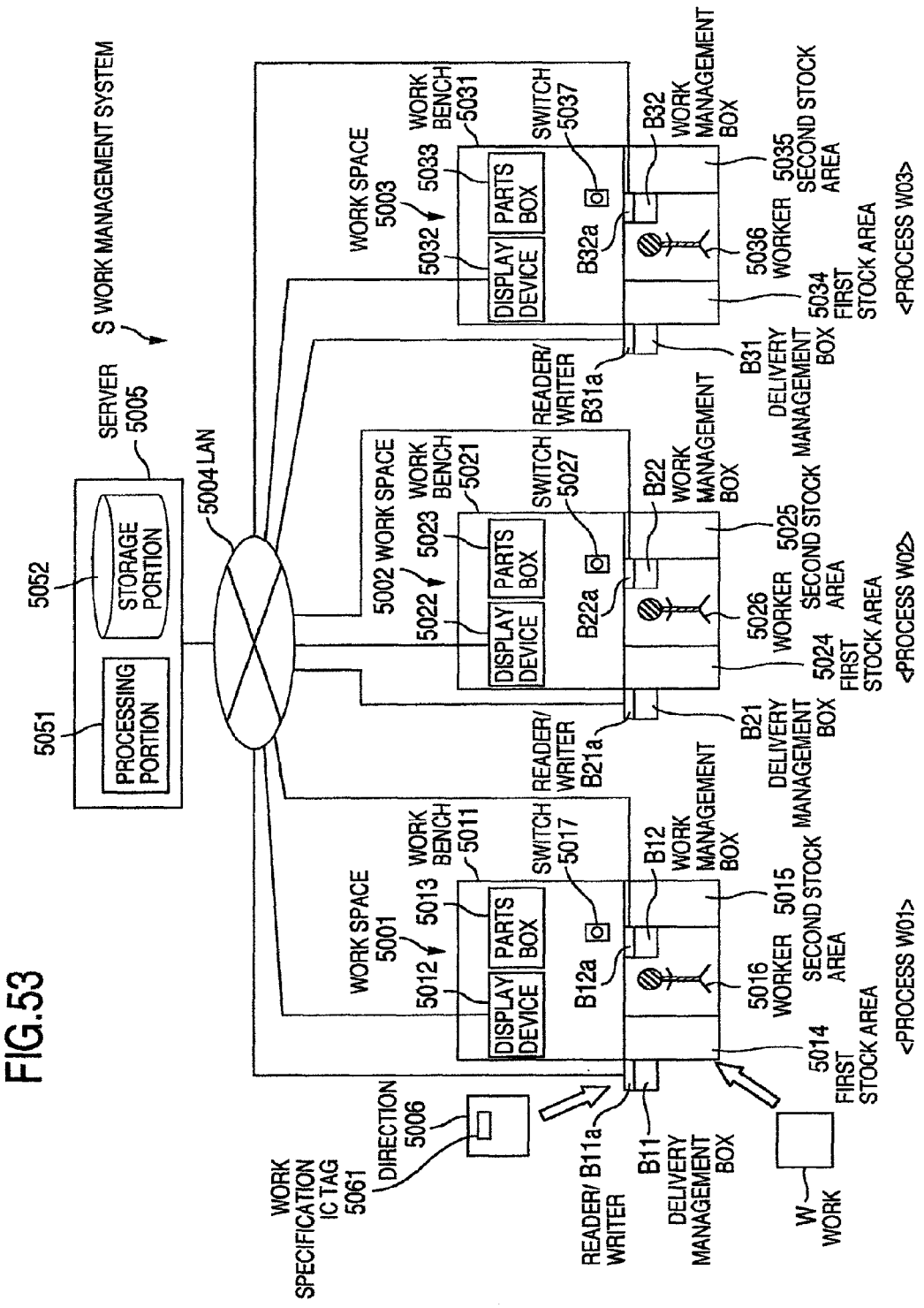
FIG. 53 is an overall structural view of a work management system according to the embodiment of the invention.

FIG. 53 is an overall structural view of the work management system according to this embodiment. The work management system S includes a work space 5001, a work space 5002, a work space 5003, LAN (Local Area Network) 5004 and a server (information processing unit) 5005 and can execute various kinds of processing inclusive of the direction 5006 used.

Incidentally, the explanation will be hereby given on the case where working about a work W as a work object (called "product", too) is divided into three process steps (steps W01 to W03; merely called "step", too) and is carried out in three work spaces 1 to 3, respectively. The number of work steps is not limited to three but requires at least two steps.

Working about the work W is an assembly work of semiconductor components to a circuit board, for example, but may be other working operations. It will be hereby assumed that the pair of the work W and the direction 5006 can be together carried round.

Here, the term "direction" 5006 is the document into which the working steps are described and a work specification IC tag 5061 (corresponding to "IC tag" used in the Scope of Claim) that stores information for specifying the work is buried.

The work space 5001 includes a work bench 5011, a display device 5012, a parts box 5013, a first stock area 5014, a second stock area 5015, a delivery management box (first stock area) B11, a reader/writer (first reader) B11a, a work management box (second stock area) B12 and a reader/writer (second reader) B12a.

A worker 5016 is a person who conducts working in the work space 5001.

The work bench 5011 is the place where the worker 5016 conducts working about the work W, and the display device 5012, the parts box 5013 and the switch 5017 are put on this bench 5011.

The display device 5012 displays the information about working of the work W and the display screen is switched when the switch 5017 is pushed. The display device 5012 is connected to the server 5005 through the LAN 5004.

The parts box 5013 is the box that stores components necessary for working the work W.

The first stock area 5014 is the place on which the work W before working is put.

The delivery management box B11 is the box which is disposed on the left side of the first stock area 5014 and into which the worker carrying the work W and the direction 5006 to the work space 5001 throws the direction 5006.

The reader/writer B11a is disposed in combination with the delivery management box B11, reads the information written to the work specification IC tag 5061 of the direction 5006 thrown into the delivery management box B11 and transmits the information to the server 5005 through the LAN 5004.

The work specification IC tag 5061 can be accomplished by a non-contact wireless ID tag such as RFID (Radio Frequency Identification), for example. The work specification IC tag 5061 stores the information for specifying the work content of the work W, for example. More concretely, it stores the direction number, type numbers and model numbers of products and semi-finished products to be worked, and the production number. Detailed information of the information for specifying the work content of the work W describes the indication information for the worker 5016 to mount the components to the work W and is more concretely the kinds of the components, their numbers and the mounting sequences of the components.

Incidentally, the work specification IC tag 5061 into which the direction 5006 is buried is preferably of a battery non-mounting type that acquires power from the reception radio wave because the size and the cost can be reduced. However, this IC tag 5061 may well be of a battery mounting type.

Next, the operations of the work specification IC tag 5061 and the reader/writer B11a when the direction 5060 is thrown into the delivery management box B11 will be explained. First of all, the radio wave containing the control signal is always transmitted from the antenna (not shown) of the reader/writer B11a. When the direction 5006 is thrown into the delivery management box B11, the antenna (not shown) inside the work specification IC tag 5061 receives the radio wave from the reader/writer and electric power is generated by the resonance of the antennas.

In the work specification IC tag 5061, the electric power generated actuates the internal circuits and necessary processing is executed. The processing result is transmitted by the radio wave from the antenna to the reader/writer B11a. Receiving this radio wave, the reader/writer B11a can acquire the information of the work specification IC tag 5061.

Incidentally, the reader/writer B11a may read the information of the work specification IC tag 5061 either always or in a predetermined time interval (10 seconds, for example).

Furthermore, even when the direction 5006 thrown into the delivery management box B11 is plural, the reader/writer B11a may be allowed to read either all the work specification IC tags 5061 or only one IC tag 5061.

When the reader/writer B11a is allowed to read all the work specification IC tags 5061 in the plurality of directions 5006 thrown into the delivery management box B11, the delivery management box B11 preferably has a structure in which the directions 5006 can be easily handled by the first-in-first-out arrangement (the form in which all the directions 5006 are inserted in the vertical form) but other structures may also be used.

The second stock area 5015 is the place on which the work W after working is put.

The work management box B12 is disposed in the proximity of the bench 5011 and the position at which the worker 5016 works. It is the box into which the worker throws the direction 5006 when starting working.

The reader/writer B12a is arranged in combination with the work management box B12, reads the information of the direction 5061 written to the work specification IC tag 5061 and thrown into the work management box B12 and transmits the information to the server 5005 through the LAN 5004.

More concretely, when the direction 5006 is thrown into the work management box B12, the reader/writer B12*a* first (afresh) confirms the communication with the work specification IC tag 5061, reads the information and transmits the communication start information with the work specification IC tag 5061 and the information for specifying the work content of the work W to the server 5005.

The communication start information includes the ID of the work management box B12 and the work start time (the time at which the information of the work specification IC tag 5061 is first (afresh) read. The information for specifying the work content of the work W includes the direction number, the types and model names of products/semi-finished products to be produced and the production number.

When the direction 5006 is taken out from the work management box B12, the reader/writer B12*a* confirms cut-off of the communication with the work specification IC tag 5061 and then transmits the communication end information with the work specification IC tag 5061 and the information for specifying the work content of the work W to the server 5005.

The communication end information includes the ID of the work management box B12 and the work end time (the time at which cut-off of the communication with the work specification IC tag 5061 is confirmed). The information for specifying the work content of the work W includes the direction number, the types and model names of products and semi-finished products to be produced and the production number.

Incidentally, the reader/writer B12*a* may read the information of the work specification IC tag 5061 either always or in a predetermined time interval (10 seconds, for example) in the same way as the reader/writer B11*a*.

Since the work spaces 5002 and 5003 have the same construction and the operation as the work space 5001, overlap of the explanation will be omitted (this also holds true of the following explanation).

The LAN 5004 is a network in the work management system S and can be accomplished by the Ethernet (registered trademark), for example.

The server (information processing unit) 5005 is the apparatus for processing information and can be accomplished by a computer, for example. The server 5005 includes a processing portion 5051 and a storage portion 5052.

The processing portion 5051 stores the information received from six reader/writers B11*a* to B32*a* to the storage portion 5052 and executes the operation on the basis of the information stored in the storage portion 5052. It can be accomplished by CPU (Central Processing Unit), for example.

The storage portion 5052 stores execution programs of the processing portion 5051 and the information received from the six reader/writers B11*a* to B32*a* to the storage portion 5052 and can be accomplished by a memory and/or a hard disk), for example.

The processing portion 5051 can display the information such as the work content of the work W on the display device 5012. These kinds of information may be stored in advance in the storage portion 5052 or the information of the work specification IC tag 5061 received from the reader/writer B12*a* may be used.

Receiving the information from the reader/writers B11*a* to B32*a*, that is, the communication start information, the information for specifying the work content of the work W and the communication end information, the processing portion 5051 stores these kinds of information to the storage portion 5052.

Next, the construction of the work space will be explained with reference to FIG. 54 (with appropriate reference to FIG. 53).

Figure 54:
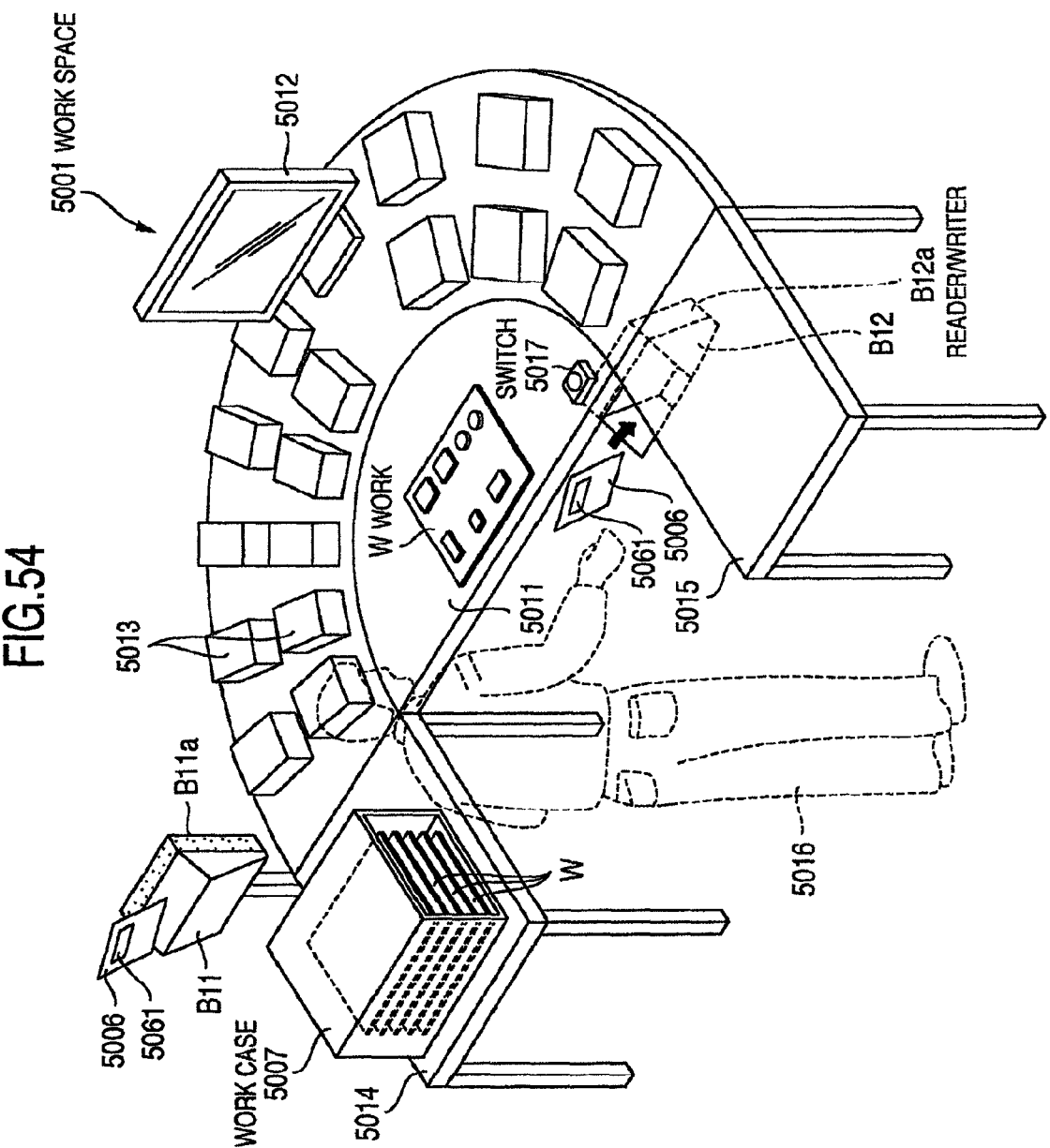
FIG. 54 is a structural view of a work space.

FIG. 54 is a structural view of the work space. Since the construction of the work space is the same for all of the work spaces 5001 to 5003, the work space 5001 will be explained by way of example. Incidentally, the same reference numeral will be allocated to the same construction as in FIG. 54 and the overlap of explanation will be omitted appropriately.

The work bench 5011 is hereby constructed into a semi-spherical shape as shown in FIG. 54 and a plurality of parts boxes 5013 is aligned on the outside portion of the bench 5011. The display device 5012 is arranged at the depth of the front surface of the work position of the worker 5016. The delivery management box B11 and the reader/writer B11*a* are arranged on the left side of the bench 5011 and the work management box B12 and the reader/writer B12*a* are arranged in the proximity of the work position by the worker 5016 on the work bench 5011.

Here, the work management box B12 is obliquely disposed in such a fashion that its upper part inclines towards the worker 5016 and so that the worker 5016 can easily throw the direction 5006 into the work management box B12 at the start of working and can easily take it out from the work management box B12 at the end of working. In consequence, the worker 5016 can easily throw and take the direction 5006 into and out from the work management box B12 and moreover, can easily confirm the existence/absence of the direction 5006 inside the work management box B12.

The first stock area 5014 is disposed on the left side of the work position of the worker 5016 and a work case 5007 capable of accommodating a plurality of works W is positioned above the first stock area 5014. Furthermore, the second stock area 5015 is disposed on the right side of the work position by the worker 5016.

Incidentally, it will be assumed hereby that a plurality of works W accommodated in the work case 7 corresponds to one direction 5006. The work case 5007 is not an indispensable constituent but may be omitted.

When conducting working of the work W, the worker 5016 first takes out the direction 5006 thrown into the delivery management box B11 and throws it into the work management box B12. The worker 5016 then takes out the work W from the work case 5007 put on the first stock area 5014, moves it to the work bench 5011, and conducts working of the work W such that the worker 5016 watches the display screen of the display device 5012 (changing the display screen by pushing the switch 5017, whenever necessary), takes out components from the parts box 5013, mounts the components to the work W, and so on.

When working of all the works W accommodated in the work case 5007 is completed, the worker 5016 puts all the works W into the work case 5007, takes out the direction 5006 put in the work management box B12 and puts the direction 5006 and the work case 5007 onto the second stock area 5015. Soon thereafter, the worker 5016 carries the direction 5006 and the work case 5007 at a suitable timing to the work space 5002 for the next work step, puts the work case 5007 to the first stock area 5024 and throws the direction 5006 into the delivery management box B21.

The worker 5016 can smoothly handle the direction 5006 and the works W (work case 5007) because each constituent has the construction described above in the work space 5001.

Subsequently, an example of the picture window displayed on the display device during working will be explained with reference to FIG. 55 (with appropriate reference to FIG. 54).

Figure 55:
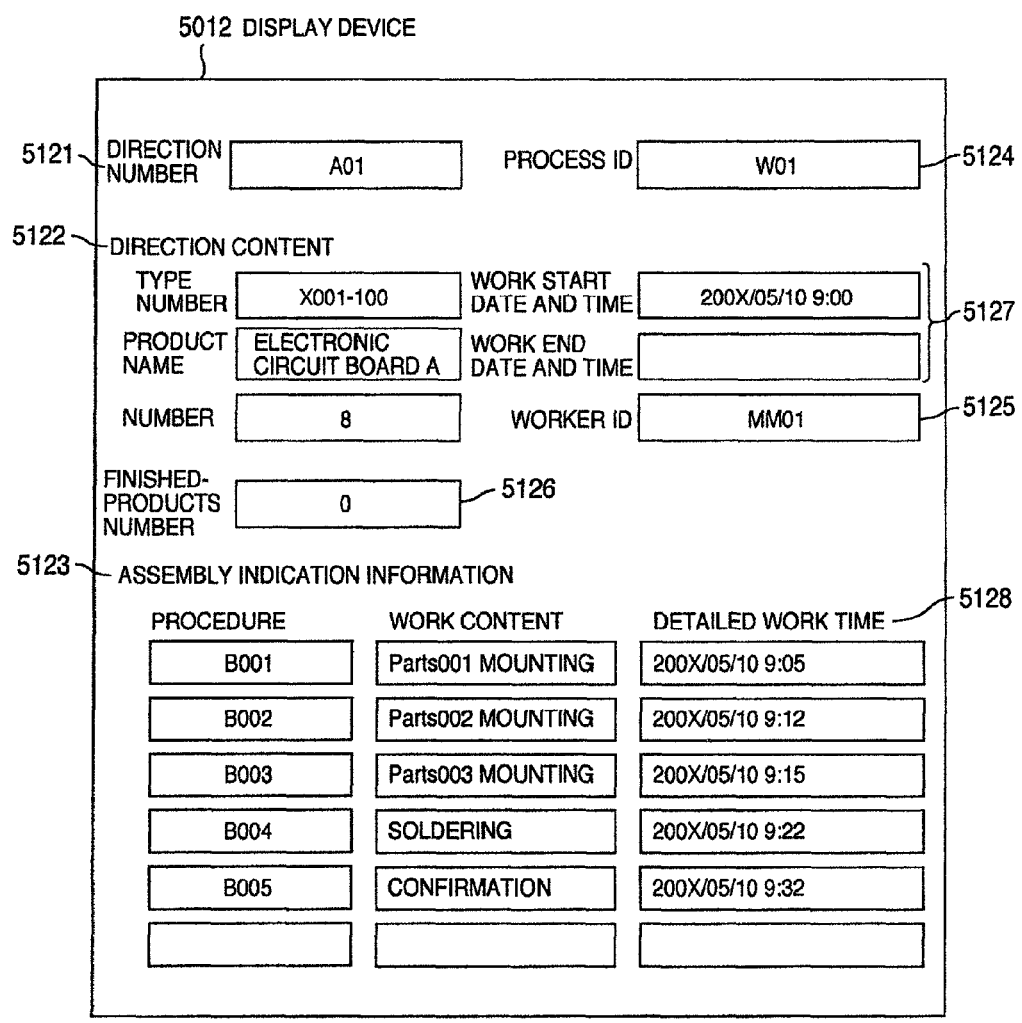
FIG. 55 is an explanatory view showing an example of a picture window of a display device.

FIG. 55 is an explanatory view showing an example of the picture window of the display device.

The display device 5012 displays the direction number 5121, the direction content 5122 (inclusive of the type numbers and model names of products and semi-finished products to be produced and the production number (pieces)), assembly indication information 5123 (sequence and work content), the process ID 5124, the worker ID 5125, finished-products number (complete pieces) 5126, the work start date/ work end date and time 5127 and the detailed work time 5128.

The information (such as A01) for specifying the work content of the work W corresponding to the work specification IC tag 5061 is displayed on the indication number 5121. Detailed information about the indication number 5121 is displayed on the direction content 5122 and the assembly indication information 5123.

Information for specifying the process step (such as W01) is displayed on the process ID 5124. Information for specifying the worker 5016 (such as MM01) is displayed on the worker ID 5125. Incidentally, the information for specifying the worker 5016 may be registered in advance to the storage portion 5052 (see FIG. 53) of the server 5005, or the server 5005 (see FIG. 53) may recognize the IC tag (not shown) for specifying the worker 5016 when the worker 5016 throws the IC tag into the work management box B12 and displays the worker ID 5125 on the display.

The time at which the direction 5006 is thrown into the work management box B12 and the time at which it is taken out from the work management box B12 are displayed on the work start time/work end time 5127. The number of products completed among the productions (The number of which is 8, in this embodiment) is displayed on the complete product number 5126. The end time of each procedure is displayed on the detailed work time 5128 and when the switch 5017 is pushed at the end of each procedure, for example, the detailed work time 5128 displays that time.

In this way, the worker 5016 can reliably conduct working in accordance with the indication of the work content displayed on the display screen of the display device 5012.

Next, the work performance for each process step (throw-in time and take-out time to and from each reader/writer for each indication) of each work process step stored in the storage portion of the server will be explained with reference to FIGS. 56A to 56B (with appropriate reference to FIG. 53). FIG. 56A shows an example of the work performance about the process step W01 and FIG. 56B shows an example of the work performance about the process step W02.

As to the process step W01 (see the second right column from the right in FIG. 56A), the throw-in time of the direction 5006 into the delivery management box B11, the take-out time from the work management box B12, the throw-in time into the delivery management box B21 and the information about the worker (see the column of the extreme right) are stored as shown in FIG. 56A. This also holds true of FIG. 56B.

Figure 57:
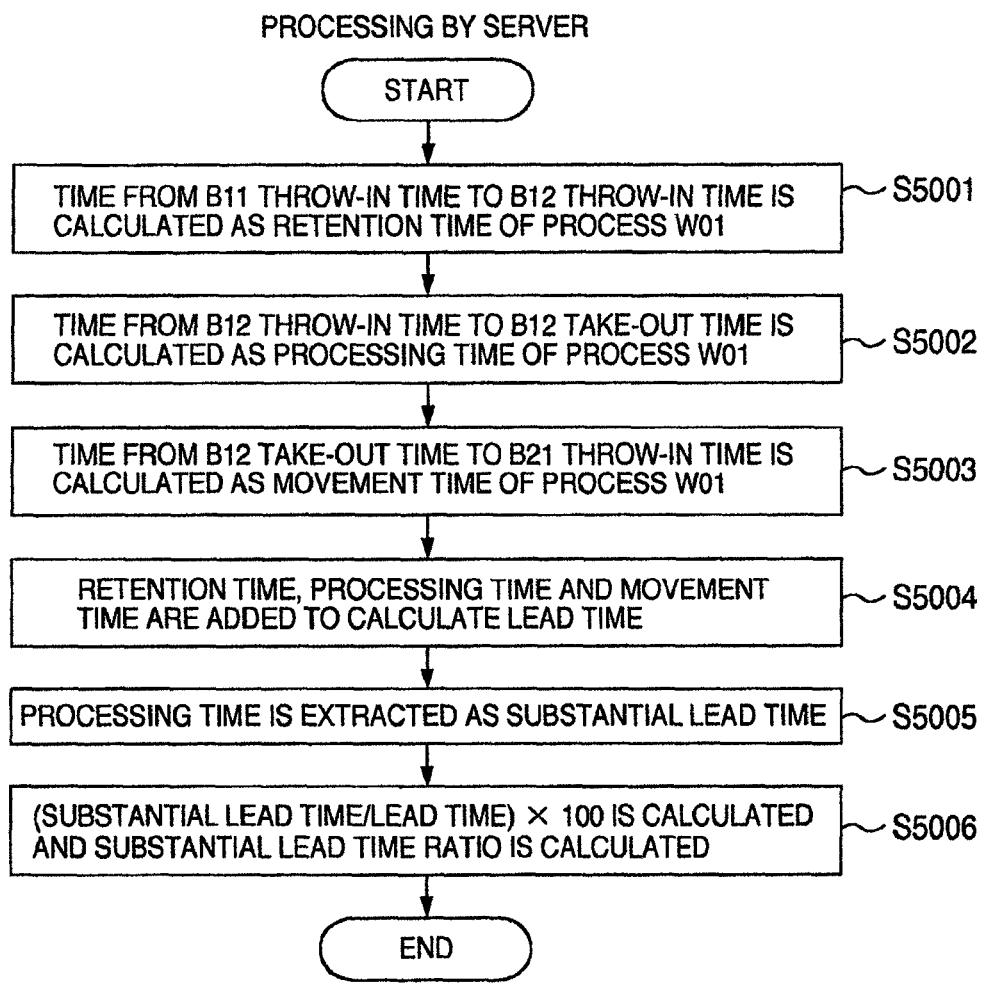
FIG. 57 is a flowchart showing the flow of a processing of information about a worker by a server.

Subsequently, the processing of the information about the worker by the server will be explained with reference to FIG. 57 (also to FIGS. 53 to 56B, whenever necessary). FIG. 57 is a flowchart showing the flow of the processing of the information about the worker by the server. Here, the explanation will be given about the case of the process step W01 about the direction A01 (the direction No. 5121 in FIG. 55 is the direction 5006 of A01; hereinafter the same) by way of example. It will be assumed also that the work performance described in FIG. 56A is stored in the storage portion 5052 of the server 5005.

First, the processing portion 5051 of the server 5005 calculates (judges) the time from the B11 throw-in time (the time at which the worker 5016 carrying the direction 5006 and the work W to the work space 5001 throws the direction 5006 into the delivery management box B11) to the B12 throw-in time (the time at which the worker 5016 throws the direction 5006 into the work management box B12) as the retention time of the work W in the process step W01 (step S5001).

Here, the worker 5016 is under the state where the worker can start working of the work W from the B11 throw-in time but does not start working till the B12 throw-in time at which working is actually started and during the intermediate time, the work W stays (keeps retention) in the work space 5001. Therefore, this time is the retention time of the work W in the process step W01.

Subsequently, the processing portion 5051 calculates (judges) the time from the B12 throw-in time to the B12 take-out time (the time at which the worker 5016 takes out the direction 5006 from the work management box B12) as the processing time of the work W in the process step W01 (step S5002).

Here, the worker 5016 is supposed to have done working about the work W from the B12 throw-in time to the B12 take-out time. Therefore, the intermediate time is set to the processing time of the work in the process step W01.

Next, the processing portion 5051 calculates (judges) the time from the B12 take-out time to the B21 throw-in time (the time at which the worker 5016 throws the direction 5006 into the work management box B21) as the movement time of the work W in the process step W01 (step S5003).

Here, the worker 5016 is under the state where the worker can carry the work W and the direction 5006 to the work space 5002 and can throw the direction 5006 into the delivery management box B21 from the B12 take-out time, and the time till the B21 throw-in time at which the direction 5006 is actually thrown into the delivery management box B21 can be regarded as the time required for the movement of the work W to the work space 5002. Therefore, this time is set to the movement time of the work W in the process step W01.

Incidentally, there may be the case where the worker 5016 keeps a plurality of directions 5006 pairing with works W in the second stock area 5015 and carries them simultaneously to the work space 5002. Then, a part of the works W is left for a while in the second stock area 5015. It will be assumed that in such a case, too, the time from the B12 take-out time to the B21 throw-in time is handled as the "movement time".

Because the processing portion 5051 executes such a processing, it is possible to grasp the contents not only the time length but also the retention time, the processing time and the movement time about the existence time of the work W inside and in the proximity of the work space.

As to the direction A02, the processing portion 5051 can executes a similar processing for the work space 5002 and the work space 5003.

Figure 58:
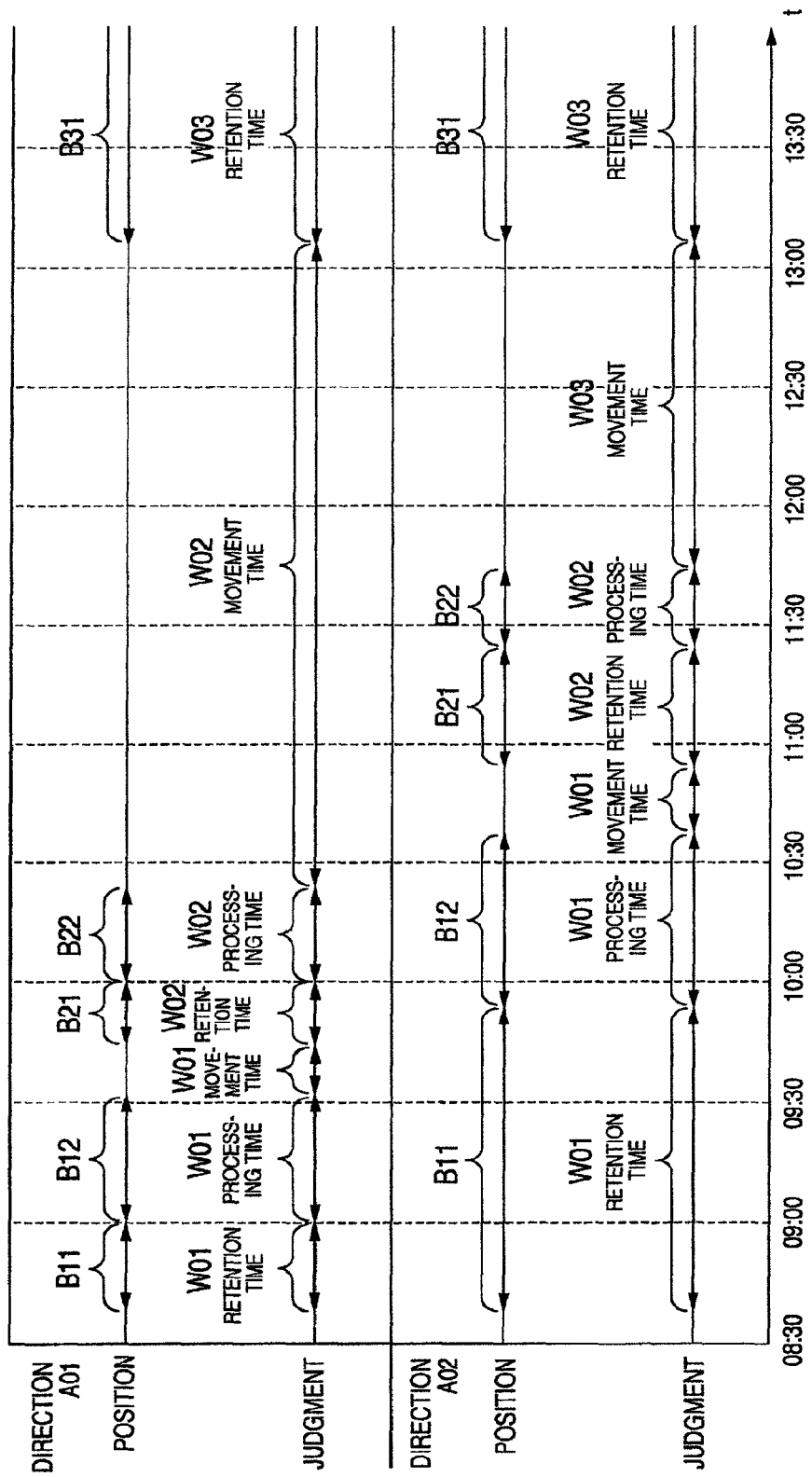
FIG. 58 is a time chart showing a position of a direction and its judgment result.

FIG. 58 shows the result of the processing of the steps S5001 to S5003 of the flowchart of FIG. 57 on the basis of each work performance shown in FIGS. 56A and 56B. FIG. 58 is a time chart showing the positions of the directions and their judgment result.

The upper half represents the existence position (such as the delivery management box B11, etc) and the judgment result at each time (retention time in process step W01, etc) for the direction A01.

It is possible to reliably grasp by using the server 5005 from this chart under which state (retention, processing or movement) the work W subjected to working by the direction A01 exists under which working step (W01, etc).

This explanation also holds true of the direction A02 of the lower half.

Turning back to FIG. 57, the processing portion 5051 calculates after the step S5003 the retention time, the processing time and the movement time as to the step W01 of the direction A01 and calculates the lead time (the addition time; expressed by L/T, too) (step S5004).

The processing portion 5051 extracts the processing time as the substantial lead time (step S5005).

Subsequently, the processing portion 5051 calculates (substantial lead time/lead time)×100 (%) to acquire a substantial lead time ratio (substantial processing time ratio) (step S5006).

Here, FIG. 59 shows the result of the processing of the steps S5004 to S006 of the flowchart of FIG. 57 on the basis of each work performance shown in FIGS. 56A and 56B. FIG. 59A shows the time distribution of the work of the direction A01 and FIG. 59B shows the time distribution of the work of the direction A02.

As shown in FIG. 59A, the retention time, the processing time, the movement time, L/T, substantial L/T and substantial L/T ratio of each step W01 and W02 and their sum (TOTAL) are shown for the direction A01.

This also holds true of FIG. 59B.

As described above, the work management system S according to this embodiment can grasp not only the retention time, the processing time and the movement time but also the length of the substantial lead time and its ratio. Therefore, time management can be made finely for the work that is divided into a plurality of process steps. In consequence, it becomes easier to grasp efficiency of the work and to specify wasteful work.

Figure 60:
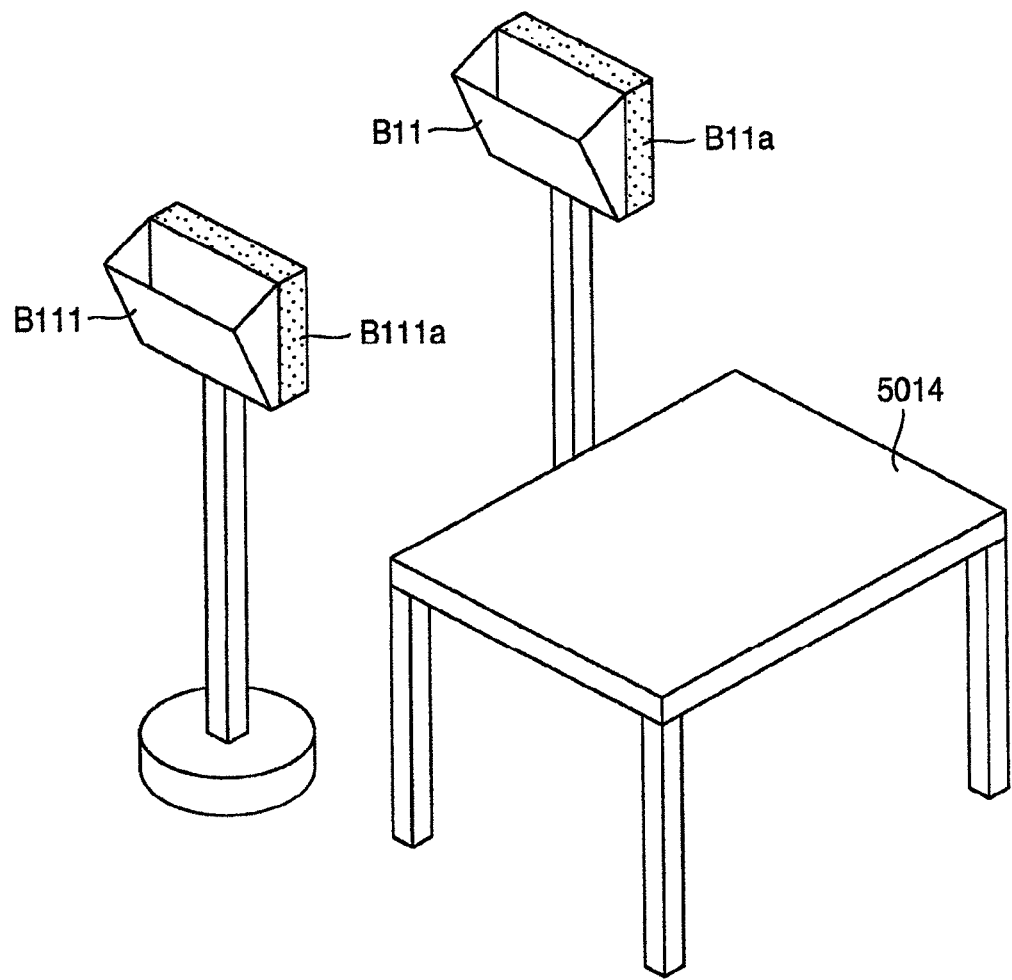
FIG. 60 is a partial view of a first stock area and two delivery management boxes relating to a modified example of the work management system.

Next, the case where two delivery management boxes are installed in one work space as a modified embodiment of the work management system will be explained with reference to FIG. 60 (with appropriate reference to FIGS. 53 and 54). FIG. 60 is a partial view of the first stock area and the two delivery management boxes. Though the explanation is given on the work space 5001 by way of example, it also holds true of the work spaces 5002 and 5003.

A delivery management box B111 pairing with a reader/writer B111a is disposed in the first stock area 5014 on the left side of a pair of a delivery management box B11 and a reader/writer B11a having the same construction and the same performance.

When one each direction 5006 is put into each of the delivery management boxes B11 and B111, the worker 5016 can alternately take out the direction 5006 from the delivery management boxes B11 and B111 and can execute work in the sequence of the arrival of the directions 5006 at the work space 5001.

In this case, the reader/writers B11a and B111a may be allowed to read the information of all the work specification IC tags 5061 when a plurality of directions 5006 is thrown into the delivery management boxes B11 and B111. According to this construction, the server 5005 can judge at once the existence of a plurality of works W (products in process) in the first stock area 5014 and can also judge instantly and easily abnormal products in process (works W) such as their long retention. The server 5005 may be allowed to read only one of a plurality of work specification IC tags 5061.

Furthermore, the number of pairs of the delivery management box and the reader/writer is not limited to two but may be three or more.

The explanation of this embodiment is now finished but the invention is not limited to the embodiment.

For example, the delivery management box, the work management box and the reader/writers disposed in combination with them need not always be arranged in all the work spaces but may be disposed in a part of the work spaces.

The retention time need not be regarded as the time belonging to the next work step but may be regarded as the time belonging to the preceding work step.

Concrete constructions of hardware and flowcharts may be changed or modified appropriately without departing from the scope of the invention.

Still another embodiment of the invention will be explained.

Figure 61:
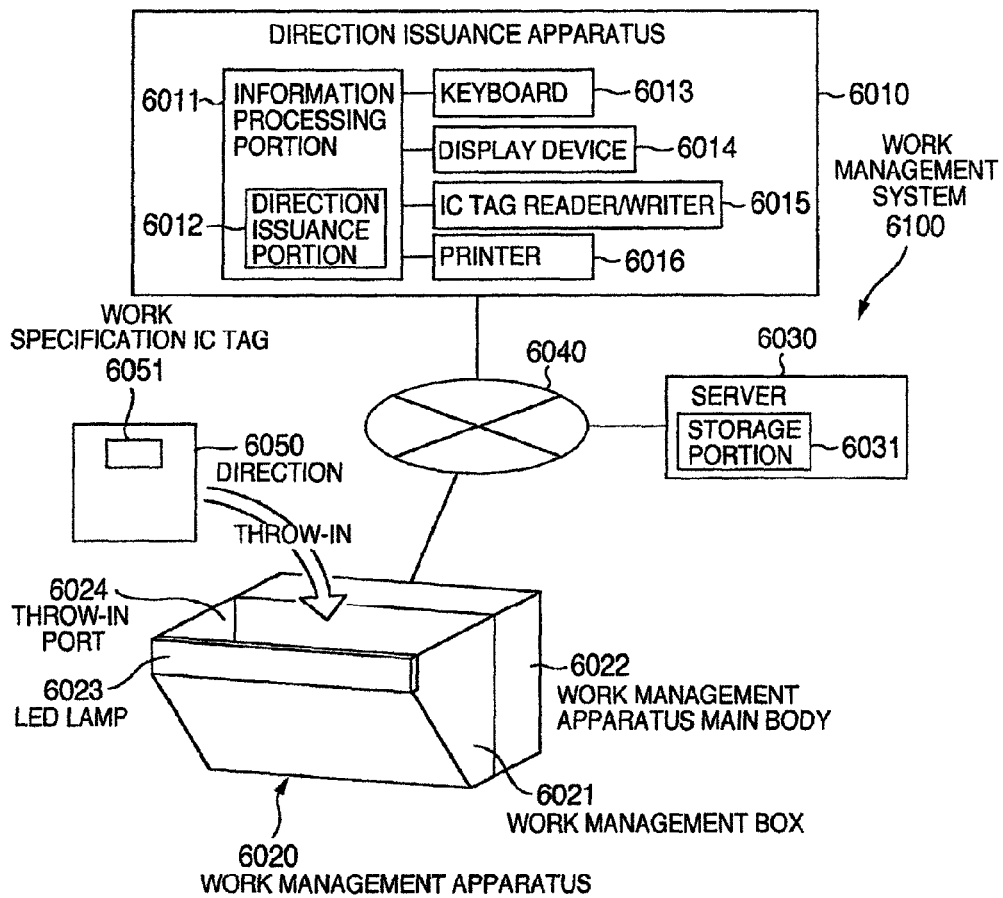
FIG. 61 is a structural view showing a work management system and a work management apparatus.

FIG. 61 is a structural view showing a work management system and a work management apparatus. The work management system 6100 includes a direction issuance apparatus 6010, a work management apparatus 6020 and a server 6030. The direction issuance apparatus 6010, the work management apparatus 6020 and the server 6030 are connected to one another through a network 6040 such as LAN (Local Area Network).

The direction issuance apparatus 6010 is the terminal that issues a direction when work is necessary and registers direction content and assembly indication information to a storage portion 6031 of the server 6030. Incidentally, the term "assembly indication information" is information of components and procedures necessary for assembling products/semi-finished products. Here, an example of the assembly indication information is an assembly step for mounting components to the electronic circuit board 6074 (see FIG. 63).

The direction issuance apparatus 6010 includes an information processing portion 6011, a keyboard 6013, a display device 6014, an IC tag reader/writer 6015 and a printer 6016. The information processing portion 6011 includes a direction issuance portion 6012 for issuing a direction and outputs a direction 6050 to the printer 6016 in accordance with the instruction from the direction issuance portion 6012. The IC tag reader/writer 6015 writes information for specifying the work content to a work specification IC tag 6051 in accordance with the indication of the direction issuance portion 6012.

Examples of the information for specifying the work content are the direction number, the model names or type numbers of products and semi-finished products to be produced and the production number. Assembly information for the worker to mount the components 6075 (see FIG. 63) to the electronic circuit board 6074 (see FIG. 63) is described as the detailed information of the information for specifying the work content of the work object article. Concretely, it is the kind of the components 6075, its number and its mounting sequence.

The direction 6050 is the document that describes the route of the assembly steps of the product. Concretely, the components 6075 to be mounted to the electronic circuit board 6074 are diversified and the document describes the sequence (route of the steps) of assembling each kind of components 6075 to the electronic circuit board 6074. For example, the route includes a CPU step, a CPU peripheral component step, a power source step and an I/O interface step. The worker can judge the route of the work step from the direction 6050.

A non-contact wireless IC tag such as RFID (Radio Frequency Identification) is used for the work specification IC tag 6051 and is attached to the document as the direction 6050. The work specification IC tag 6051 is preferably of a battery non-mounting type that acquires electric power from the reception radio wave because the size and the production cost can be reduced but may well be of a battery mounting type.

The work management apparatus 6020 includes a work management box 6021 having an LED (Light Emitting Diode) lamp 6023 and a throw-in port 6024 and a work management apparatus main body 6022 provided to the side surface of the work management box 6021. The detail of the construction will be explained with reference to FIG. 62.

Figure 62:
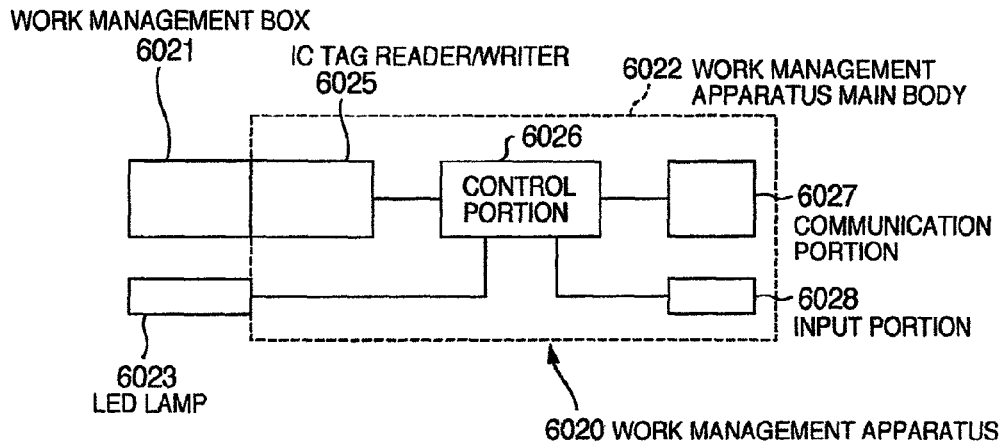
FIG. 62 is a block diagram showing a construction of the work management apparatus.

FIG. 62 is a block diagram showing the construction of the work management apparatus. The work management apparatus 6020 has the function of reading the IC tag and displaying the progress of the work read by the LED lamp 6023 and the function of transmitting the read information to the server 6030. The work management apparatus main body 6022 has an IC tag reader/writer 6025, a control portion 6026, a communication portion 6027 and an input portion 6028.

The work management box 6021 is the box into which the direction 6050 is thrown at the start of working. When working is completed, the worker takes out the direction 6050 from the work management box 6021, attaches it to the electronic circuit board 6074 (see FIG. 63) and transfers the direction 6050 to the next process step.

The IC tag reader/writer 6025 confirms the connection with the work specification IC tag 6051 when the direction 6050 is thrown into the work management box 6021, reads the information of the work specification IC tag 6051 attached to the direction 6050 and transmits the communication start information to the control portion 6026. The IC tag reader/writer 6025 confirms disconnection from the work specification IC tag 6051 when the direction 6050 is taken out from the work management box 6021, and transmits the communication end information to the control portion 6026.

Concretely, the control portion 6026 can be accomplished by a CPU that operates in accordance with a program. When receiving the communication start information from the IC tag reader/writer 6025, the control portion 6026 transmits the communication start information with the work specification IC tag 6051 and the information for specifying the work content to the server 6030 through the communication portion 6027. Examples of the communication start information are ID of the work management box 6021 and the communication start time. Examples of the information for specifying the work content are the direction number of the direction 6050, model numbers of products and semi-finished products to be produced and the production number. When receiving the communication end information from the IC tag reader/writer 6025, the control portion 6026 transmits the communication end information with the work specification IC tag 6051 and the information for specifying the work content to the server 6030 through the communication part 6027. Examples of the communication end information are the ID of the work management box 6021 and the communication end time. Examples of the information for specifying the work content are the direction number of the direction 6050, model numbers of products and semi-finished products to be produced and the production number.

Incidentally, a plurality of IC tags may be thrown into the work management box 6021. An example of other IC tags is the work specification IC tag to which the information for specifying the worker is written. When the worker specification IC tag is thrown, the IC tag reader/writer 6025 reads the information of the worker specification IC tag and transmits the communication start information with the worker specification IC tag and the information for specifying the worker (worker M0001 in FIG. 65, for example) to the server 6030. Examples of the communication start information are the ID of the work management box 6021 and the communication start time. When the worker specification IC tag is taken out from the work management box 6021, the IC reader/writer 6025 confirms disconnection of the communication from the worker specification IC tag and then transmits the communication end information with the worker specification IC tag and the information for specifying the worker to the server 6030. Examples of the communication end information are the ID of the work management box 6021 and the communication end time.

Furthermore, the control portion 6026 judges the progress of working on the basis of the read information of the IC tag reader/writer 6025 and instructs the display color to the LED lamp 6023 on the basis of the judgment result. The flowchart of the detailed control program will be later described (see FIG. 66). Incidentally, the input portion 6028 executes input operations such as initial setting of the control portion 6026.

The LED lamp 6023 has light emitting diodes of the three primary colors RGB (Red, Green, Blue) and a rectangular lens on the entire surface of each light emitting diode. Consequently, the work manager can confirm from a relatively remote place the progress of the work area. The light emission colors of the LED lamp 6023 are preferably different depending on the progress of working. For example, the display color is white in the case of waiting for working, blue in the case of the progress of working, yellow in the case of urgent working and red in the case where a predetermined period of time has passed and working stops. It is thus possible for the work manager to judge from the light emission colors of the LED lamp 6023 which work area has a problem such as the delay of working. When it is necessary to display the detailed progress of working, characters, or the like, may be displayed as a form of the LED display.

The server 6030 (see FIG. 61) is the server that stores the work performance information from a plurality of work areas and analyzes the work performance information. The server 6030 stores, into the storage portion 6031, registration information from the direction issuance apparatus 6010. When receiving the information from the work management apparatus 6020, that is, the communication start signal, the information for specifying the work content and the communication end information, the server 6030 stores these kinds of information in the storage portion 6031. Time information (time stamp) containing the year, month and day is added to the received information and is stored. The time information stored in the storage portion 6031 includes the communication start time contained in the communication start information, the communication end time contained in the communication end information and the time information added to the received information (time stamp). The time information added to the received information (time stamp) may be utilized for backing up the communication start time and the communication end time. When the time information is not contained in the information sent from the work management apparatus 6020, the time information added to the received information (time stamp) is utilized for managing the received information. The server 6030 calculates the operation time for each direction from the information of the storage portion 6031, for example, and stores the calculation result in the storage portion 6031.

Figure 63:
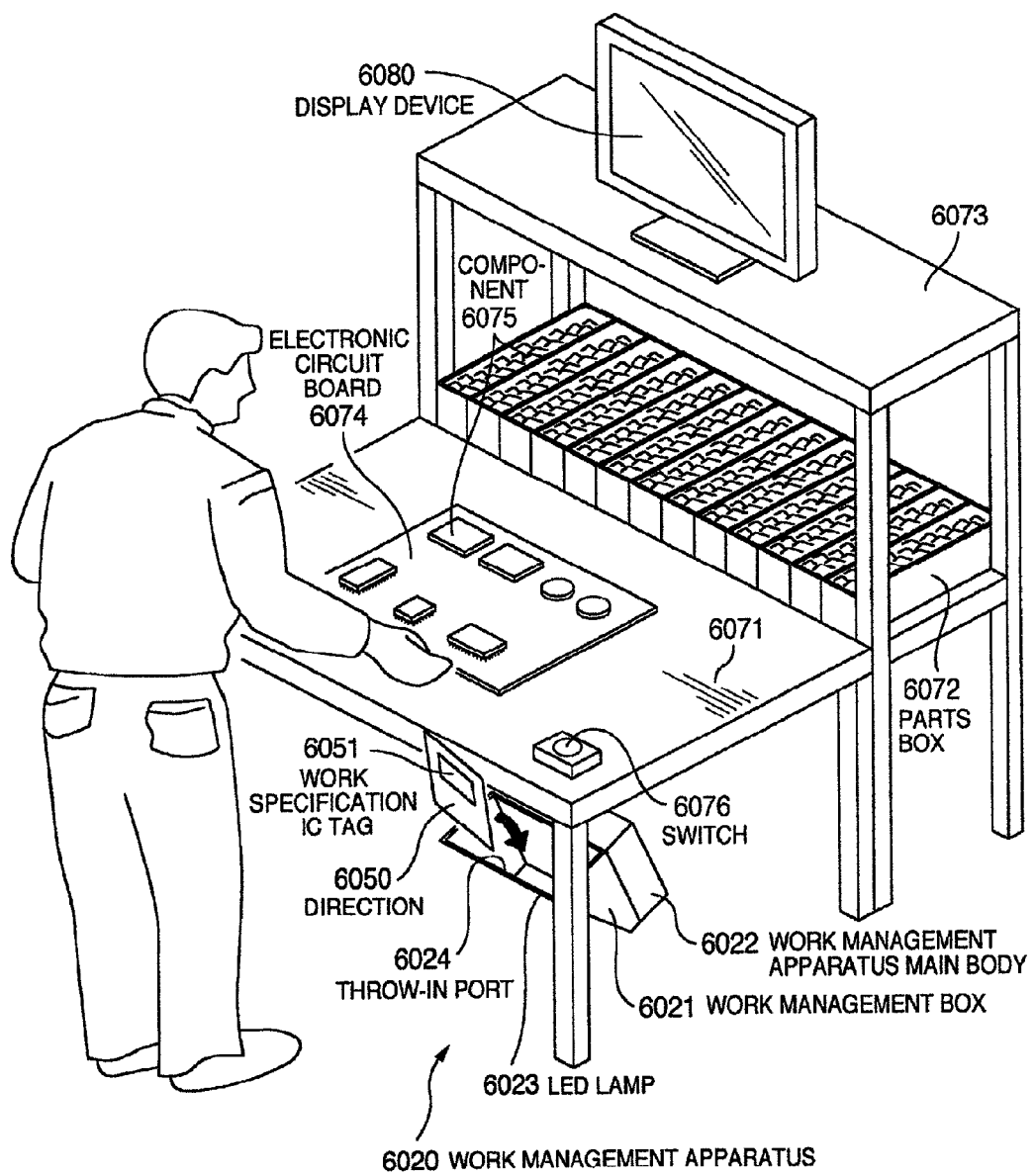
FIG. 63 is an appearance view showing an example of a work bench of a work area.

FIG. 63 is an appearance perspective view showing an example of a work bench in a work area. A work management apparatus 6020 is disposed below the work bench 6071. A work management box 6021 is inclined forward in the drawing so that the worker can easily throw the direction 6050 into the work management box 6021 at the start of working and can take it out at the end of working. Consequently, the worker can easily confirm the existence of the direction 6050 inside the work management box 6021. Incidentally, the throw-in port 6024 of the work management box 6021 preferably faces substantially upward in a vertical direction to minimize the installation area of the work management box 6021.

The upper part of the work bench 6071 is an assembly work area of the electronic circuit board 6074 and a plurality of parts boxes 6072 is installed in front of the worker. A display device 6080 is installed on an auxiliary work bench 6073 and displays the work content. The worker conducts working of the electronic circuit board 6074 in accordance with the information displayed on the display device 6080.

Figures 64, 65:
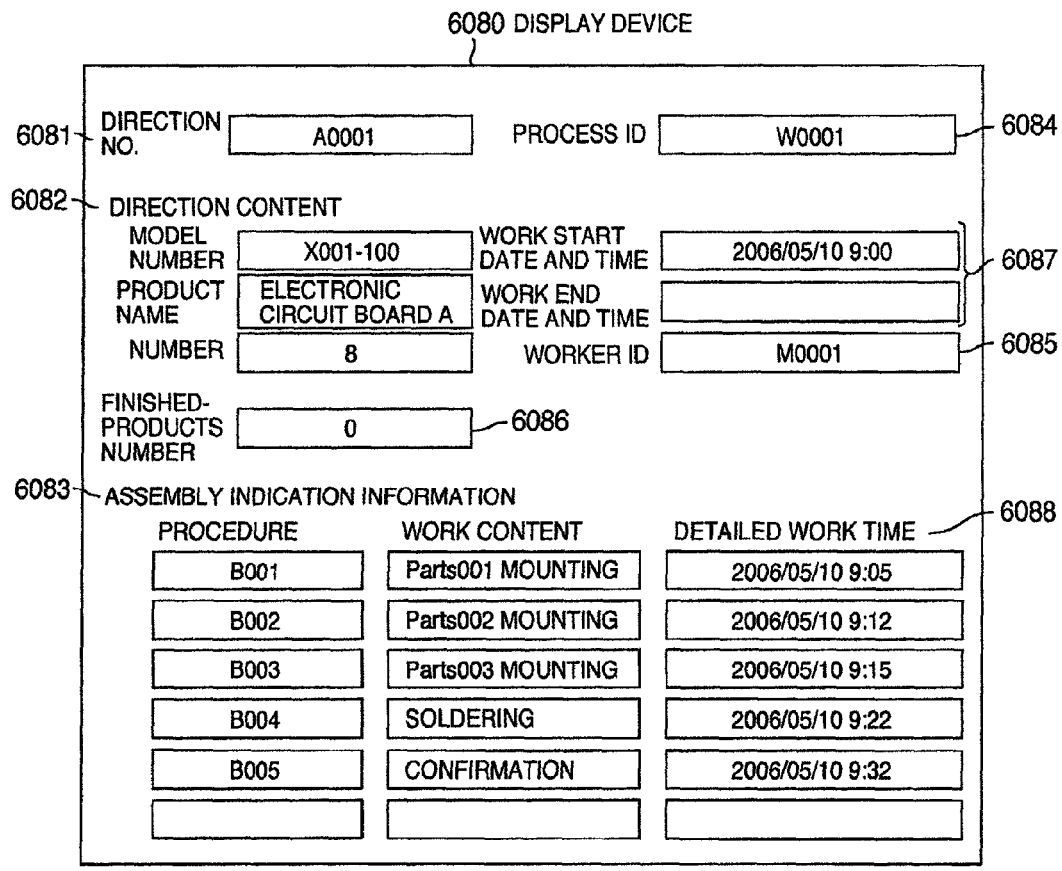
FIG. 64 is an explanatory view showing an example of a picture window displayed on a display device during working.
FIG. 65 is an explanatory view showing work performance per work process stored in a storage portion of a server.

FIG. 64 is an explanatory view showing an example of the display screen displayed on the display device during working. The explanation will be given with reference to FIGS. 61 to 63. The display device 6080 displays information about working and its display screen changes when a switch 6076 is pushed. The display device 6080 is connected to the server 6030 through a network 6040. When receiving information for specifying the work that is sent from the work management apparatus 6020, the server 6030 displays the corresponding work content on the display device 6080. The display device 6080 displays a direction number 6081, a direction content 6082 (type numbers, model names and numbers (pieces) of products and semi-finished products to be assembled), assembly indication information 6083 (procedure and work content), a process ID 6084, a worker 6085, a number of complete products 6086, work start date/work end date 6087 and detailed work time 6088.

The information for specifying the work content corresponding to the work specification IC tag 6051 (such as A0001) is displayed on the direction number 6081. Detailed information (procedure, work content) about the direction number 6081 is displayed on the direction content 6082 and assembly indication information 6083. Information for specifying the process step (such as W0001) is displayed on the step ID 6084. Information for specifying the worker (such as M0001) is displayed on the worker ID 6085. Incidentally, the information for specifying the worker may be registered in advance to the storage portion 6031 of the server 6030, or the server 6030 recognizes throw-in of the IC tag (not shown) for specifying the worker when the worker throws it into the work management box 6021, and displays it on the worker ID 6085.

The time at which the direction 6050 is thrown into the work management box 6021 and the time at which it is taken out from the work management box 6021 are displayed on the work start time/work end time 6087. The number of complete products is displayed on the number-of-complete products 6086 (The number is 8, in this case). The end time of each procedure is displayed on the detailed work time 6088. When the switch 6076 is pushed at the end of each procedure, for example, the time is displayed. In this way, the worker can reliably conducts working in accordance with the work content displayed on the display screen of the display device 6080.

FIG. 65 is an explanatory view showing a work performance for each process step stored in the storage portion of the server. The throw-in time and the take-out time to and from each reader/writer for each direction will be explained. The throw-in time (work start) into the work management box 6021 of the direction 6050, the take-out time (work end) from the work management box 6021, the information about the work process step and the information about the worker are stored. It can be understood from FIG. 65 that as to the work content (direction No.) A0001 as one of the whole work steps W0001, working is started by the worker M0001 at the throw-in time 9:00 on May 10, 2006 and is finished at the take-out time 9:35. Working for the work content (direction No.) A0002 is started by the worker M0002 at the throw-in time 9:50 on May 10, 2006 and is finished at the take-out time 10:40.

Next, the display function of the work progress situation of the work management apparatus 6020 will be explained.

Figure 66:
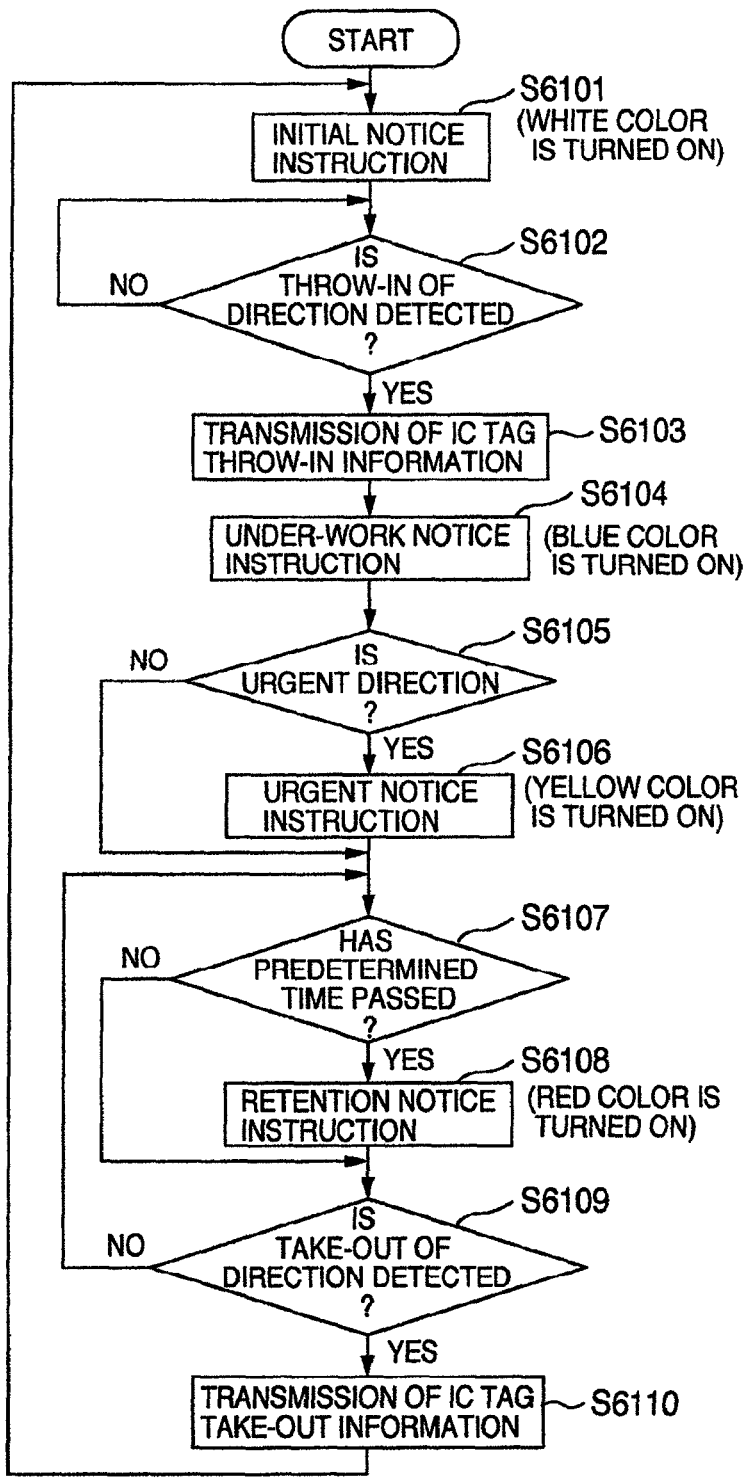
FIG. 66 is a flowchart showing a display procedure of a work progress of the work management apparatus in the first embodiment.

FIG. 66 is a flowchart showing a display procedure of the work progress of the work management apparatus. When the power source of the work management apparatus 6020 is turned on, the control portion 6026 outputs an initial notice instruction to the LED lamp 6023 and turns on a white color (step S6101). Incidentally, the LED lamp 6023 keeps the light emission color lit by a holding circuit (not shown) until a next notice instruction comes. The holding circuit of the emission color is hereby shown disposed on the side of the LED lamp 6023 but it may be disposed on the side of the control portion 6026. When receiving the electronic circuit board 6074 to which the direction 6050 is attached as shown in FIG. 63, the worker throws the direction 6050 into the throw-in port 6024 of the work management box 6021 installed below the work bench 6071. The IC tag reader/writer 6025 transmits in a predetermined time interval a radio wave containing the control signal from its antenna (not shown) and judges whether or not throw-in of the direction is detected (step S6102). Incidentally, the radio wave containing the control signal may be transmitted continuously from the antenna (not shown) inside the IC tag reader/writer 6025 in step S6102.

Electric power is generated owing to the resonance of antennas when the antenna inside the work specification IC tag 6051 receives the radio wave from the IC tag reader/writer 6025. The resulting electric power actuates the circuit inside the work specification IC tag 6051 to execute necessary processing. The processing result is transmitted from the antenna on the side of the work specification IC tag 6051. The IC tag reader/writer 6025 receives the radio wave transmitted by its antenna and detects throw-in of the direction 6050 (step S6102, Yes). When the IC tag reader/writer 6025 fails to detect throw-in of the direction 6050 (step S6102, No), the processing of step S6102 is continued.

The IC reader/writer 6025 reads the information of the work specification IC tag 6051 detected and the control portion 6026 transmits the communication start information with the work specification IC tag 6051 as the IC tag throw-in information and the information for specifying the work content to the server 6030 through the communication portion 6027 and the network 6040 (step S6103). The control portion 6026 outputs the under-operation notice instruction to the LED lamp 6023 and turns on the blue color (step S6104).

The control portion 6026 judges whether or not the content of the direction 6050 is an urgent direction (urgent direction) that must be preferentially carried out (step S6105). When the direction is the urgent direction in step S6105 (step S6105, Yes), the control portion 6026 outputs the urgent notice instruction to the LED lamp 6023 and turns on the yellow color (step S6106). When the direction is not the urgent direction in step S6105 (step S6105, No), the flow proceeds to step S6107.

The control portion 6026 judges whether or not the work time (time elapsed from throw-in of direction) exceeds a predetermined time (step S6107). When it exceeds the predetermined time (step S6107, Yes), the control portion 6026 outputs a retention notice instruction to the LED lamp 6023 and turns on the red color (step S6108). When the time does not exceeds the predetermined time (step S6107, No), the flow proceeds to step S6109.

In step S6109, the IC reader/writer 6025 executes in a predetermined period the communication with the work specification IC tag 6051. When the communication is confirmed, the IC tag reader/writer 6025 does not detect that the worker takes out the direction 6050 from the throw-in port 6024 of the work management box 6021 (step S6109, No) and the flow returns to step 6107. When the communication is not confirmed in the predetermined period, the IC reader/writer 6025 detects that the worker takes out the direction 6050 from the throw-in port 6024 of the work management box 6021 (step S6109, Yes) and proceeds to step S6110.

The control portion 6026 transmits the communication end information with the work specification IC tag 6051 as the IC tag take-out information and the information for specifying the work content to the server 6030 through the network 6040 (step 6110). The control portion 6026 thereafter returns to step S6101, outputs the initial notice instruction to the LED lamp 6023 and turns on the white color.

According to the embodiment, the work management apparatus 6020 includes the work management box 6021 for throwing the work specification IC tag 6051 to which the information for specifying the work content is written, the IC tag reader/writer 6025 provided to the work management box 6021, for detecting the IC tag thrown into the work management box and reading its information, the control portion 6026 for judging the progress of working on the basis of the read information of the IC tag reader/writer 6025 and the LED lamp 6023 representing the progress of working in accordance with the instruction of the control portion 6026. Therefore, the worker is required to only throw the IC tag into the work management box 6021 to start working and to only take out the IC tag from the work management box 6021. Because the progress of working after throw-in of the IC tag is represented by the LED lamp 6023, the worker and the manager of working can easily grasp the progress of working. Furthermore, the substantial work time can be collected because the throw-in time of the IC tag and its take-out time are stored in the server 6030.

Next, a modified embodiment of the embodiment described above will be explained.

Figure 67:
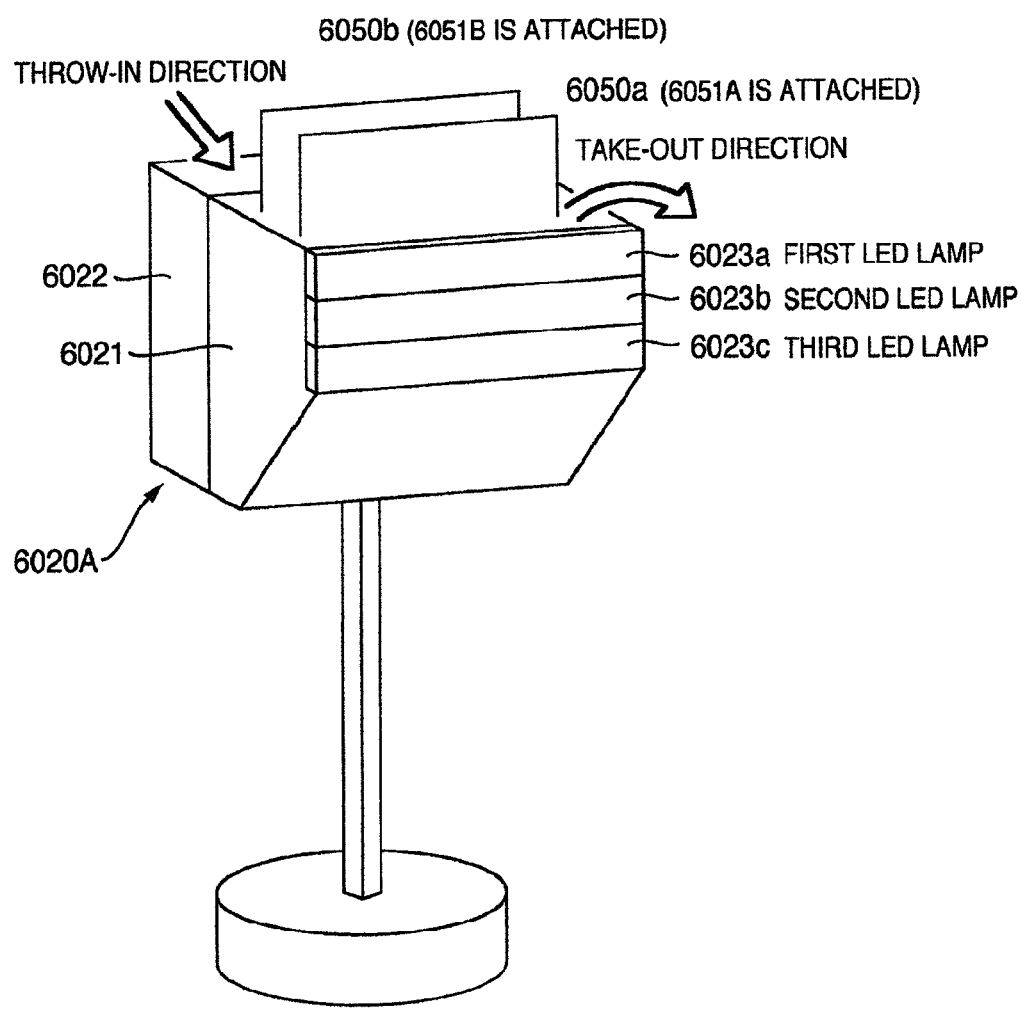
FIG. 67 is a structural view showing a self-support type work management apparatus.

FIG. 67 is a structural view showing a self-support type work management apparatus. In comparison with the construction shown in FIG. 61, the work management apparatus 6020A is fitted onto a self-support type pole and is disposed in the proximity of the work area in the construction shown in FIG. 67. A plurality of LED lamps is arranged on the work management apparatus 6020A and includes a first LED lamp 6023a, a second LED lamp 6023b and a third LED lamp 6023c. Consequently, the progress of working for a plurality of directions, such as a direction 6050a and a direction 6050b, can be displayed by the first LED lamp 6023a and the second LED lamp 6023b, for example. The third LED lamp 6023c is used when an excessive number of directions are thrown into the work management box 6021. Incidentally, the work specification IC tag 6051a is attached to the direction 6050a and the work specification IC tag 6051b is attached to the direction 6050b. In FIG. 67, the same reference numeral is used to identify the same constituent as in FIG. 61 and the explanation of such a constituent is omitted.

FIGS. 68A to 68C are flowcharts showing a display sequence of the work progress of the work management apparatus. FIG. 68A is a flowchart of initial setting, FIG. 68B is a throw-in detection flowchart of the direction and FIG. 68C is a take-out detection flowchart of the direction. FIGS. 68B and 68C are switched in a predetermined interval, and whenever necessary by an external instruction. Here, the explanation will be given about switching in the predetermined interval. In the explanation of the flowcharts of FIGS. 68A to 68C, the direction 6050 and the LED lamp 6023 will be explained as representatives of a plurality of directions and a plurality LED lamps and an operation example inclusive of the relation with a plurality of directions (directions 6050a and 6050b) and a plurality of LED amps (first LED lamp 6023a, second LED lamp 6023b, third LED lamp 6023c) will b explained in a concrete operation example.

When the power of the work management apparatus 6020A is turned on in FIG. 68A, the control portion 6026 outputs the initial notice instruction to the LED lamp 6023 and turns on the white color (step 6201). The number of times of throw-in of the direction to the work management box 6021 is thereafter initialized to "0" (zero) (step S6202) and the flow proceeds to the processing shown in FIG. 68B (step S6203).

In FIG. 68B, the control portion 6026 sets the number of times of throw-in of the direction into the work management box 6021 (step S6204). At the beginning, the initial value of the step S6202 is as such used for the number of times of throw-in of the direction. The control portion 6026 judges whether or not to continue the throw-in detection of the direction (detection continuation) (step S6205). Throw-in detection is continued when it is less than a predetermined time of switching (step 6025, Yes). The tag IC tag reader/writer 6025 transmits in a predetermined time interval the radio wave containing the control signal from the antenna (not shown) inside the tag reader/writer 6025 and judges whether or not throw-in of the direction is detected (step S6207). On the other hand, when throw-in detection exceeds the predetermined time of switching (step 6205, No), the processing is switched to the processing of FIG. 68C (step 6206).

The IC tag reader/writer 6025 receives the radio wave transmitted from the antenna of the work specification IC tag 6051 by the antenna of IC tag reader/writer 6025 and proceeds to step 6208 when detecting throw-in of the direction 6050 (step 6207, Yes). When the IC tag reader/writer 6025 cannot detect throw-in of the direction 6050 (step 6207, No), the flow proceeds to step 6205.

In step 6208, the IC tag reader/writer 6025 reads the information of the work specification IC tag 6051 detected. The control portion 6026 transmits the communication start information with the work specification IC tag 6051 as the IC tag throw-in information and the information for specifying the work content to the server 6030 through the communication portion 6027 and the network 6040 (step 6208) and the flow then proceeds to step 6209. The control portion 6026 further outputs the under-work notice instruction to the LED lamp 6023, turns on the blue color (step S6209) and proceeds to step 6210.

In step S6210, the control portion 6026 judges whether or not the direction content of the direction 6050 is the content of the urgent work. When it is the urgent work (step 6210, Yes), the control portion 6026 outputs the urgent notice instruction to the LED lamp 6023, turns on the yellow color (step S6211) and then proceeds to step S6212. When the direction content is not the urgent work (step S6210, No), the flow proceeds to step S6212.

A value "1" is added to the number of times of throw-in of the directions (step S6212) and whether or not the throw-in number of directions exceeds a predetermined value (that is, proper direction allowable number) "N" (step S6213). When the throw-in number of directions exceeds "N" (step S6213, Yes), the control portion 6026 outputs the excess notice direction to the LED lamp 6023 and turned on and off the red color (step 6214). The processing is then switched to the processing of FIG. 68C (step S6215). When the throw-in number of directions does not exceed the predetermined value "N" (step S6213, No), the flow returns to step S6205.

When the processing is switched to the processing of FIG. 68C, the control portion 6026 sets the throw-in number of directions to the work management box 6021 (step 6220). The throw-in number of directions in the processing in FIG. 68B is as such used as the throw-in number. The control portion judges whether or not to continue detection of take-out of directions (step S6221). When detection of take-out is less than a predetermined time, detection of take-out is continued (step S6221, Yes) and whether or not the work time (time lapsed from throw-in of directions) is longer than the predetermined time is judged for the IC tag (each tag) thrown (step S6223). When the throw-in time is greater than the predetermined time (step S6223, Yes), the control portion 6026 outputs the retention notice instruction to the LED lamp 6023, turns on the red color (step S6224) and proceeds to step S6225. When the throw-in time is less than the predetermined time (step S6223, No), the flow proceeds to step S6225. On the other hand, when take-out detection exceeds a predetermined time of switching (step S6221, No), the processing is switched to the processing of FIG. 68B (step S6222).

In step S6225, the IC tag reader/writer 6025 executes in a predetermined time interval the communication with the work specification IC tag 6051 and does not detect that the worker takes out the direction 6050 from the throw-in port 6024 of the work management box 6021 when the communication is confirmed (step S6225, No) and then returns to step S6221. When the communication cannot be confirmed in the predetermined time, the IC tag reader/writer 6025 detects that the worker takes out the direction 6050 from the throw-in port 6024 of the work management box 6021 (step S6225, Yes) and then proceeds to step S6226.

The control portion 6026 transmits the communication end information with the work specification IC tag 6051 as the IC tag take-out information and the information for specifying the work content to the server 6030 (step 6226). The control portion 6026 thereafter outputs the initial notice instruction to the LED lamp 6023, turns on the white color (step S6227) and subtracts "1" from the throw-in number of directions (step S6228).

In step S6229, the control portion 6026 judges whether or not the throw-in number of directions is "0". When the throw-in number of directions is "0" (step S6229, Yes), the processing is switched to the processing shown in FIG. 68B (step S6230). When the throw-in number of directions is not "0" (step S6229, No), the flow returns to step S6221.

Next, an example of the concrete operations of the flowchart will be explained. The detailed procedure has already been explained with reference to FIGS. 68A-68C. Here, the explanation will be given primarily on the turn-on state of the LED lamp and the explanation of other procedures will be appropriately omitted. The explanation will be given on the assumption that the direction 6050a is thrown into the work management box 6021, the direction 6050b as the urgent direction is then thrown in and the direction 6050c (not shown) is further thrown in. Incidentally, the predetermined number (appropriate direction allowable number) "N" is "2" and the control portion 6026 outputs the excess notice instruction when the throw-in number exceeds "2".

The first LED lamp 6023a, the second LED lamp 6023b and the third LED lamp 6023c are turned on to the white color in step S6202. Detection of throw-in of the direction (IC tag) is judged when the direction 6050a is thrown (step 6207, Yes) and the first LED lamp 6023a is turned on to the blue color (step S6209). Since the direction is not the urgent direction, the flow proceeds to step S6212. The value "1" is added to the throw-in number (step S6212) and the throw-in number is "1" (step S6213, No). The flow then returns to step S6205.

Subsequently, when the direction 6050b is thrown, detection of throw-in of the direction (IC tag) is judged (step S6207, Yes) and the second LED lamp 6023b is turned on to the blue color (step S6209). The direction is judged as the urgent direction (step S6210, Yes) and the second LED lamp 6023b is turned on to the yellow color (step S6211). The value "1" is added to the throw-in number (step S6212) and the throw-in number is "2" (step S6213, No). The flow then returns to step S6205.

Furthermore, when the direction 6050c is subsequently thrown, detection of throw-in of the direction (IC tag) is judged (step S6207, Yes) and the third LED lamp 6023b is turned on to the blue color (step S6209). Since the direction is not the urgent order, the flow proceeds to step 6212. The value "1" is added to the throw-in number (step S6212) and the throw-in number is "3" (step S6213, Yes). Therefore, the third LED lamp 6023b is turned on and off to the red color and the flow returns to step S6205. At this point, the first LED lamp 6023a is turned on to the blue color, the second LED lamp 6023b is turned to the yellow color and the third LED lamp 6023c is turned on and off to the red color.

The explanation will be given about the case where the direction 6050c is thereafter taken out from the work management box 6021, the direction 6050b is taken out, too, but the direction 6050a is left standing for a predetermined time.

When the direction 6050c is taken out within the predetermined time, detection of take-out of the direction (IC tag) is judged (step S6225, Yes) and the third LED lamp 6023c is turned on to the white color (step S6227). The value "1" is subtracted from the throw-in number (step S6228) and the throw-in number is "2" but is not "0" (step S6229, No). The flow then returns to step S6221.

Subsequently, when the direction 6050b is taken out within the predetermined time, detection of throw-in of the direction (IC tag) is judged (step S6225, Yes) and the second LED lamp 6023b is turned on to the white color (step S6227). The value "1" is subtracted from the throw-in number (step S6228) and the throw-in number is "1" but is not "0" (step S6229, No). The flow then returns to step S6221.

Further subsequently, when the direction 6050a is left standing for a predetermined time, the time is judged as being longer than the predetermined time for each ID (step S6223, Yes) and the first LED lamp 6023 is turned on to the red color (step S6224). At this point of time, the first LED lamp 6023a is turned on to the red color, the second LED lamp 6023b is turned on to the white color and the third LED lamp 6023c is turned on to the white color.

According to this embodiment, the worker or the work manager can confirm at a glance from the light emission colors of the LED lamps 6023a, 6023b and 6023c of the work management apparatus 6020A how many directions are put and at which of under-working (blue lamp is turned on), holding of working (red color is turned on), completion of working (white color is turned on), urgent working (yellow color is turned on) and excess working (red color is turned on and off) the progress of working exists.

Another modified embodiment will be explained.

Figure 69:
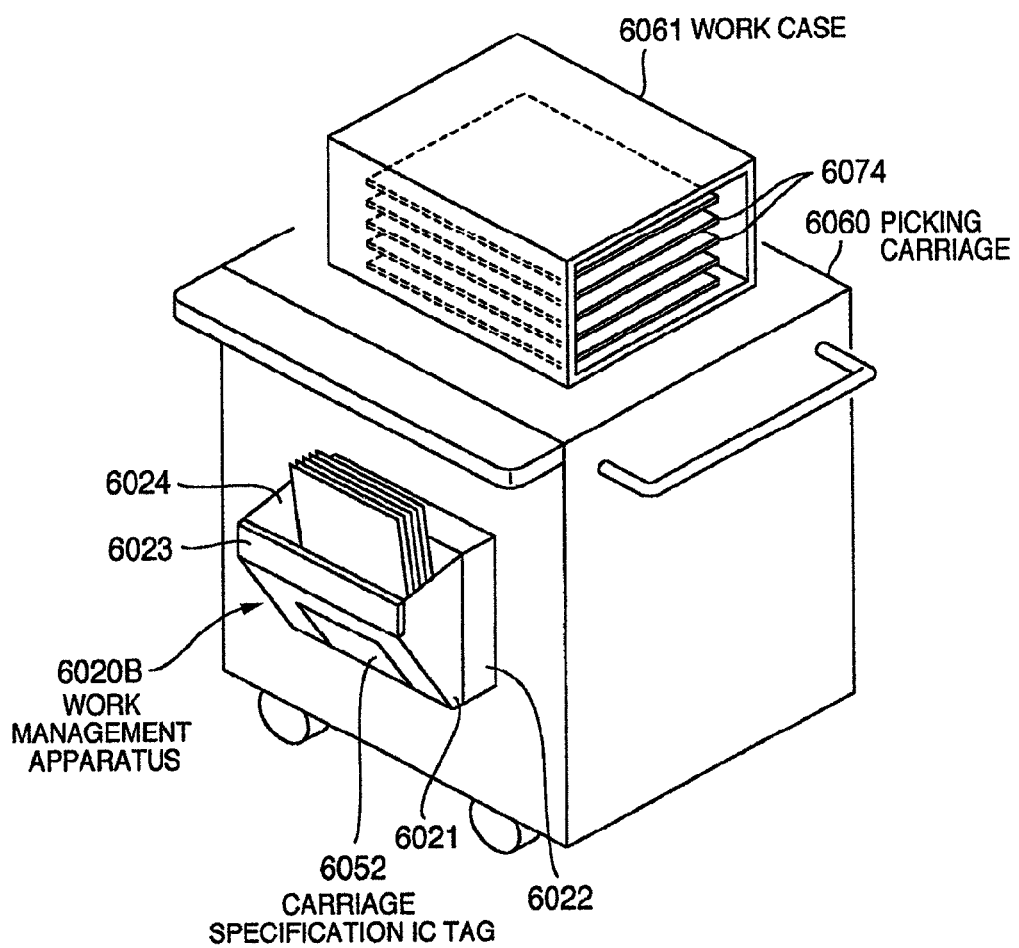
FIG. 69 is a structural view showing the case where the work management apparatus is installed to a picking carriage.

FIG. 69 is a structural view when a work management apparatus is arranged on a picking carriage. The picking carriage 6060 is the one that is used for picking components necessary for an assembly step. FIG. 69 shows the state where a work case 6061 storing therein an electronic circuit board 6074 is picked. The work management apparatus 6020B is mounted to the side surface of the picking carriage 6060. The work management apparatus 6020B shown in FIG. 69 is similar to the work management apparatus 6020 shown in FIG. 61 but a carriage specification IC tag 6052 is disposed on a work management box 6021. Because the work management apparatus 6020B is installed on the picking carriage 6060, the progress of the picking work can be displayed by LED lamps 6023. When discrepancy occurs between the content of the picking direction and the component picked, for example, alarm display can be executed. Incidentally, the same reference numeral is used to identify the same constituent as in FIG. 61 and the explanation of such a constituent is omitted.

FIG. 70 is a flowchart showing the display procedure of the progress of the work management apparatus. Incidentally, the same reference numeral is used to identify the same function as that of the flowchart of FIG. 66 and the explanation of such a function is omitted. The explanation will be given briefly. When the power source of the work management apparatus 6020B is activated, the control portion 6026 outputs the initial notice instruction to the LED lamp 6023 and turns on the white color (step S6101). When the picking worker throws the picking instruction into the work management box 6021, the IC tag reader/writer 6025 detects throw-in of the pocking instruction (step S6102, Yes). When the IC tag reader/writer 6025 does not detect throw-in of the picking instruction (step S6102, No), the flow returns to step S6102.

The IC tag reader/writer 6025 reads the information of the IC tag attached to the picking instruction detected and the control portion 6026 transmits the communication start signal and the information for specifying the work content to the server 6030 through the communication portion 6027 (step S6103). The control portion 6026 outputs the under-work notice instruction to the LED lamp 6023 and turns it on to the blue color (step S6104).

The control portion 6026 judges whether or not the picking instruction content is the urgent work (step S6105). When it is the urgent work in step S6105 (step S6105, Yes), the control portion 6026 outputs the urgent notice instruction to the LED lamp 6023 and turns on the yellow color (step S6106). When the instruction content is not the urgent work (step S6105, No), the flow proceeds to step S6107.

The control portion 6026 judges whether or not the work time (time lapsed from throw-in of direction) exceeds a predetermined time (step S6107). When it is longer than the predetermined time (step S6107, Yes), the control portion 6026 outputs the retention notice instruction to the LED lamp 6023 and turns on the red color (step S6108). When it is not longer than the predetermined time (step S6107, No), the flow proceeds to step S6301.

The picking worker throws the IC tag of the component picked into the work management box 6021. In step S6301, the control portion 6026 judges whether or not the component ID read from the IC tag of the picked component exists in the list of the designated component ID of the picking direction. When the work content does not coincide (when the component ID does not coincide) (step S6301, Yes), the control portion 6026 outputs the alarm notice instruction to the LED lamp 6023 and turns on and off the red color (step S6302). When the work content coincides (when the picked component ID exists in the list of the picked component ID of the picking direction) (step S6301, No), the flow proceeds to step S6303. The control portion 6026 judges whether or not all the picking operations are complete (step S6303). More concretely, judgment of work completion is executed by checking whether or not all the picked component ID exists in the list of the picking component ID designated by the picking direction. When the picking operation is not completed (step S6303, No), the flow returns to step S6107. When the picking operation is completed (step S6303, Yes), the flow proceeds to step S6304.

The control portion 6026 outputs the work completion notice instruction to the LED lamp 6023 and turns on the green color (step S6304). The control portion 6026 transmits the work completion information to the server 6030 (step S6305).

According to this embodiment, the picking worker or the work manager can confirm at a glance from the light emission colors of the LED lamps 6023 of the work management apparatus 6020B shown in FIG. 69 the progress of working of any of under-working (blue color is turned on), suspension of working (red color is turned on), completion of working (green color is turned on), urgent working (yellow color is turned on) and non-coincident working (red color is turned on and off).

FIG. 71 is an explanatory view showing the procedure when the picking carriage is arranged in a picking carriage stock area. After completing the picking operation, the picking worker moves to a predetermined picking carriage stock area 6090. It is necessary in this case to report to the server 6030 that the picking carriage is arranged in the picking carriage stock area 6090.

Figure 71A:
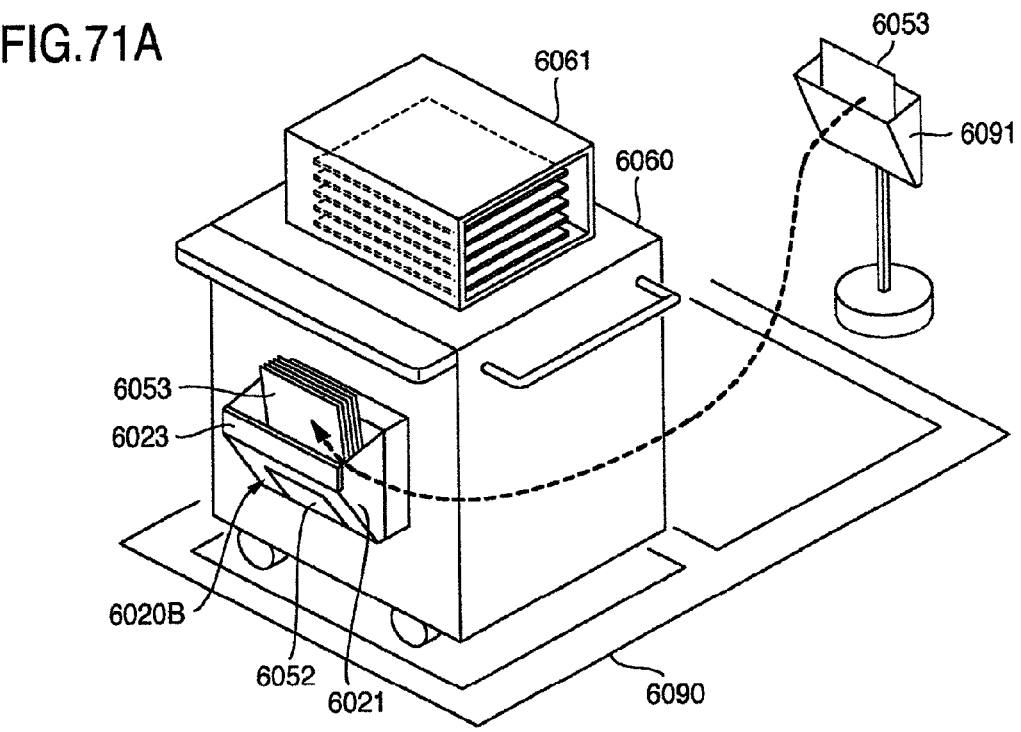
FIGS. 71A and 71B are explanatory views each showing a procedure when the picking carriage is arranged in a picking carriage stock area.

FIG. 71A shows the case where a self-support type tag management box 6091 is arranged in the proximity of the pocking carriage stock area 6090. A work area direction 6053 to which an IC tag storing the area position of the picking carriage stock area 6090 is attached is put into the tag management box 6091. After completing the picking operation, the picking worker arranges the picking carriage to a predetermined position of the picking carriage stock area 6090, takes out the work area direction 6053 from the tag management box 6091 and throws it into the work management box 6021. Then, the IC tag reader/writer 6025 reads the information of the IC tag attached to the work area direction 6053 and the control portion 6026 transmits the area position information, the carriage number information and the time information to the server 6030.

Figure 71B:
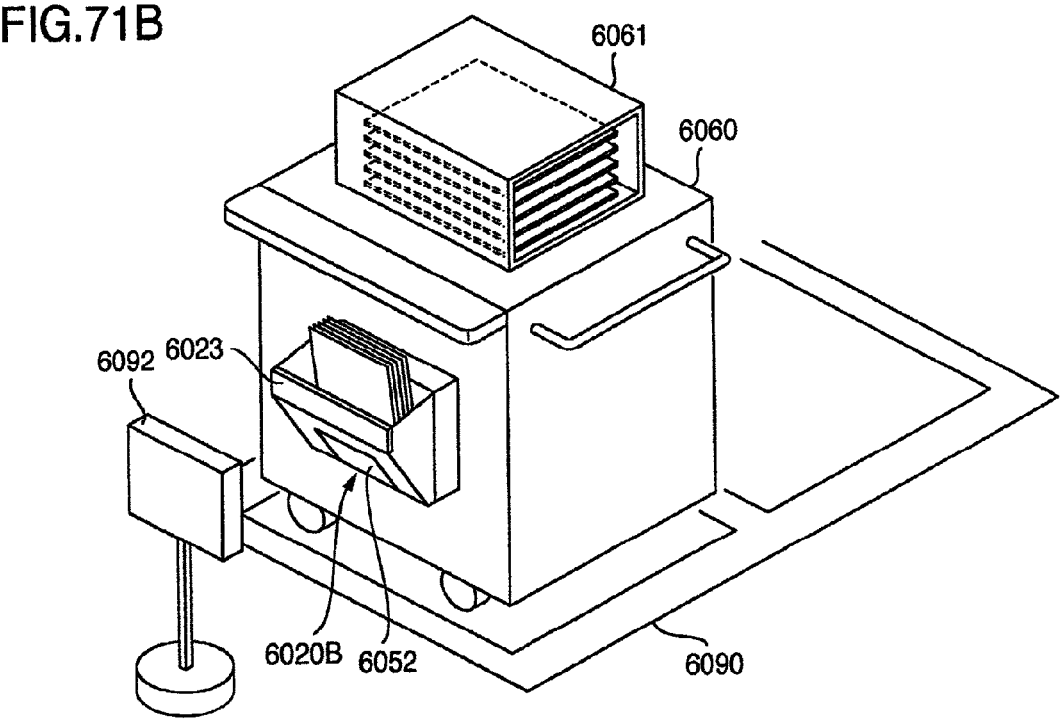

FIG. 71B shows the case where the IC tag reader/writer 6092 for reading the carriage specification IC tag 6052 of the picking carriage 6060 is arranged in the proximity of the picking carriage stock area 6090. After completing the picking operation, the picking worker arranges the picking carriage to a predetermined position of the picking carriage stock area 6090. Then, the IC tag reader/writer 6025 reads the information of the carriage specification IC tag 6052 and transmits the area position information, the carriage number information and the time information to the server 6030. According to this embodiment, it is possible to automatically transmit to the server 6030 that the picking carriage 6060 is arranged at a predetermined position of the picking carriage stock area 6090.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A workability management system for storing work history of a resource for conducting working for a work as work history information, creating casual sequence information for estimating a change with time of workability of said resource from said work history information and managing workability of said resource by said casual sequence information, comprising a processing unit, said processing unit executing the steps of:

storing resource identification information for identifying said resource and said work history information in association with each other in a storage medium;

extracting said work history information corresponding to said resource identification information from said storage medium when a change occurs in said work history information, updating a change content and storing it into said storage medium;

extracting said work history information corresponding to said resource identification information of said resource for judging workability of said resource from said storage medium, taking out total use information of said resource from said work history information, and creating a change with time of said total use information as said casual sequence information; and judging workability of said resource by said casual sequence information;

wherein said processing portion stores in said storage medium priority reference information representing which of at least two resources of the same kind is to be preferentially used, and further stores priority judgment information contained in said work history information in said storage medium in such a fashion as to correspond to said resource identification information of said resources;

takes out from said storage medium said priority judgment information corresponding to said resource identification information of said resource which is the same as said resource when said resource is selected and further takes out said priority reference information from said storage medium;

selects said resource identification information of said priority judgment information satisfying said priority reference information; and reports said resource identification information selected as said resource of priority use.

2. A workability management system for storing use history of a metal mold for processing a work as work history information, creating casual sequence information for estimating a degradation state of said metal mold from said work history information and managing workability of said metal mold by said casual sequence information, comprising a processing unit, said processing unit executing the steps of:

storing mold identification information for identifying said metal mold and said work history information in association with each other in a storage medium;

extracting said work history information corresponding to said mold identification information from said storage medium when a change occurs in said work history information, updating a change content and storing it into said storage medium;

extracting said work history information corresponding to said mold identification information of said metal mold when workability of said metal mold is judged, from said storage medium, taking out total use information of said metal mold from said work history information, and creating a change with time of said total use information as said casual sequence information; and judging workability of said metal mold by said casual sequence information;

wherein said processing unit stores in said storage medium priority reference information representing which of at least two metal molds is to be preferentially used when said metal molds of the same kind are preserved in a warehouse, and further stores priority judgment information contained in said work history information in said storage medium in such a fashion as to correspond to said mold identification information of said metal molds;

takes out from said storage medium said priority judgment information corresponding to said mold identification information of said metal mold which is the same as said metal mold when said metal mold is taken out from said warehouse and further takes out said priority reference information from said storage medium;

selects said mold identification information of said priority judgment information satisfying said priority reference information; and reports said mold identification information selected as said metal mold of priority use.

3. A workability management system for storing use history of a metal mold for processing a work as work history information, creating casual sequence information for estimating a degradation state of said metal mold from said work history information and managing workability of said metal mold by said casual sequence information, comprising a processing unit, said processing unit executing the steps of:

storing mold identification information for identifying said metal mold and said work history information in association with each other in a storage medium;

extracting said work history information corresponding to said mold identification information from said storage medium when a change occurs in said work history information, updating a change content and storing it into said storage medium;

extracting said work history information corresponding to said mold identification information of said metal mold when workability of said metal mold is judged, from said storage medium, taking out total use information of said metal mold from said work history information, and creating a change with time of said total use information as said casual sequence information; and judging workability of said metal mold by said casual sequence information;

wherein said processing unit stores in said storage medium priority reference information representing which of at least two metal molds is to be preferentially used when said metal molds of the same kind are preserved in a warehouse, and further stores priority judgment information contained in said work history information in said storage medium in such a fashion as to correspond to said mold identification information of said metal molds;

takes out from said storage medium said priority judgment information corresponding to said mold identification information of said metal mold which is the same as said metal mold when said metal mold is taken out from said warehouse and further takes out said priority reference information from said storage medium;

selects said mold identification information of said priority judgment information satisfying said priority reference information; and reports said mold identification information selected as said metal mold of priority use;

wherein said processing unit stores in advance a use inhibition flag in a storage medium in such a fashion as to correspond to said mold identification information of said metal mold having a factor that may cause the defect of the product, confirms said use inhibition flag corresponding to said mold identification information when said metal mold is used, judges the existence/absence of use and reports the result.

4. A workability management system for storing use history of a metal mold for processing a work as work history information, creating casual sequence information for estimating a degradation state of said metal mold from said work history information and managing workability of said metal mold by said casual sequence information, comprising a processing unit, said processing unit executing the steps of:
  storing mold identification information for identifying said metal mold and said work history information in association with each other in a storage medium;
  extracting said work history information corresponding to said mold identification information from said storage medium when a change occurs in said work history information, updating a change content and storing it into said storage medium;
  extracting said work history information corresponding to said mold identification information of said metal mold when workability of said metal mold is judged, from said storage medium, taking out total use information of said metal mold from said work history information, and creating a change with time of said total use information as said casual sequence information; and
  judging workability of said metal mold by said casual sequence information;
  wherein said processing unit stores in said storage medium priority reference information representing which of at least two metals molds is to be preferentially used when said metal molds of the same kind are preserved in a warehouse, and further stores priority judgment information contained in said work history information in said storage medium in such a fashion as to correspond to said mold identification information of said metal molds;
  takes out from said storage medium said priority judgment information corresponding to said mold identification information of said metal mold which is the same as said metal mold when said metal mold is taken out from said warehouse and further takes out said priority reference information from said storage medium;
  selects said mold identification information of said priority judgment information satisfying said priority reference information; and
  reports said mold identification information selected as said metal mold of priority use;
  wherein said processing unit stores in advance said mold identification information into an IC tag that is fitted to said metal mold itself and is capable of communication, acquires said total use information representing the use state of said metal mold in a molding machine for molding said work, and stores said work history information into said storage medium in such a fashion as to correspond to said mold identification information read from said IC tag.

5. A work management system for managing work processes in a system in which a predetermined work for a work object article is divided into a plurality of work processes, each of said work processes being carried out in a different works space, the time about working by workers in said work spaces being management by using an IC tag into which information for specifying a content of said predetermined work is written, said system comprising:
  an information processing unit having a processing unit and a storage portion, for collecting information of the time about said work;
  a first putting place which is secured in said work space and to which said worker of a preceding process puts said IC tag;
  a first reader provided to said first putting place, for detecting said IC tag put to said first putting place and reading its information, and transmitting the information of said IC tag to said information processing unit at the timing at which said IC tag is detected afresh or is no longer detected;
  a second putting place which is secured in said work space and to which said worker in said work space puts said IC tag during working; and
  a second reader provided to said second putting place, for detecting said IC tag put to said second putting place and reading its information, and transmitting the information of said IC tag to said information processing unit at the timing at which said IC tag is detected afresh or is no longer detected;
  wherein said processing unit stores the information received from said first and second readers in said storage portion and manages the time about said work;
  wherein said processing unit judges and manages, as the time about said work, the time from the timing at which said second reader detects afresh said IC tag to the timing at which said second reader no longer detects the IC tag, as a processing time in which processing as working in said work space is made.

6. A work management system for managing work processes in a system in which a predetermined work for a work object article is divided into a plurality of work processes, each of said work processes being carried out in a different work space, the time about working by workers in said work spaces being management by using an IC tag into which information for specifying a content of said predetermined work is written, said system comprising:
  an information processing unit having a processing unit and a storage portion, for collecting information of the time about said work;
  a first putting place which is secured in said work space and to which said worker of a preceding process puts said IC tag;
  a first reader provided to said first putting place, for detecting said IC tag put to said first putting place and reading its information, and transmitting the information of said IC tag to said information processing unit at the timing at which said IC tag is detected afresh or is no longer detected;
  a second putting place which is secured in said work space and to which said worker in said work space puts said IC tag during working; and
  a second reader provided to said second putting place, for detecting said IC tag put to said second putting place and reading its information, and transmitting the information of said IC tag to said information processing unit at the timing at which said IC tag is detected afresh or is no longer detected;
  wherein said processing unit stores the information received from said first and second readers in said storage portion and manages the time about said work;
  wherein said processing unit judges and manages, as the time about said work, the time from the timing at which said second reader detects afresh said IC tag to the timing at which said second reader no longer detects the IC tag, as a processing time in which processing as working in said work space is made;
  wherein said processing unit judges and manages, as the time about said work, the time from the timing at which said first reader detects afresh said IC tag to the timing at which said first reader no longer detects the IC tag or said second reader detects afresh said IC tag, as a retention time in which processing is stagnant in said work space or a preceding work space.

7. A work management system for managing work processes in a system in which a predetermined work for a work object article is divided into a plurality of work processes, each of said work processes being carried out in a different work space, the time about working by workers in said work spaces being management by using an IC tag into which information for specifying a content of said predetermined work is written, said system comprising:
- an information processing unit having a processing unit and a storage portion, for collecting information of the time about said work;
- a first putting place which is secured in said work space and to which said worker of a preceding process puts said IC tag;
- a first reader provided to said first putting place, for detecting said IC tag put to said first putting place and reading its information, and transmitting the information of said IC tag to said information processing unit at the timing at which said IC tag is detected afresh or is no longer detected;
- a second putting place which is secured in said work space and to which said worker in said work space puts said IC tag during working; and
- a second reader provided to said second putting place, for detecting said IC tag put to said second putting place and reading its information, and transmitting the information of said IC tag to said information processing unit at the timing at which said IC tag is detected afresh or is no longer detected;
- wherein said processing unit stores the information received from said first and second readers in said storage portion and manages the time about said work;
- wherein said processing unit judges and manages, as the time about said work, the time from the timing at which said second reader detects afresh said IC tag to the timing at which said second reader no longer detects the IC tag, as a processing time in which processing as working in said work space is made;
- wherein said processing unit judges and manages, as the time about said work, the time from the timing at which said first reader detects afresh said IC tag to the timing at which said first reader no longer detects the IC tag or said second reader detects afresh said IC tag, as a retention time in which processing is stagnant in said work space or a preceding work space;
- wherein said processing unit judges and manages, as the time about said work, the time from the timing at which said second reader no longer detects said IC tag to the timing at which said first reader detects afresh the IC tag in said work space of a next work process, as a movement time in which said work object article is moved from said work space to a next work space.

8. A work management system for managing work processes in a system in which a predetermined work for a work object article is divided into a plurality of work processes, each of said work processes being carried out in a different work space, the time about working by workers in said work spaces being management by using an IC tag into which information for specifying a content of said predetermined work is written, said system comprising:
- an information processing unit having a processing unit and a storage portion, for collecting information of the time about said work;
- a first putting place which is secured in said work space and to which said worker of a preceding process puts said IC tag;
- a first reader provided to said first putting place, for detecting said IC tag put to said first putting place and reading its information, and transmitting the information of said IC tag to said information processing unit at the timing at which said IC tag is detected afresh or is no longer detected;
- a second putting place which is secured in said work space and to which said worker in said work space puts said IC tag during working; and
- a second reader provided to said second putting place, for detecting said IC tag put to said second putting place and reading its information, and transmitting the information of said IC tag to said information processing unit at the timing at which said IC tag is detected afresh or is no longer detected;
- wherein said processing unit stores the information received from said first and second readers in said storage portion and manages the time about said work;
- wherein said processing unit judges and manages, as the time about said work, the time from the timing at which said second reader detects afresh said IC tag to the timing at which said second reader no longer detects the IC tag, as a processing time in which processing as working in said work space is made;
- wherein said processing unit judges and manages, as the time about said work, the time from the timing at which said first reader detects afresh said IC tag to the timing at which said first reader no longer detects the IC tag or said second reader detects afresh said IC tag, as a retention time in which processing is stagnant in said work space or a preceding work space;
- wherein said processing unit judges and manages, as the time about said work, the time from the timing at which said second reader no longer detects said IC tag to the timing at which said first reader detects afresh the IC tag in said work space of a next work process, as a movement time in which said work object article is moved from said work space to a next work space;
- wherein said processing unit adds said retention time and said movement time as a lead time, and calculates a substantial processing time by dividing said processing time by said lead time.

9. A work management system for managing work processes in a system in which a predetermined work for a work object article is divided into a plurality of work processes, each of said work processes being carried out in a different work space, the time about working by workers in said work spaces being management by using an IC tag into which information for specifying a content of said predetermined work is written, said system comprising:
- an information processing unit having a processing unit and a storage portion, for collecting information of the time about said work;
- a first putting place which is secured in said work space and to which said worker of a preceding process puts said IC tag;
- a first reader provided to said first putting place, for detecting said IC tag put to said first putting place and reading its information, and transmitting the information of said IC tag to said information processing unit at the timing at which said IC tag is detected afresh or is no longer detected;

a second putting place which is secured in said work space and to which said worker in said work space puts said IC tag during working; and a second reader provided to said second putting place, for detecting said IC tag put to said second putting place and reading its information, and transmitting the information of said IC tag to said information processing unit at the timing at which said IC tag is detected afresh or is no longer detected;

wherein said processing unit stores the information received from said first and second readers in said storage portion and manages the time about said work;

wherein said first putting place is secured at a position closer to said work space of a preceding work process than a work position of said worker in said work space, and said second putting place is secured in the proximity of a work position of said worker in said work space.

\* \* \* \* \*